(12) United States Patent
Nagatoshi

(10) Patent No.: US 8,482,851 B2
(45) Date of Patent: Jul. 9, 2013

(54) PROJECTION OPTICAL SYSTEM AND PROJECTION DISPLAY DEVICE USING THE SAME

(75) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 356 days.

(21) Appl. No.: 12/846,293

(22) Filed: Jul. 29, 2010

(65) Prior Publication Data

US 2011/0026111 A1   Feb. 3, 2011

(30) Foreign Application Priority Data

Jul. 30, 2009   (JP) ................................ P2009-178461

(51) Int. Cl.
*G02B 17/00*   (2006.01)

(52) U.S. Cl.
USPC .............. 359/364; 359/433; 359/728; 353/98

(58) Field of Classification Search
USPC ............................... 359/364, 433, 728; 353/98
See application file for complete search history.

(56) References Cited

U.S. PATENT DOCUMENTS

| | | | | |
|---|---|---|---|---|
| 2,481,615 | A | * | 9/1949 | Rheams ........................ 348/784 |
| 6,848,794 | B2 | * | 2/2005 | Sunaga ........................... 353/98 |
| 2004/0156117 | A1 | | 8/2004 | Takaura et al. |
| 2006/0193036 | A1 | | 8/2006 | Suzuki |
| 2008/0192336 | A1 | * | 8/2008 | Ohzawa ........................ 359/364 |
| 2009/0066919 | A1 | * | 3/2009 | Fujita et al. ...................... 353/98 |
| 2010/0097582 | A1 | * | 4/2010 | Nagase et al. ................... 353/98 |
| 2011/0286088 | A1 | * | 11/2011 | Baba ............................. 359/364 |

FOREIGN PATENT DOCUMENTS

| | | |
|---|---|---|
| JP | 2004-258620 A | 9/2004 |
| JP | 2006-235516 A | 9/2006 |
| JP | 2007-79524 A | 3/2007 |

* cited by examiner

*Primary Examiner* — Frank Font
(74) *Attorney, Agent, or Firm* — Birch Stewart Kolasch & Birch, LLP

(57) ABSTRACT

A projection optical system and a projection display device using the same is provided, wherein the projection optical system has a sufficiently small size to be provided in a front-projection-type projector and can effectively correct various aberrations. An original image on an image display surface is enlarged and projected onto a screen by a first optical system that includes a plurality of lenses and a second optical system that includes a reflecting mirror having a concave surface with an aspheric shape. All of the optical surfaces of the first optical system and the second optical system are rotationally symmetric surfaces each having the optical axis common to all of the optical surfaces as its center. A first lens surface, which is a reduction-side surface, and a second lens surface, which is a magnification-side surface, of a lens (fourteenth lens) closest to a magnification side in the first optical system satisfy predetermined conditional expressions.

9 Claims, 39 Drawing Sheets

EXAMPLE 1

EXAMPLE 1

EXAMPLE 1

EXAMPLE 1

EXAMPLE 1

ASPECT RATIO 16:9

EXAMPLE 2

EXAMPLE 2

EXAMPLE 2

EXAMPLE 2

ASPECT RATIO 16 : 9

EXAMPLE 3

EXAMPLE 3

EXAMPLE 3

EXAMPLE 3

ASPECT RATIO 16:9

EXAMPLE 4

EXAMPLE 4

EXAMPLE 4

EXAMPLE 4

ASPECT RATIO 16 : 9

EXAMPLE 5

EXAMPLE 5

EXAMPLE 5

EXAMPLE 5

ASPECT RATIO   16 : 9

EXAMPLE 6

EXAMPLE 6

EXAMPLE 6

EXAMPLE 6

ASPECT RATIO 16 : 9

EXAMPLE 7

EXAMPLE 7

EXAMPLE 7

EXAMPLE 7

ASPECT RATIO 4:3

EXAMPLE 8

EXAMPLE 8

EXAMPLE 8

EXAMPLE 8

ASPECT RATIO 4 : 3

EXAMPLE 9

EXAMPLE 9

EXAMPLE 9

EXAMPLE 9

ASPECT RATIO 4:3

MAGNIFICATION SIDE ⟶

PROJECTION OPTICAL SYSTEM AND PROJECTION DISPLAY DEVICE USING THE SAME

CROSS-REFERENCE TO RELATED APPLICATIONS

This application is based upon and claims the benefit of priority from the Japanese Patent Application No. 2009-178461 filed on Jul. 30, 2009; the entire contents of which are incorporated herein by reference.

BACKGROUND OF THE INVENTION

1. Field of the Invention

The present invention relates to a projection optical system and a projection display device, and more particularly, to a projection optical system that projects an image displayed on an image display device onto a screen using a first optical system including a plurality of lenses and a second optical system including a concave mirror and a projection display device using the same.

2. Description of the Related Art

In general, in projection optical systems used in projectors, the back focal length needs to be long, or an entrance pupil as viewed from the reduction side (light valve side) needs to be disposed at a sufficiently distant point, that is, the reduction side needs to have telecentricity.

With an improvement in the performance of light valves, it is necessary to effectively correct aberrations according to the resolution of the light valve. In addition, there is a strong demand for a fast and wide-angle projection optical system for presentation considering use in, for example, a relatively bright and small indoor space.

A projection optical system has been proposed which includes a first optical system, which is a refracting system including a plurality of lenses, and a second optical system, which is a reflecting system including a concave mirror (see JP-A-2004-258620, JP-A-2006-235516, and JP-A-2007-79524). In this type of projection optical system, a relay system is provided between the first optical system, which is a refracting system, and the second optical system, which is a reflecting system. Therefore, it is possible to reduce the focal length and the projection optical system is suitable for increasing the angle of view.

However, JP-A-2004-258620 discloses a complicated eccentric optical system in which a plurality of optical surfaces is shifted or tilted relative to the optical axis. Therefore, it is very difficult to assemble the eccentric optical system.

JP-A-2006-235516 and JP-A-2007-79524 disclose a coaxial optical system. Therefore, it is easy to assemble the coaxial optical system. However, the coaxial optical system is mainly configured for a rear-projection-type projector. Therefore, the coaxial optical system is not suitable to be provided in a front-projection-type projector since the overall size of the system is large.

In order to obtain a projection optical system that is sufficiently small to be provided in a front-projection-type projector, it is necessary to reduce the total length of the optical system and the size of the concave mirror. However, in this case, it is expected that various aberrations, such as distortion, will occur. Therefore, an important technique problem is to take measures to reduce the aberrations.

SUMMARY OF THE INVENTION

The invention has been made in order to solve the above-mentioned problems, and an object of the invention is to provide a projection optical system that is sufficiently small to be provided in a front-projection-type projector and is capable of effectively correcting various aberrations and a projection display device using the same.

According to an aspect of the invention, there is provided a projection optical system that enlarges and projects an original image on a reduction-side conjugate plane onto a magnification-side conjugate plane. The projection optical system includes: a first optical system that forms an intermediate image conjugate to the original image; and a second optical system that forms a final image conjugate to the intermediate image on the magnification-side conjugate plane. The first and second optical systems are arranged in this order from a reduction side. The first optical system includes a plurality of lenses, and the second optical system includes a reflecting mirror having a concave surface with an aspheric shape. A first lens surface, which is a reduction-side surface, and a second lens surface, which is a magnification-side surface, of a lens closest to a magnification side in the first optical system satisfy the following conditional expression 1:

$$0.1 < Z_h/h; \text{ and}$$

$$0.5 < h/h_{max} < 1 \quad \text{[Conditional expression 1]}$$

(where h indicates a height from an optical axis to an arbitrary point on the first lens surface or the second lens surface, $h_{max}$ indicates the maximum effective height of the first lens surface or the second lens surface, and $Z_h$ indicates a displacement from a point on the first lens surface or the second lens surface on the optical axis to a point on the first lens surface or the second lens surface that is disposed at a height h from the optical axis in the optical axis direction (displacement to the magnification side is positive).

The first optical system may include at least one aspheric surface. The lens closest to the magnification side in the first optical system may be an aspheric lens.

The projection optical system may satisfy the following Conditional expression 2:

$$2.0 < \tan\theta_{max} - \tan\theta_{min} \quad \text{[Conditional expression 2]}$$

(where $\theta_{max}$ indicates a maximum angle among the angles formed between the directional vectors of principal rays emitted from the second optical system to the magnification-side conjugate plane and the directional vector of the optical axis, and $\theta_{min}$ indicates a minimum angle among the angles formed between the directional vectors of the principal rays emitted from the second optical system to the magnification-side conjugate plane and the directional vector of the optical axis).

The reduction side of the entire system may have telecentricity, and the projection optical system may satisfy the following Conditional expression 3:

$$5.0 < |(L \times \tan\theta_{max})/I| \quad \text{[Conditional expression 2]}$$

(where L indicates an air-equivalent distance from the reduction-side conjugate plane to a lens surface closest to the reduction side in the first optical system on the optical axis and I indicates a distance from an intersection point between the reduction-side conjugate plane and the optical axis to the furthest image point on the reduction-side conjugate plane).

The projection optical system may satisfy the following Conditional expression 4:

$$F < 2.0 \quad \text{[Conditional expression 4]}$$

(where F indicates the F number of the reduction side).

All of the optical surfaces of the first optical system and the second optical system may be rotationally symmetric surfaces each having a rotationally symmetric axis common to all of the optical surfaces as its center.

According to another aspect of the invention, a projection display device includes: a light source; a light valve; an illumination optical unit that guides a light beam emitted from the light source to the light valve; and the projection optical system according to the above-mentioned aspect. The light valve modulates the light beam emitted from the light source, and the modulated light beam is projected onto a screen by the projection optical system.

The rotationally symmetric surface means a surface formed by a rotational plane (including a plane that is partially cut out) having a rotationally symmetric axis as its center.

The "magnification side" means the object side (screen side), and the "reduction side" means the original image display area side (light valve side).

The term "lens closest to the magnification side" in the "lens closest to the magnification side in the first optical system" means that the lens is closest to the magnification side on the optical axis in terms of order, but does not mean that the lens is closest to the screen in terms of distance.

According to the projection optical system and the projection display device of the above-mentioned aspects, the first optical system and the second optical system are arranged in this order from the reduction side, the first optical system includes a plurality of lenses, the second optical system includes the reflecting mirror having a concave surface with an aspheric shape, and an intermediate image is formed between the first optical system and the second optical, system. Therefore, even though the incident angle of light obliquely projected to the magnification-side conjugate plane is large, it is possible to form a real image with less distortion on the magnification-side conjugate plane. In addition, since the second optical system can include one reflecting mirror, it is easy to assemble the projection optical system. In addition, it is possible to reduce the total length and the optical system and thus reduce the size of an apparatus.

Since the intermediate image is formed between the first optical system and the second optical system, it is possible to reduce the size of the reflecting mirror of the second optical system, as compared to the system in which the second optical system includes the convex mirror and the intermediate image is not formed between the first optical system and the second optical system.

The first lens surface, which is the reduction-side surface, and the second lens surface, which is the magnification-side surface, of the lens closest to the magnification side in the first optical system satisfy the above-mentioned Conditional expression 1. According to this structure, it is possible to effectively correct various aberrations, such as distortion, which are likely to occur when the total length of the optical system is reduced or the size of the reflecting mirror is reduced.

DESCRIPTION OF THE PREFERRED EMBODIMENTS

Hereinafter, a projection optical system and a projection display device according to embodiments of the invention will be described in detail. A projection optical system and a projection display device according to an embodiment of the invention will be described with reference to FIGS. 1, 2, and 37 to 40 using a projection optical system and a projection display device according to Example 1 as a representative example.

Figure 1:
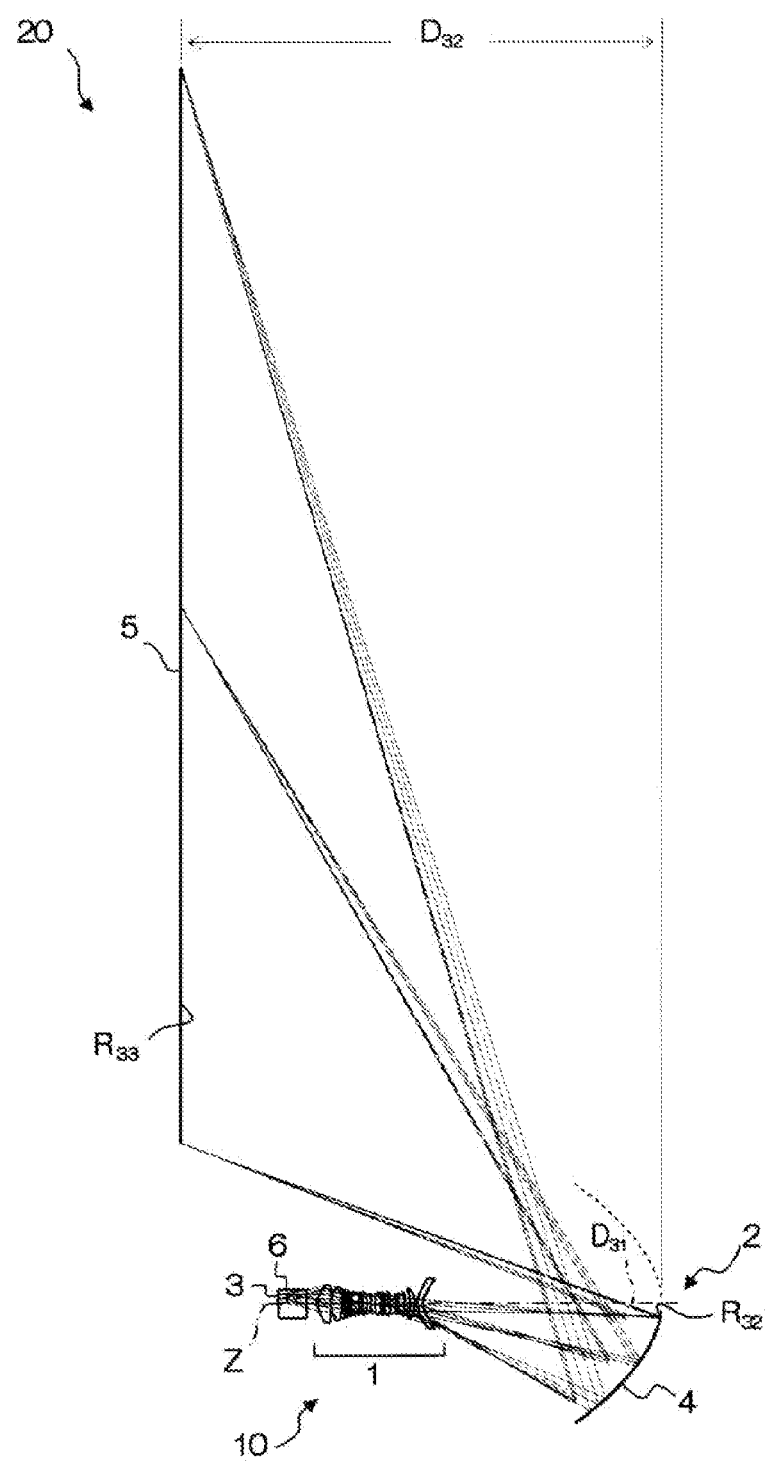
FIG. 1 is a diagram illustrating the structure of a main part of a projection display device according to Example 1.
Figure 2:
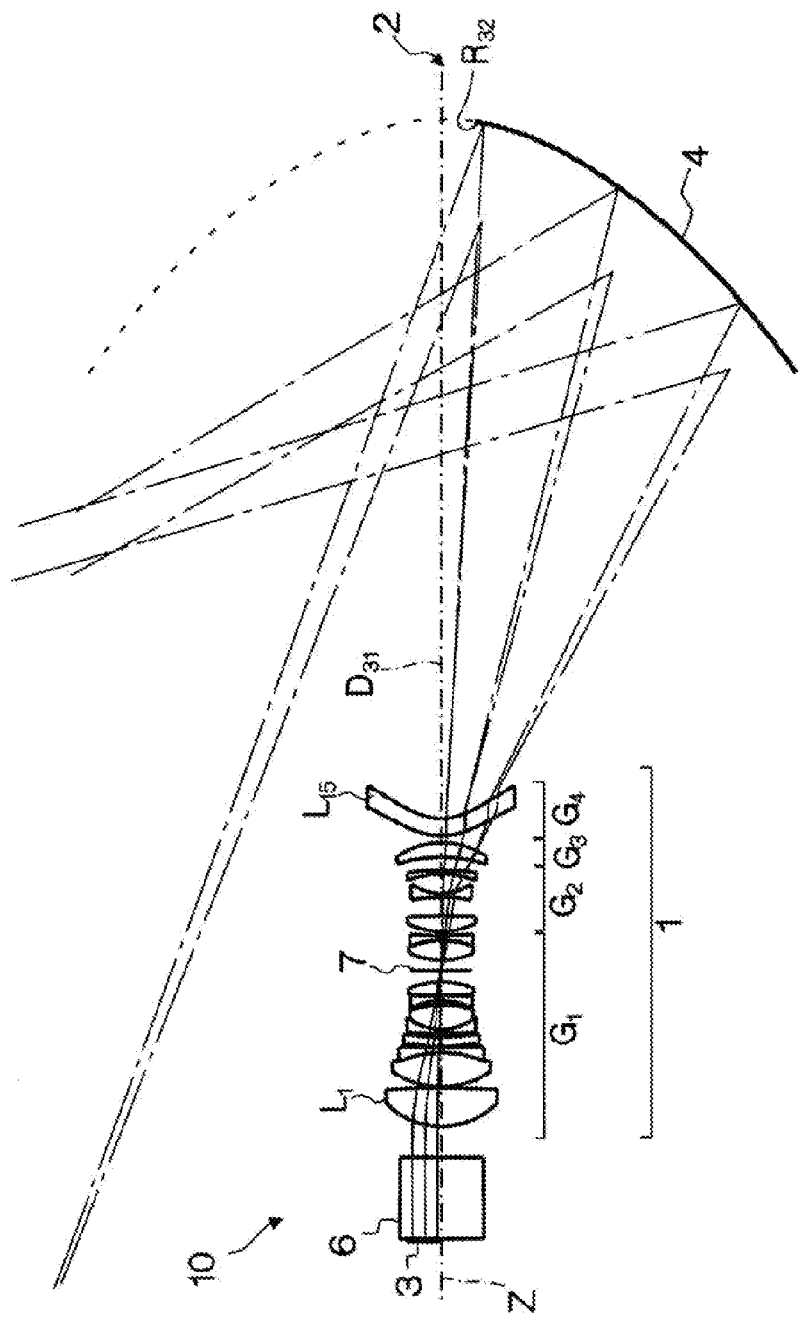
FIG. 2 is a diagram illustrating the structure of a projection optical system according to Example 1.

As shown in FIGS. 1 and 2, a projection optical system 10 according to this embodiment is provided in a front projection display device 20 that enlarges and projects the original image on an image display surface 3, which is a reduction-side conjugate plane, onto a screen 5, which is a magnification-side conjugate plane, and includes a first optical system 1 including a plurality of lenses and a second optical system 2 including a reflecting mirror 4 having a concave surface with an aspheric shape. The first optical system 1 forms an intermediate image of the original image between the first optical system 1 and the second optical system 2, and the second optical system 2 forms an enlarged image of the intermediate image on the screen 5. A glass block 6 including a cover glass, a color composition prism, and a light deflection prism is arranged on the magnification side of the image display surface 3. An aperture diaphragm 7 is provided in the middle of the first optical system 1.

In a lens (fifteenth lens $L_{15}$) closest to the magnification side in the first optical system 1 of the projection optical system 10, each of a first lens surface (RN in FIG. 3) arranged on the reduction side and a second lens surface ($R_{31}$ in FIG. 3) arranged on the magnification side is a rotationally symmetric aspheric surface which is concave to the magnification side and is a rotational plane having the optical axis Z as its center, and is configured so as to satisfy the following Conditional expression 1:

$0.1 < Z_h / h$; and $0.5 < h/h_{max} < 1$ [Conditional expression 1]

(where h indicates the height from the optical axis Z to an arbitrary point on the first lens surface or the second lens surface, $h_{max}$ indicates the maximum effective height of the first lens surface or the second lens surface, $Z_h$ indicates a displacement from a point on the first lens surface or the second lens surface on the optical axis Z to a point on the first lens surface or the second lens surface that is disposed at a height h from the optical axis Z in the direction of the optical axis Z (displacement to the magnification side is positive)).

Figure 38A:
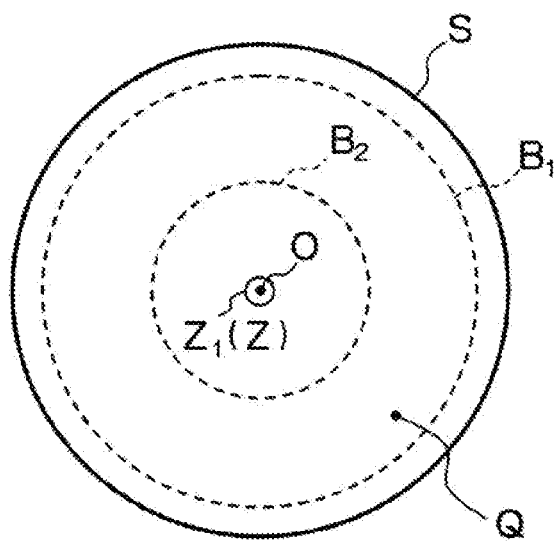
FIG. 38A is a front view illustrating Conditional expression 1.
Figure 38B:
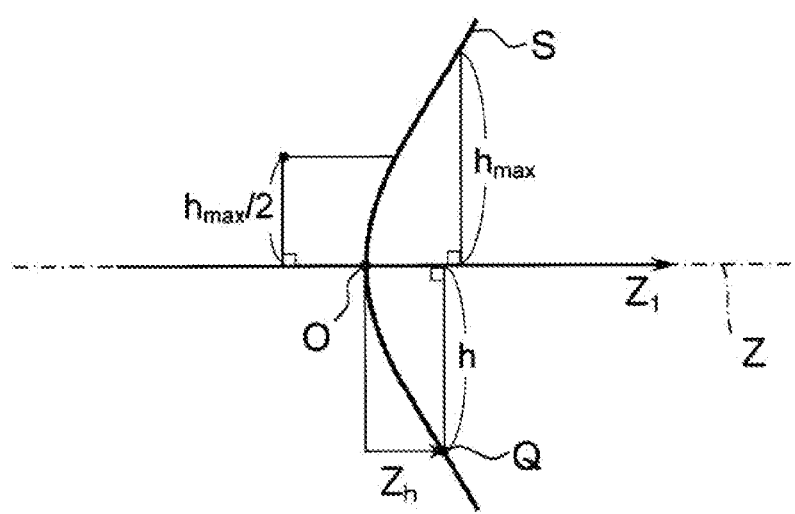
FIG. 38B is a cross-sectional view illustrating Conditional expression 1.

Next, a supplementary description of Conditional expression 1 will be made with reference to FIGS. 38A and 38B. First, as shown in FIGS. 38A and 38B, a coordinate axis $Z_1$ that is aligned with the optical axis Z is set with respect to a rotationally symmetric lens surface S (corresponding to the first lens surface or the second lens surface) (the magnification side is a positive direction). That is, the coordinate axis $Z_1$ is set so as to be aligned with the rotationally symmetric axis of the lens surface S, and the origin O is set so as to be aligned with the central point of the lens surface S.

In this case, the distance from the optical axis Z (coordinate axis $Z_1$) to a boundary line $B_1$ indicating the outer circumference of an effective region of the lens surface S is referred to as the maximum effective height $h_{max}$ of the lens surface S. In addition, in the lens surface S, a ring-shape region (which does not include the boundary lines $B_1$ and $B_2$) interposed between the boundary line $B_2$ linking points that are disposed at a height which is half the maximum effective height $h_{max}$ from the optical axis Z (coordinate axis $Z_1$) and the boundary line $B_1$ is represented by $0.5 < h/h_{max} < 1$.

When the distance from the optical axis Z (coordinate axis $Z_1$) to an arbitrary point (for example, a point Q) in the region is h, the displacement from the origin O to the point Q in the direction of the optical axis Z (coordinate axis $Z_1$) is referred to as $Z_h$ (for convenience, in FIGS. 38A and 38B, the position of the point Q shown in FIG. 38A and the position of the point Q shown in FIG. 38B are changed).

When the first lens surface and the second lens surface satisfy Conditional expression 1, it is possible to effectively correct distortion. When the first lens surface and the second lens surface are aspheric surfaces, it is possible to more effectively correct distortion.

More preferably, in the projection optical system 10, the first lens surface and the second lens surface are configured so as to satisfy the following Conditional expression 1A:

$0.2 < Z_h / h < 0.6$. [Conditional expression 1A]

When Conditional expression 1A is satisfied, it is possible to more effectively correct distortion. If the ratio is more than the upper limit of Conditional expression 1A, the depth of the lens is too large and it is difficult to process the lens.

The projection optical system 10 is configured so as to satisfy the following Conditional expression 2:

$2.0 < \tan \theta_{max} - \tan \theta_{min}$ [Conditional expression 2]

Figure 39A:
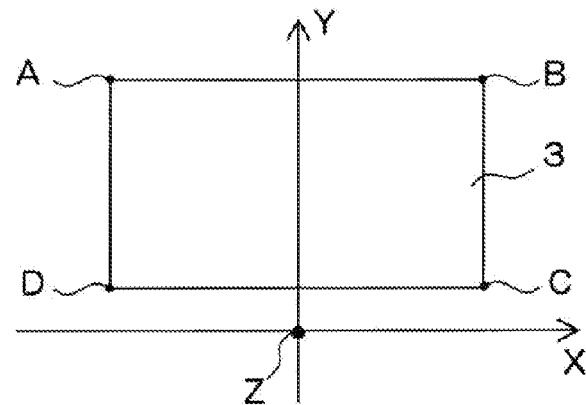
FIG. 39A is a diagram illustrating Conditional expression 3.
Figure 39B:
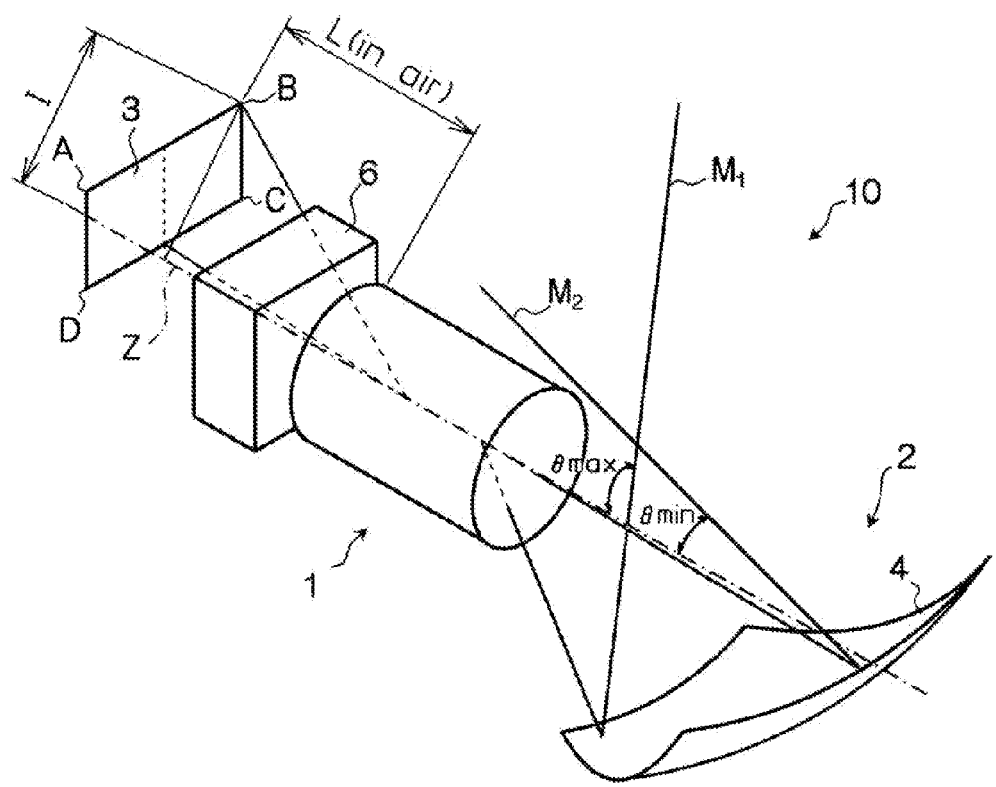
FIG. 39B is a diagram illustrating Conditional expressions 2 and 3.

(where $\theta_{max}$ indicates a maximum angle among the angles formed between the directional vectors of principal rays emitted from the second optical system 2 to the magnification-side conjugate plane (screen 5) and the directional vector of the optical axis Z (which corresponds to a half angle of view of projection; for example, in FIG. 39B, the angle formed between a principal ray $M_1$ and the optical axis Z is $\theta_{max}$) and $\theta_{min}$ indicates a minimum angle among the angles formed between the directional vectors of principal rays emitted from the second optical system 2 to the magnification-side conjugate plane (screen 5) and the directional vector of the optical axis Z (for example, in FIG. 39B, the angle formed between a principal ray $M_2$ and the optical axis Z is $\theta_{min}$. In FIG. 39B, the principal rays $M_1$ and $M_2$ intersect the optical axis Z for a coaxial system, but in an eccentric system, not all of the principal rays including the principal rays $M_1$ and $M_2$ intersect the optical axis Z. Therefore, as described above, $\theta_{max}$ and $\theta_{min}$ are defined by the angles formed between the directional vectors)).

When Conditional expression 2 is satisfied, a sufficient projection angle of view is ensured.

If the difference is less than the lower limit of Conditional expression 2, it is difficult to ensure a necessary projection angle of view. It is more preferable that the projection optical system 10 be configured so as to satisfy the following Conditional expression 2A:

$$2.3 < -\tan \theta_{min} < 4.0. \quad \text{[Conditional expression 2A]}$$

If the difference is more than the upper limit of Conditional expression 2A, the design becomes complicated and it is difficult to ensure a high optical performance.

Among aspects satisfying Conditional expression 2A, particularly, in an aspect satisfying the following Conditional expression 2B, even though only the lens arranged closest to the magnification side in the first optical system 1 is an aspheric lens, it is possible to obtain a high optical performance by configuring the projection optical system so as to satisfy Conditional expression 1 (see the following Examples 7 to 9):

$$2.3 < \tan \theta_{max} - \tan \theta_{min} \leq 3.0. \quad \text{[Conditional expression 2B]}$$

Among the aspects satisfying Conditional expression 2A, particularly, in an aspect satisfying the following Conditional expression 2C, it is preferable that one aspheric lens be added to the first optical system 1 (see the following Examples 1 to 6):

$$3.0 < \tan \theta_{max} - \tan \theta_{min} < 4.0. \quad \text{[Conditional expression 2C]}$$

In the projection optical system 10, the reduction side of the entire system has telecentricity, and the projection optical system 10 is configured so as to satisfy the following Conditional expression 3:

$$5.0 < |(L \times \tan \theta_{max})/I| \quad \text{[Conditional expression 3]}$$

(where L indicates an air-equivalent distance from the reduction-side conjugate plane (image display surface 3) to a lens surface closest to the reduction side in the first optical system 1 on the optical axis Z (see FIG. 39B) and I indicates a distance from an intersection point between the reduction-side conjugate plane (image display surface 3) and the optical axis Z to the furthest image point on the reduction-side conjugate plane (image display surface 3)).

In this way, an appropriate back focal length is ensured.

Next, a supplementary description of Conditional expression 3 will be made with reference to FIGS. 39 and 40. First, as shown in FIG. 39A, two coordinate axes X and Y orthogonal to the optical axis Z are set in the same plane as the image display surface 3. The coordinate axis X is set in parallel to the lateral direction (the horizontal direction of FIG. 39A) of the image display surface 3, and the coordinate axis Y is set in parallel to the longitudinal direction (the vertical direction of FIG. 39A) of the image display surface 3. In this case, I indicates the distance from an intersection point between the coordinate axes X and Y and the optical axis Z to the furthest image point on the image display surface 3 (as shown in FIG. 39A, when the image display surface 3 has a rectangular shape and is symmetric with respect to the coordinate axis Y, a point A or a point B that is furthest from the optical axis Z among points A to D at four corners of the image display surface 3. In FIG. 39B, the point B is selected and shown as the furthest image point).

It is more preferable that the projection optical system 10 be configured so as to satisfy the following Conditional expression 3A:

$$5.0 < |(L \times \tan \theta_{max})/I| < 15.0 \quad \text{[Conditional expression 3A]}$$

If the absolute value is more than the upper limit of Conditional expression 3A, the diameter of the lens increases in order to ensure the back focal length. Therefore, it is difficult to reduce the size of the lens.

The projection optical system 10 is configured so as to satisfy the following Conditional expression 4:

$$F < 2.0 \quad \text{[Conditional expression 4]}$$

(where F indicates the F number of the reduction side).

When Conditional expression 4 is satisfied, a fast projection optical system is obtained.

In the projection optical system 10, all of the optical surfaces of the first optical system 1 and the second optical system 2 are rotationally symmetric surfaces having a rotationally symmetric axis (the optical axis Z) common to all of the optical surfaces as its center. According to this structure, it is possible to improve the assembly accuracy of the projection optical system 10 and it is easy to assemble the projection optical system 10.

Figure 37:
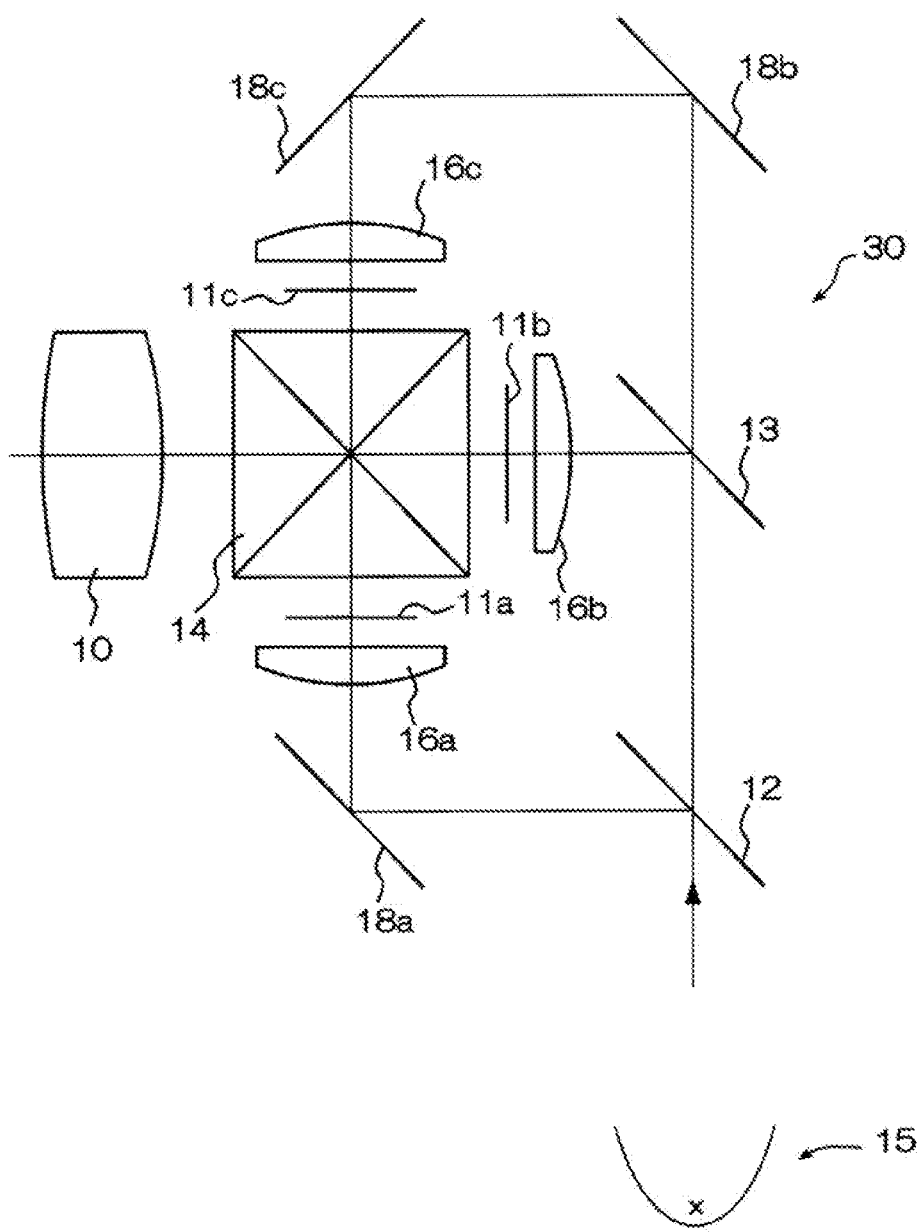
FIG. 37 is a diagram illustrating the structure of an illumination optical system of the projection display device according to Example 1.

The projection display device 20 according to this embodiment is a front projection type including the projection optical system 10. As shown in FIG. 37, the projection display device 20 includes a light source 15, transmissive liquid crystal panels 11a to 11c serving as light valves, an illumination optical system 30 that guides light beams emitted from the light source 15 to the transmissive liquid crystal panels 11a to 11c, and the projection optical system 10. The light beams emitted from the light source 15 are optically modulated by the transmissive liquid crystal panels 11a to 11c and the modulated light beams are projected onto the screen 5 shown in FIG. 1 by the projection optical system 10.

The illumination optical system 30 includes dichroic mirrors 12 and 13 for color separation, a cross dichroic prism 14 for color composition, condenser lenses 16a to 16c, and total reflecting mirrors 18a to 18c. Components between the light source 15 and the dichroic mirror 12 are not shown. In the illumination optical system 30, white light emitted from the light source 15 is incident on the transmissive liquid crystal panels 11a to 11c corresponding to three color light beams (G light, B light, and R light) and then modulated. The modulated light components are composed by the cross dichroic prism 14, and the composed light is incident on the projection optical system 10.

The structure of the illumination optical system 30 is common to the following Examples 1 to 9 and a description thereof will be omitted. In the above-described embodiment, the projection optical system is used as a projection optical system of the projection display device using the liquid crystal display panels, but the invention is not limited thereto. For example, the projection optical system may be used as projection optical systems of other light modulating units, such as DMDs.

EXAMPLES

Next, projection optical systems according to Examples 1 to 9 of the invention will be described in detail.

In the projection optical systems 10 according to the following Examples 1 to 5, a first optical system 1 includes four lens groups (first to fourth lens groups $G_1$ to $G_4$). In the projection optical systems 10 according to Examples 6 to 9, a first optical system 1 includes three lens groups (first to third lens groups $G_1$ to $G_3$). In addition, in the projection optical systems according to the following Examples 1 to 9, two to four surfaces among a plurality of optical surfaces of the first optical system 1 and a reflecting mirror 4 having a concave surface in the second optical system 2 are aspheric surfaces. The aspheric surfaces are represented by the following Aspheric expression A:

[Expression 1]

$$Z = \frac{\rho^2/R}{1+\sqrt{1-K \times \rho^2/R^2}} + \sum_n A_n \rho^n \qquad A$$

(where X, Y, and Z indicate coordinates having the top of the surface as the origin, $\rho^2$ is $X^2+Y^2$, R indicates the curvature radius of an aspheric surface near the optical axis, K indicates eccentricity, $A_n$ indicates an aspheric coefficient (n=3 to 20), and the value of the aspheric coefficient that is not described in the lens data is '0').

Example 1

FIG. 2 shows the structure of the projection optical system 10 according to Example 1 and also shows the detailed structure of a first optical system 1 of the projection optical system 10. In addition, FIG. 1 shows the structure of a main part of a projection display device 20 including the projection optical system 10 according to Example 1.

As shown in FIGS. 1 and 2, the projection optical system 10 according to Example 1 enlarges and projects the original image on the image display surface 3, which is a reduction-side conjugate plane, onto the screen 5, which is a magnification-side conjugate plane. The projection optical system 10 includes the first optical system 1 having a plurality of lenses and a second optical system 2 including a reflecting mirror 4 having a concave surface with an aspheric shape. The first optical system 1 forms an intermediate image conjugate to the original image between the first optical system 1 and the second optical system 2, and the second optical system 2 forms a final image conjugate to the intermediate image on the screen 5.

Figure 3:
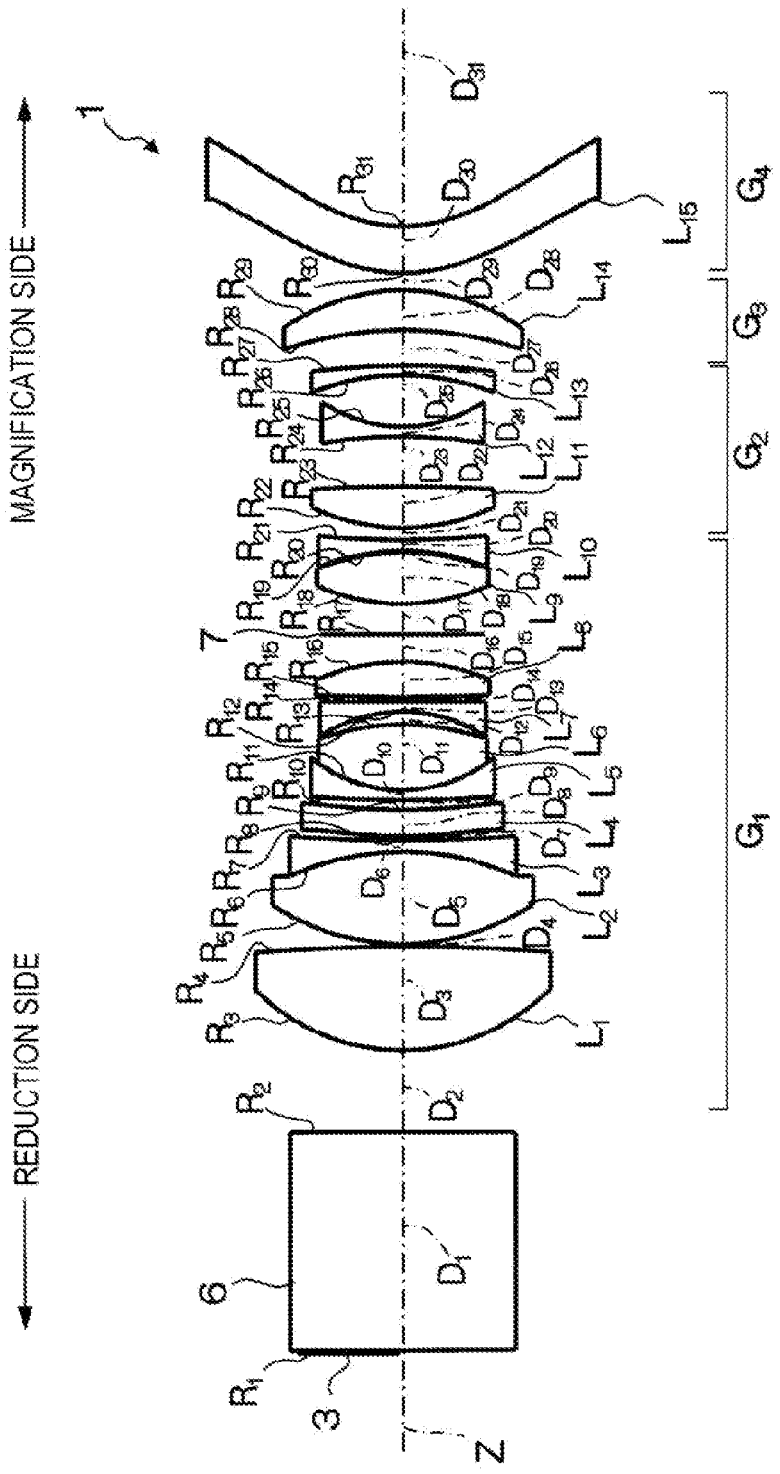
FIG. 3 is a diagram illustrating the detailed structure of a first optical system according to Example 1.

As shown in FIG. 3, the first optical system 1 includes four lens groups (first to fourth lens groups $G_1$ to $G_4$) which are moved in the direction of the optical axis Z for focusing while changing the gaps therebetween when the projection distance is changed.

In the projection optical system 10, the reduction side of the entire system has telecentricity, and all of the optical surfaces of the first optical system 1 and the second optical system 2 are rotationally symmetric surfaces having a rotationally symmetric axis (the optical axis Z) common to all of the optical surfaces as its center.

The first lens group $G_1$ includes a first lens $L_1$, which is a biconvex lens, a cemented lens of a second lens $L_2$, which is biconvex lens, and a third lens $L_3$, which is a biconcave lens, a fourth lens $L_4$, which is an aspheric lens having aspheric surfaces on both sides, a cemented lens of a fifth lens $L_5$, which is a negative meniscus lens having a concave surface facing the magnification side, and a sixth lens $L_6$, which is a biconvex lens, a seventh lens $L_7$, which is a negative meniscus lens having a concave surface facing the reduction side, an eighth lens $L_8$, which is a biconvex lens, a ninth lens $L_9$, which is a biconvex lens, and a tenth lens $L_{10}$, which is a biconcave lens. The first to tenth lenses are arranged in this order from the reduction side, and an aperture diaphragm 7 is provided between the eighth lens $L_8$ and the ninth lens $L_9$.

The second lens group $G_2$ includes an eleventh lens $L_{11}$, which is a biconvex lens, a twelfth lens $L_{12}$, which is a biconcave lens, and a thirteenth lens $L_{13}$, which is a negative meniscus lens having a concave surface facing the reduction side, which are arranged in this order from the reduction side.

The third lens group $G_3$ includes only a fourteenth lens $L_{14}$, which is a positive meniscus lens having a convex surface facing the magnification side. The fourth lens group $G_4$ includes only a fifteenth lens $L_{15}$, which is an aspheric lens having aspheric surfaces on both sides.

In Table 1, the upper part shows the curvature radius R of the surface of each member in the projection optical system 10 according to Example 1, the gap D between the members on the optical axis Z (an air space between the members and the thickness of the center of each member: in a surface that is not disposed on the optical axis Z, a point on the optical axis intersecting a perpendicular line that drops from each surface position (in the surface of the reflecting mirror 4, the position of the top of the surface in the design; and in the surface of the screen 5, a position that is at the shortest distance from the position of the top of the surface in the direction of the optical axis Z) is used as a reference, which is the same with Examples 2 to 9), and the refractive index $N_d$ and the Abbe number $v_d$ of each member with respect to the d-line. In addition, the symbol '*' added to the left side of the surface number indicates an aspheric lens surface (which is the same with Tables 2 to 9).

In Table 1, the lower part shows the gaps $D_{21}$, $D_{27}$, $D_{29}$, $D_{31}$, and $D_{32}$ (variables 1 to 5) that vary depending on the projection distance for focusing. The gap $D_{32}$ (variable 5) between the reflecting mirror 4 and the screen 5 has a negative value.

TABLE 1

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.75 | | |
| 3 | 24.74 | 12.32 | 1.4970 | 81.5 |
| 4 | −222.15 | 0.30 | | |
| 5 | 27.70 | 10.94 | 1.4875 | 70.2 |
| 6 | −33.06 | 1.40 | 1.7552 | 27.5 |
| 7 | 192.49 | 0.50 | | |
| 8* | 62.57 | 3.00 | 1.5101 | 56.2 |
| 9* | 71.52 | 1.13 | | |
| 10 | 154.92 | 1.20 | 1.8061 | 33.3 |
| 11 | 17.06 | 7.83 | 1.5638 | 60.7 |
| 12 | −29.41 | 1.54 | | |
| 13 | −17.55 | 1.20 | 1.8040 | 46.6 |
| 14 | −6989.33 | 0.50 | | |
| 15 | 212.68 | 4.21 | 1.8467 | 23.8 |
| 16 | −25.52 | 3.25 | | |
| 17 (Aperture diaphragm) | ∞ | 3.62 | | |
| 18 | 24.63 | 6.22 | 1.4875 | 70.2 |
| 19 | −26.45 | 0.20 | | |
| 20 | −26.17 | 1.20 | 1.8061 | 33.3 |
| 21 | 102.23 | (Variable 1) | | |
| 22 | 25.36 | 4.87 | 1.7725 | 49.6 |
| 23 | −187.36 | 5.90 | | |
| 24 | −62.23 | 1.20 | 1.6385 | 55.4 |
| 25 | 17.12 | 6.11 | | |
| 26 | −29.54 | 1.20 | 1.6968 | 55.5 |
| 27 | −82.69 | (Variable 2) | | |
| 28 | −44.41 | 4.65 | 1.6034 | 38.0 |
| 29 | −24.64 | (Variable 3) | | |
| 30* | 19.73 | 5.50 | 1.4910 | 57.6 |
| 31* | 16.88 | (Variable 4) | | |
| 32* | −63.44 | (Variable 5) | (Reflecting surface) | |
| 33 | ∞ | | | |

| | | | |
|---|---|---|---|
| Variable 1 | 0.87 | 1.49 | 2.84 |
| Variable 2 | 4.79 | 4.17 | 2.82 |
| Variable 3 | 0.89 | 2.11 | 4.80 |
| Variable 4 | 222.22 | 221.00 | 218.31 |
| Variable 5 (projection distance) | −407.91 | −445.00 | −556.91 |

*Aspheric surface

Table 2 shows aspheric coefficients of Aspheric expression A representing the aspheric shapes of the fourth lens $L_4$, the fifteenth lens $L_{15}$, and the reflecting mirror 4 in Example 1.

TABLE 2

| Aspheric coefficient | | | | | |
|---|---|---|---|---|---|
| Surface number | K | $A_3$ | $A_4$ | $A_5$ | $A_6$ |
| 8 | −14.457 | 0.000E+00 | 1.162E−05 | 0.000E+00 | −2.139E−07 |
| 9 | −22.583 | 0.000E+00 | 2.006E−05 | 0.000E+00 | −2.279E−07 |
| 30 | −1.011 | 1.466E−06 | −1.523E−07 | 2.553E−08 | −3.130E−08 |
| 31 | −1.476 | 4.229E−05 | 1.221E−05 | −2.587E−07 | −5.163E−08 |
| 32 | −0.990 | 2.198E−06 | −1.576E−07 | −3.837E−10 | 1.208E−11 |
| Surface number | $A_7$ | $A_8$ | $A_9$ | $A_{10}$ | $A_{11}$ |
| 8 | 0.000E+00 | 1.064E−10 | 0.000E+00 | 8.675E−13 | 0.000E+00 |
| 9 | 0.000E+00 | 2.068E−10 | 0.000E+00 | 1.456E−12 | 0.000E+00 |
| 30 | −1.642E−11 | 6.044E−11 | −6.594E−14 | −5.452E−14 | 3.741E−16 |
| 31 | 2.117E−11 | 9.983E−11 | 4.635E−13 | −1.057E−13 | −3.806E−16 |
| 32 | 6.453E−16 | −1.020E−15 | 8.978E−19 | 6.225E−20 | −3.403E−23 |
| Surface number | $A_{12}$ | | $A_{13}$ | | $A_{14}$ |
| 8 | 0.000E+00 | | 0.000E+00 | | 0.000E+00 |
| 9 | 0.000E+00 | | 0.000E+00 | | 0.000E+00 |
| 30 | 1.849E−17 | | −4.822E−21 | | −3.740E−21 |
| 31 | 5.386E−17 | | −2.598E−19 | | 5.156E−21 |
| 32 | −2.436E−24 | | −2.003E−27 | | 5.510E−29 |

Table 19 shows values corresponding to Conditional expressions 1 to 4 in the projection optical system 10 according to Example 1. The projection optical system 10 satisfies all of Conditional expressions 1 to 4 and also satisfies Conditional expressions 1A, 2A, 2C, 3A, and 4A.

Figure 4A:
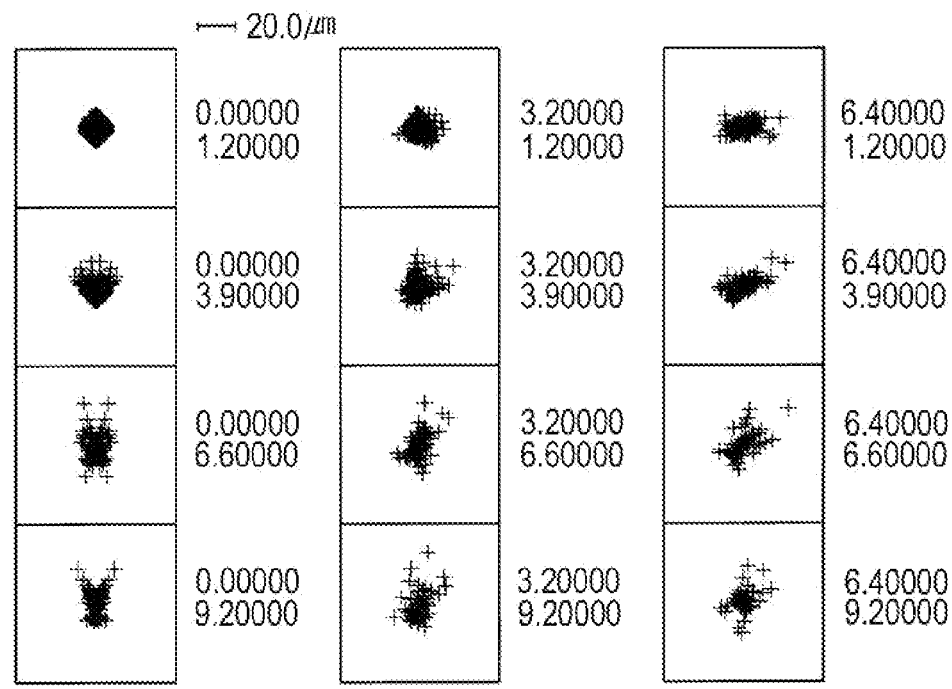
FIG. 4A is a diagram illustrating spots with respect to the d-line, the F-line, and the C-line on a screen of the projection optical system according to Example 1.
Figure 4B:
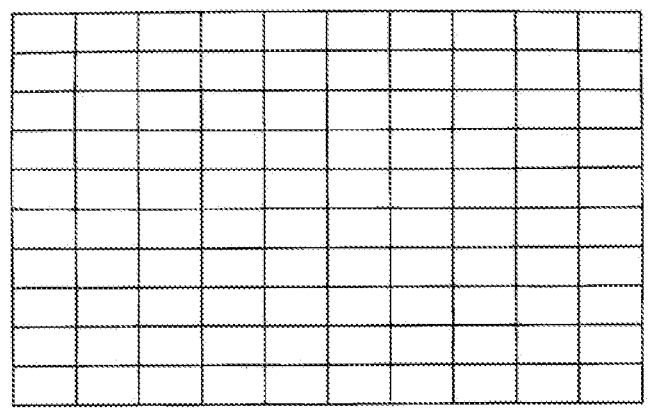
FIG. 4B is a diagram illustrating a distortion grid.

As can be seen from diagrams (FIG. 4A) illustrating spots on the screen and a distortion grid (FIG. 4B) in FIGS. 4A and 4B, the projection optical system 10 is a high-performance projection optical system capable of effectively correcting chromatic aberration and distortion. Values written on the right side of each spot diagram indicate coordinate values on the image display surface 3 (the upper side indicates an X coordinate value and the lower side indicates a Y coordinate value: the setting of the coordinate axes is the same as that shown in FIG. 39A) (which is the same as that in FIGS. 8A, 12A, 16A, 20A, 24A, 28A, 32A, and 36A according to Examples 2 to 9). In addition, the aspect ratio of the image display surface 3 is 16:9 (which is the same as that in FIGS. 8B, 12B, 16B, and 20B according to Examples 2 to 6).

Example 2

Figure 5:
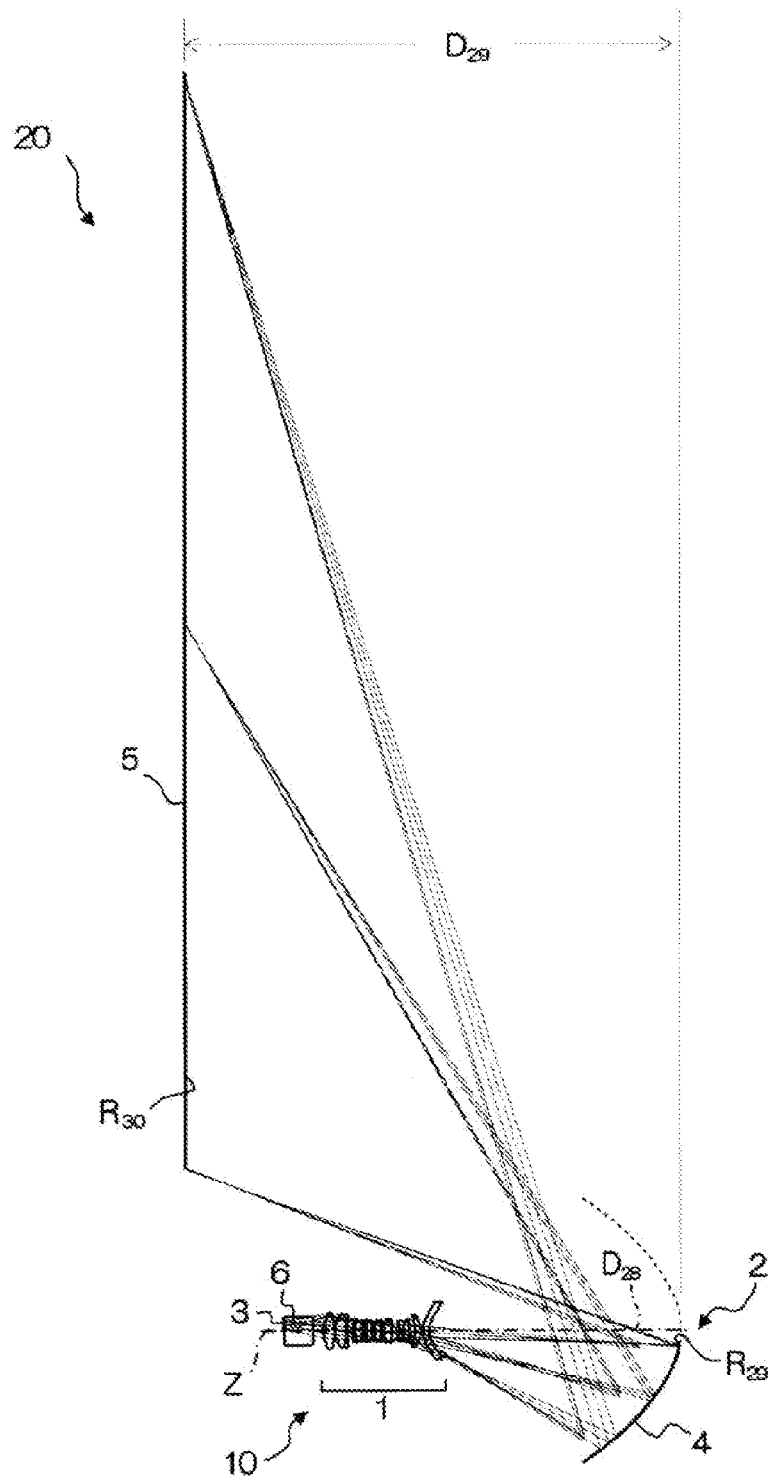
FIG. 5 is a diagram illustrating the structure of a main part of a projection display device according to Example 2.
Figure 6:
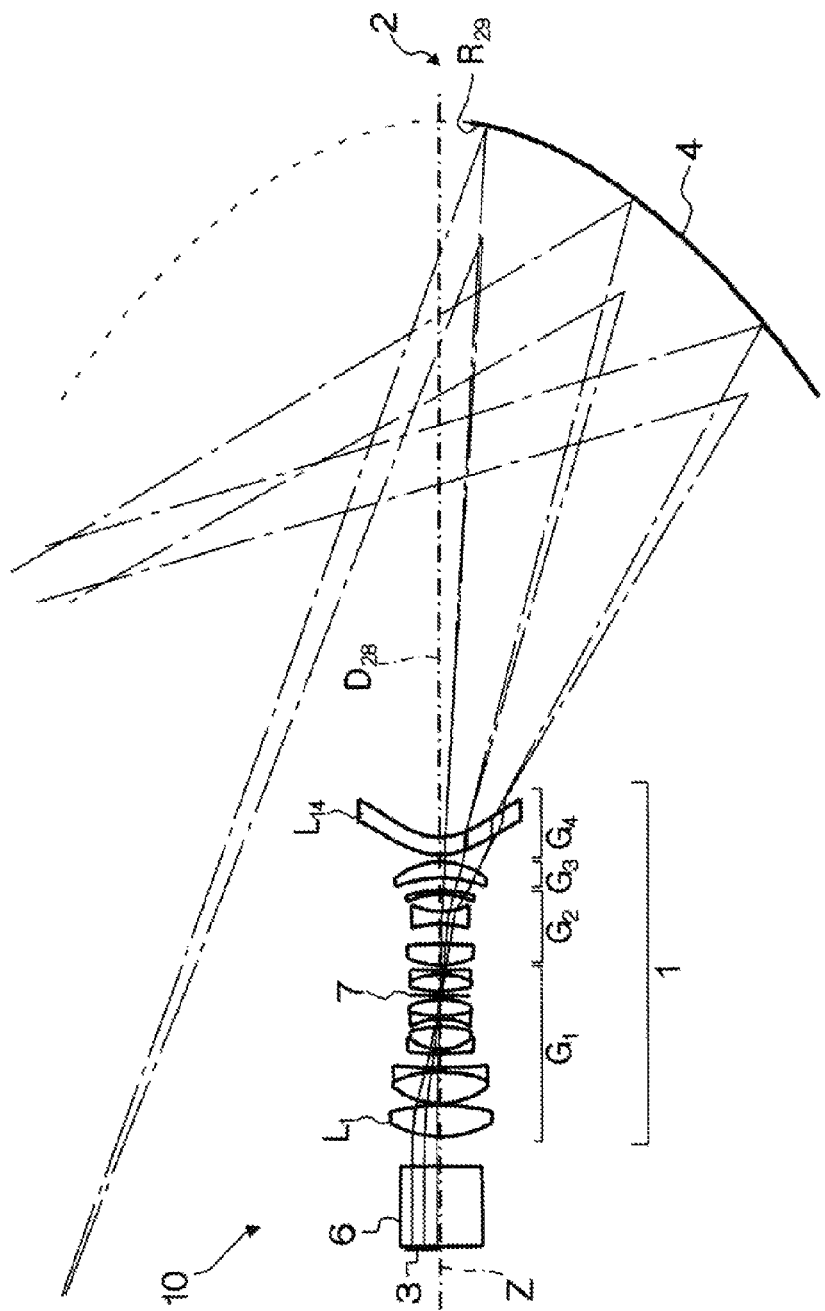
FIG. 6 is a diagram illustrating the structure of a projection optical system according to Example 2.
Figure 7:
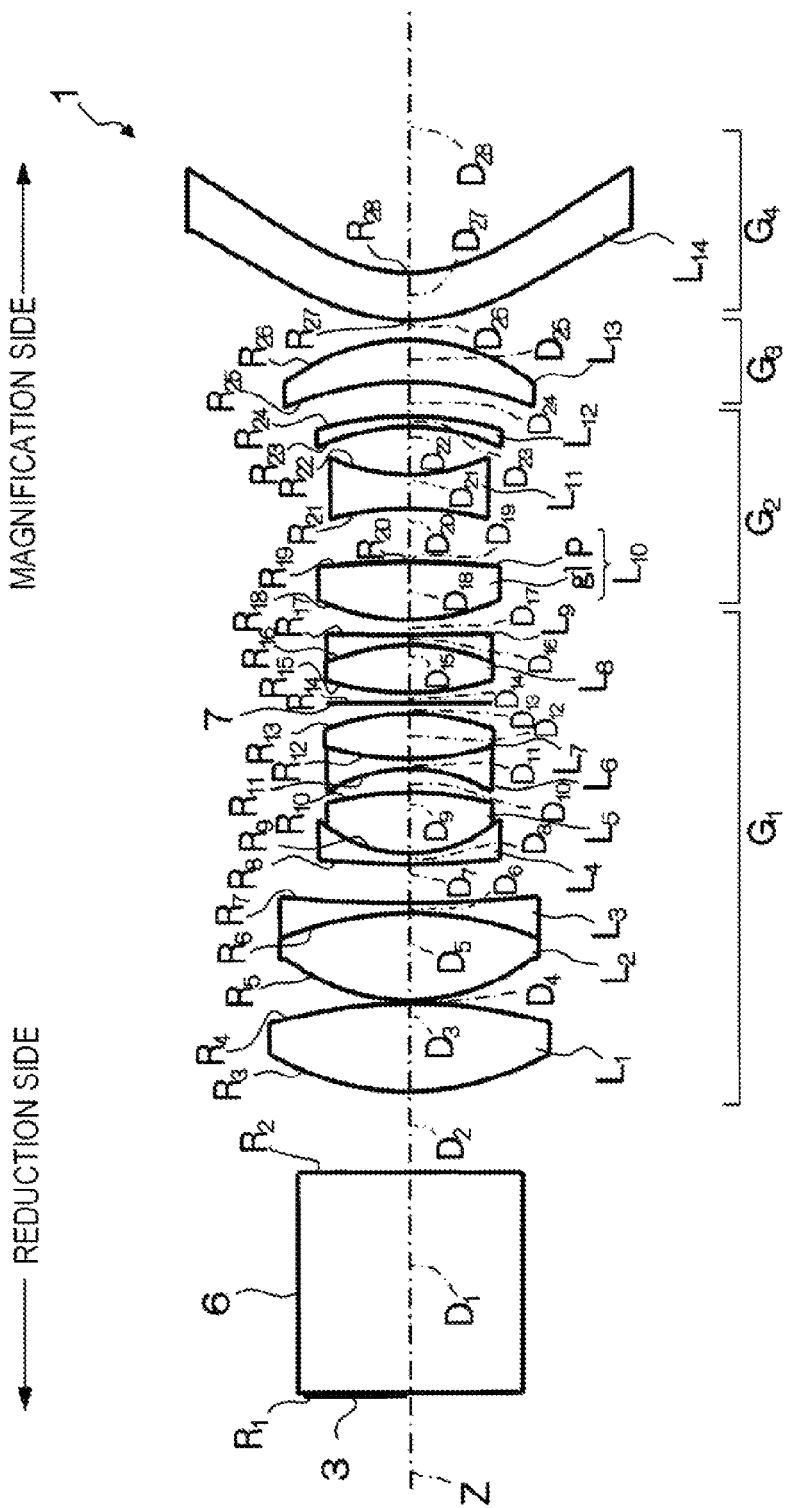
FIG. 7 is a diagram illustrating the detailed structure of a first optical system according to Example 2.

FIG. 6 shows the structure of a projection optical system 10 according to Example 2, and FIG. 7 shows the detailed structure of a first optical system 1 of the projection optical system 10. FIG. 5 shows the structure of a main part of a projection display device 20 including the projection optical system 10 according to Example 2. In FIGS. 5 to 7, members having the same effects and operations as those in Example 1 are denoted by the same reference numerals and a description thereof will be omitted (which is the same as that in the drawings illustrating the structures of Examples 3 to 9).

The projection optical system 10 according to Example 2 has substantially the same structure as that according to Example 1 except that the first lens group $G_1$ of the first optical system 1 includes nine lenses (first to ninth lenses $L_1$ to $L_9$) that do not include any aspheric lens, a lens (tenth lens $L_{10}$) closest to the reduction side in the second lens group $G_2$ is a composite aspheric lens having a biconvex shape (a resin film P is formed on a magnification-side surface of a glass lens gl and a surface closest to the magnification side is an aspheric surface), and a total number of lenses is 14 (first to fourteenth lenses $L_1$ to $L_{14}$), as shown in FIG. 7.

That is, in Example 2, the first lens group $G_1$ includes a first lens $L_1$, which is a biconvex lens, a cemented lens of a second lens $L_2$, which is a biconvex lens, and a third lens $L_3$, which is a biconcave lens, a cemented lens of a fourth lens $L_4$, which is a negative meniscus lens having a concave surface facing the magnification side, and a fifth lens $L_5$, which is a biconvex lens, and a cemented lens of a sixth lens $L_6$, which is a biconcave lens, and a seventh lens $L_7$, which is a biconvex lens, an eighth lens $L_8$, which is a biconvex lens, and a ninth lens $L_9$, which is a biconcave lens. The first to ninth lenses are arranged in this order from the reduction side. In addition, an aperture diaphragm 7 is provided between the seventh lens $L_7$ and the eighth lens $L_8$.

In Example 2, the second lens group $G_2$ includes a tenth lens $L_{10}$, which is a composite aspheric lens in which one surface closest to the magnification side is an aspheric surface, an eleventh lens $L_{11}$, which is a biconcave lens, and a twelfth lens $L_{12}$, which is a negative meniscus lens having a concave surface facing the reduction side, which are arranged in this order from the reduction side. The third lens group $G_3$ and the fourth lens group $G_4$ have the same structure as those in Example 1 except that lens numbers are different.

In Table 3, the upper part shows the curvature radius R of each member surface of the projection optical system 10 according to Example 2, the gap D between the members on the optical axis Z, and the refractive index $N_d$ and the Abbe number $v_d$ of each member with respect to the d-line.

In Table 3, the lower part shows the gaps $D_{17}$, $D_{24}$, $D_{26}$, $D_{28}$, and $D_{29}$ (variables 1 to 5) that vary depending on the projection distance for focusing.

TABLE 3

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.50 | | |
| 3 | 32.45 | 10.32 | 1.4970 | 81.5 |
| 4 | −58.82 | 0.39 | | |
| 5 | 23.55 | 10.17 | 1.4970 | 81.5 |

TABLE 3-continued

| | | | | |
|---|---|---|---|---|
| 6 | −39.60 | 1.20 | 1.8340 | 37.2 |
| 7 | 154.26 | 4.64 | | |
| 8 | 116.98 | 1.20 | 1.8052 | 25.4 |
| 9 | 15.81 | 7.21 | 1.4875 | 70.2 |
| 10 | −36.80 | 2.66 | | |
| 11 | −18.56 | 1.20 | 1.7015 | 41.2 |
| 12 | 35.03 | 5.31 | 1.8467 | 23.8 |
| 13 | −26.92 | 1.20 | | |
| 14 (Aperture diaphragm) | ∞ | 1.27 | | |
| 15 | 34.00 | 5.54 | 1.5174 | 52.4 |
| 16 | −23.85 | 1.20 | 1.8061 | 33.3 |
| 17 | 430.52 | (Variable 1) | | |
| 18 | 25.62 | 6.63 | 1.7725 | 49.6 |
| 19 | −116.57 | 0.15 | 1.5277 | 41.8 |
| 20* | −95.50 | 6.18 | | |
| 21 | −36.58 | 4.00 | 1.8340 | 37.2 |
| 22 | 22.08 | 5.58 | | |
| 23 | −25.25 | 1.19 | 1.7725 | 49.6 |
| 24 | −39.52 | (Variable 2) | | |
| 25 | −36.77 | 4.92 | 1.6034 | 38.0 |
| 26 | −23.23 | (Variable 3) | | |
| 27* | 20.92 | 5.50 | 1.4910 | 57.6 |
| 28* | 17.95 | (Variable 4) | | |
| 29* | −71.17 | (Variable 5) | (Reflecting surface) | |
| 30 | ∞ | | | |
| Variable 1 | | 1.13 | 1.76 | 3.09 |
| Variable 2 | | 4.65 | 4.02 | 2.69 |
| Variable 3 | | 1.05 | 2.35 | 4.56 |
| Variable 4 | | 230.22 | 228.92 | 226.71 |
| Variable 5 (projection distance) | | −412.38 | −450.00 | −563.70 |

*Aspheric surface

Table 4 shows aspheric coefficients of Aspheric expression A representing the aspheric shapes of the tenth lens $L_{10}$, the fourteenth lens $L_{14}$, and the reflecting mirror 4 in Example 2.

TABLE 4

| Aspheric coefficient | | | | | |
|---|---|---|---|---|---|
| Surface number | K | $A_3$ | $A_4$ | $A_5$ | $A_6$ |
| 20 | 3.604 | 0.000E+00 | 4.164E−07 | 0.000E+00 | −3.552E−09 |
| 27 | −1.738 | −3.574E−06 | 1.759E−05 | −7.140E−07 | −2.158E−08 |
| 28 | −0.697 | 8.828E−05 | −1.410E−05 | 9.949E−07 | −5.516E−08 |
| 29 | −1.511 | −3.570E−06 | −2.153E−07 | 4.707E−10 | 1.549E−11 |

| Surface number | $A_7$ | $A_8$ | $A_9$ | $A_{10}$ | $A_{11}$ |
|---|---|---|---|---|---|
| 20 | 0.000E+00 | −2.048E−11 | 0.000E+00 | 9.077E−14 | 0.000E+00 |
| 27 | 2.674E−10 | 5.321E−11 | −4.754E−13 | −5.667E−14 | 9.840E−16 |
| 28 | −4.427E−10 | 9.079E−11 | 5.099E−13 | −1.034E−13 | −2.934E−16 |
| 29 | −2.620E−14 | −1.337E−15 | 8.258E−19 | 7.424E−20 | 2.279E−23 |

| Surface number | $A_{12}$ | $A_{13}$ | $A_{14}$ |
|---|---|---|---|
| 20 | 0.000E+00 | 0.000E+00 | 0.000E+00 |
| 27 | 2.547E−17 | −5.754E−19 | −2.219E−21 |
| 28 | 6.735E−17 | 2.054E−19 | −2.316E−20 |
| 29 | −2.334E−24 | −4.925E−27 | 5.268E−29 |

Table 19 shows values corresponding to Conditional expressions 1 to 4 in the projection optical system 10 according to Example 2. The projection optical system 10 satisfies all of Conditional expressions 1 to 4 and also satisfies Conditional expressions 1A, 2A, 2C, 3A, and 4A.

Figure 8A:
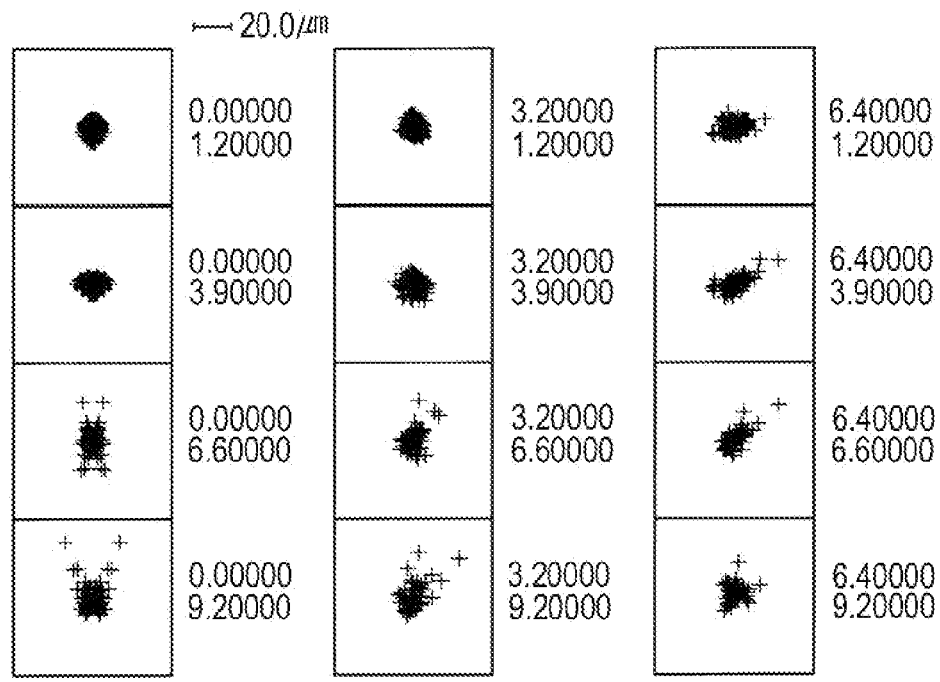
FIG. 8A is a diagram illustrating spots with respect to the d-line, the F-line, and the C-line on a screen of the projection optical system according to Example 2.
Figure 8B:
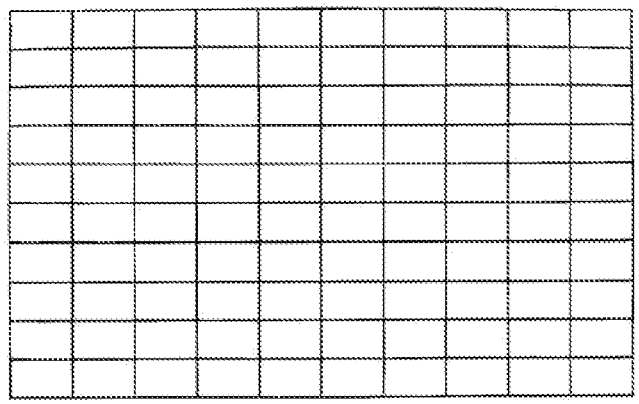
FIG. 8B is a diagram illustrating a distortion grid.

As can be seen from diagrams (FIG. 8A) illustrating spots on the screen and a distortion grid (FIG. 8B) in FIGS. 8A and 8B, the projection optical system 10 is a high-performance projection optical system capable of effectively correcting chromatic aberration and distortion.

Example 3

Figure 9:
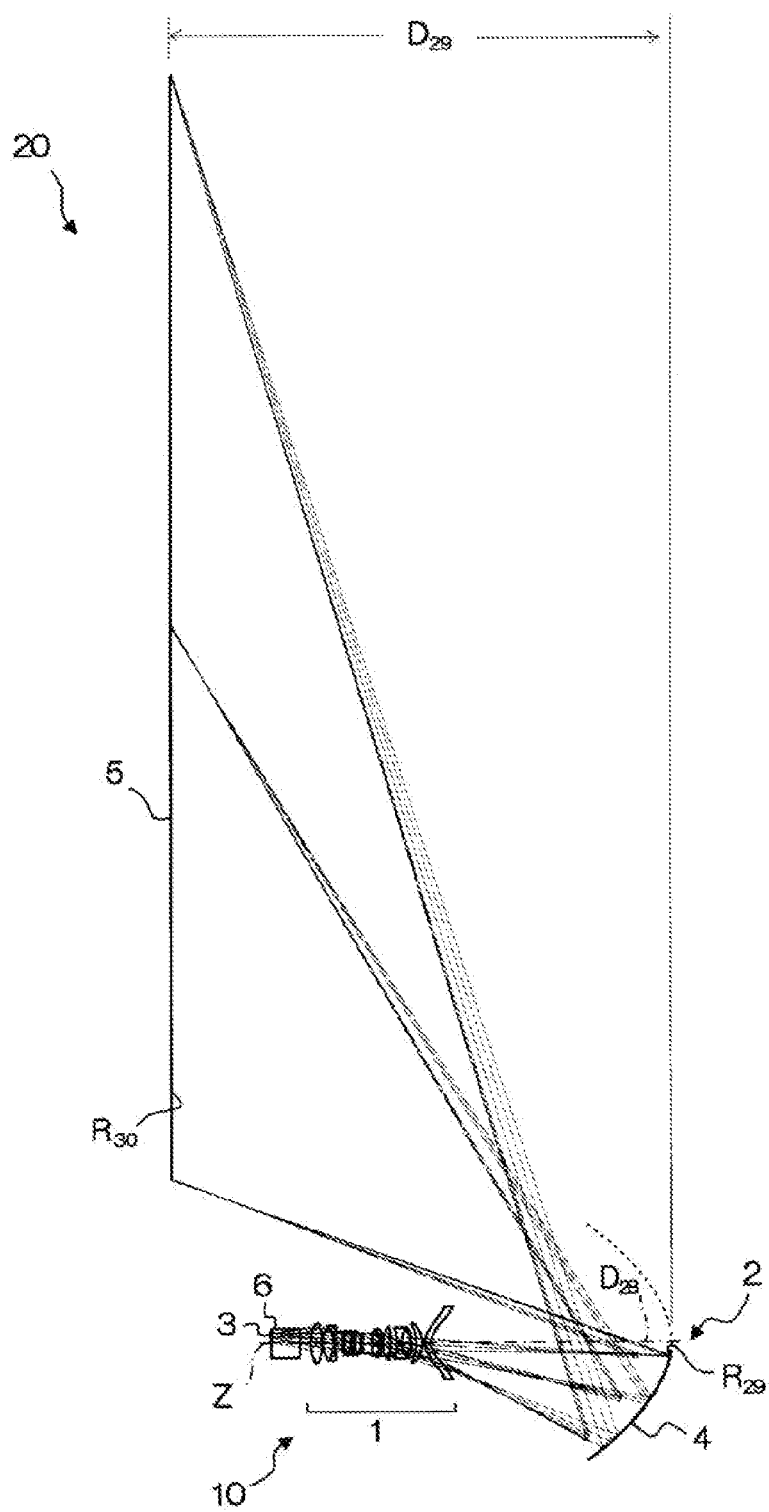
FIG. 9 is a diagram illustrating the structure of a main part of a projection display device according to Example 3.
Figure 10:
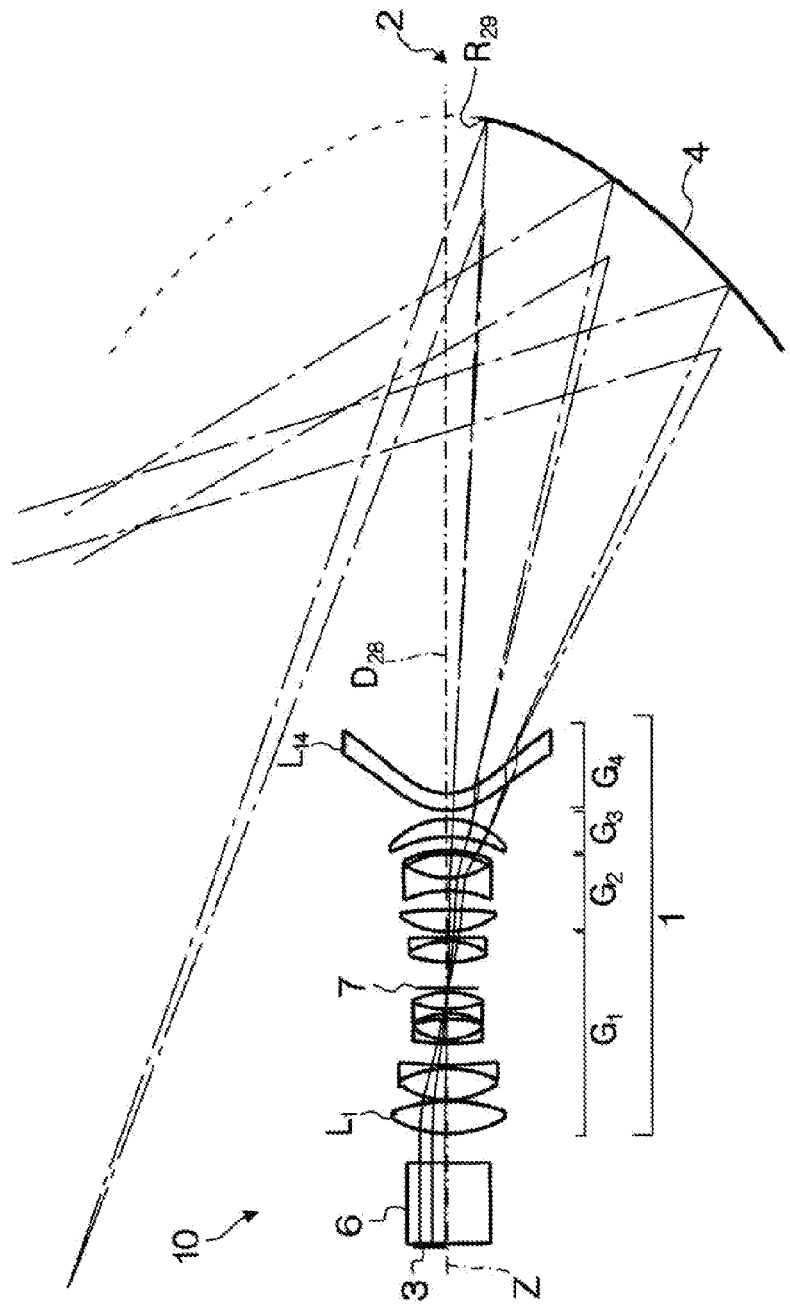
FIG. 10 is a diagram illustrating the structure of a projection optical system according to Example 3.
Figure 11:
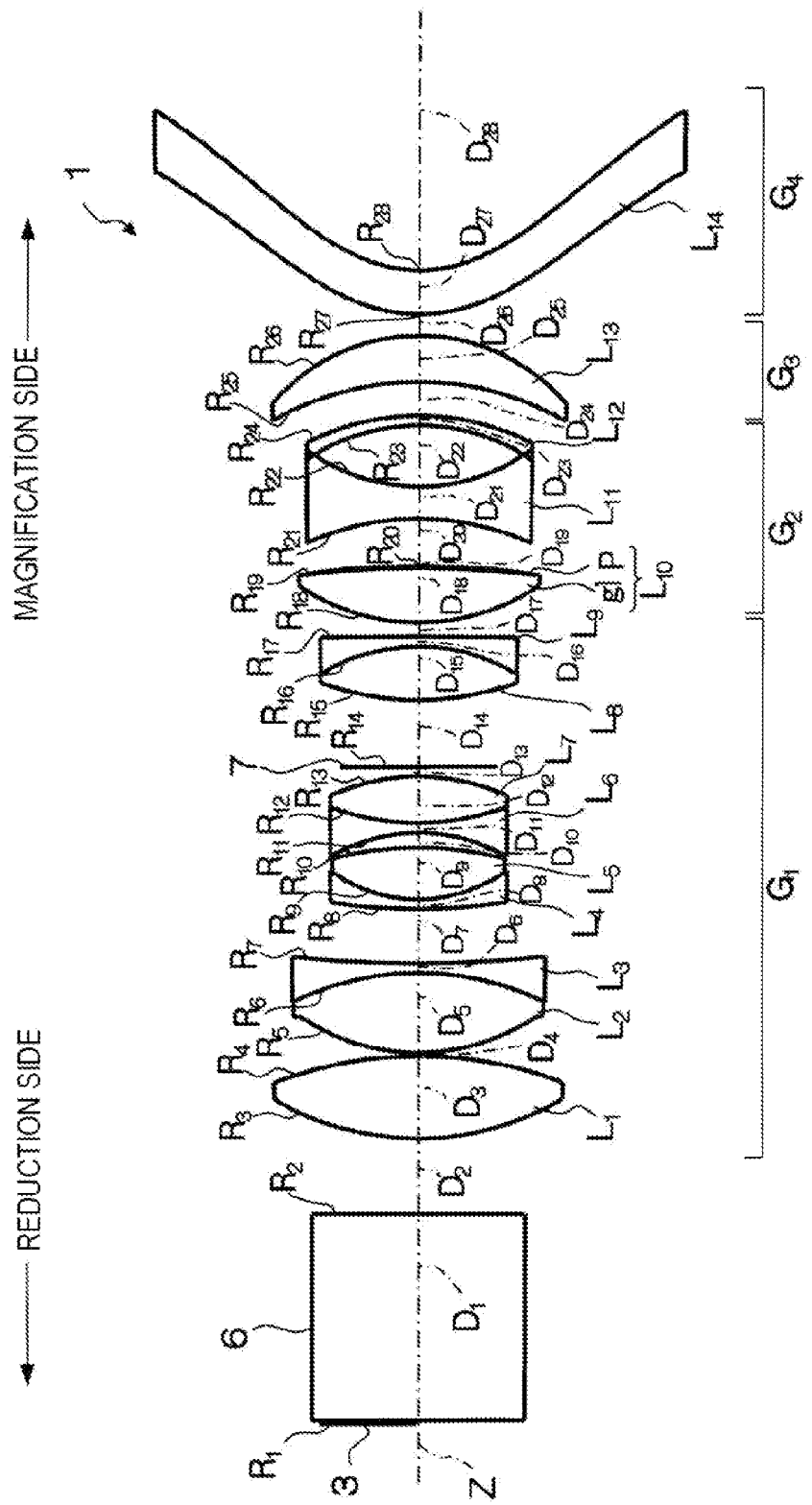
FIG. 11 is a diagram illustrating the detailed structure of a first optical system according to Example 3.

FIG. 10 shows the structure of a projection optical system 10 according to Example 3 and FIG. 11 shows the detailed structure of a first optical system 1 of the projection optical system 10. FIG. 9 shows the structure of a main part of a projection display device 20 including the projection optical system 10 according to Example 3.

The projection optical system 10 according to Example 3 has substantially the same structure as that according to Example 2 except that a lens (ninth lens $L_9$) closest to the magnification side in the first lens group $G_1$ of the first optical system 1 is a negative meniscus lens having a concave surface facing the reduction side.

In Table 5, the upper part shows the curvature radius R of each member surface of the projection optical system 10 according to Example 3, the gap D between the members on the optical axis Z, and the refractive index $N_d$ and the Abbe number $v_d$ of each member with respect to the d-line.

In Table 5, the lower part shows the gaps $D_{17}$, $D_{24}$, $D_{26}$, $D_{28}$, and $D_{29}$ (variables 1 to 5) that vary depending on the projection distance for focusing.

TABLE 5

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.50 | | |
| 3 | 35.43 | 10.28 | 1.4970 | 81.5 |
| 4 | −51.31 | 0.40 | | |
| 5 | 26.18 | 10.06 | 1.4970 | 81.5 |

TABLE 5-continued

| | | | | |
|---|---|---|---|---|
| 6 | −35.33 | 1.20 | 1.8061 | 33.3 |
| 7 | 145.96 | 6.78 | | |
| 8 | 72.08 | 1.20 | 1.8052 | 25.4 |
| 9 | 18.46 | 6.54 | 1.4875 | 70.2 |
| 10 | −41.47 | 1.92 | | |
| 11 | −21.31 | 1.20 | 1.8340 | 37.2 |
| 12 | 30.91 | 5.80 | 1.8467 | 23.8 |
| 13 | −26.32 | 1.20 | | |
| 14 (Aperture diaphragm) | ∞ | 8.43 | | |
| 15 | 36.57 | 6.74 | 1.5174 | 52.4 |

TABLE 5-continued

| | | | | |
|---|---|---|---|---|
| 16 | −23.27 | 1.20 | 1.8061 | 33.3 |
| 17 | −775.06 | (Variable 1) | | |
| 18 | 26.40 | 6.89 | 1.7725 | 49.6 |
| 19 | −116.39 | 0.15 | 1.5277 | 41.8 |
| 20* | −153.64 | 5.99 | | |
| 21 | −33.84 | 4.00 | 1.8061 | 40.9 |
| 22 | 23.48 | 7.66 | | |
| 23 | −24.86 | 1.20 | 1.7725 | 49.6 |
| 24 | −30.94 | (Variable 2) | | |
| 25 | −36.34 | 5.78 | 1.5673 | 42.8 |
| 26 | −23.92 | (Variable 3) | | |
| 27* | 19.42 | 5.50 | 1.4910 | 57.6 |
| 28* | 17.00 | (Variable 4) | | |
| 29* | −62.36 | (Variable 5) | (Reflecting surface) | |
| 30 | ∞ | | | |
| Variable 1 | | 1.08 | 1.72 | 3.54 |
| Variable 2 | | 4.87 | 4.23 | 2.41 |
| Variable 3 | | 1.15 | 2.65 | 5.84 |
| Variable 4 | | 217.80 | 216.30 | 213.11 |
| Variable 5 (projection distance) | | −411.50 | −450.00 | −566.03 |

*Aspheric surface

Table 6 shows aspheric coefficients of Aspheric expression A representing the aspheric shapes of the tenth lens $L_{10}$, the fourteenth lens $L_{14}$, and the reflecting mirror 4 in Example 3.

TABLE 6

Aspheric coefficient

| Surface number | K | $A_3$ | $A_4$ | $A_5$ | $A_6$ |
|---|---|---|---|---|---|
| 20 | −7.381 | 0.000E+00 | −9.298E−06 | 0.000E+00 | −6.751E−10 |
| 27 | −0.931 | −4.007E−05 | 1.936E−05 | −2.225E−07 | −3.938E−08 |
| 28 | 0.000 | 2.824E−05 | −9.729E−06 | 8.550E−07 | −6.314E−08 |
| 29 | −1.222 | 7.497E−07 | −2.563E−07 | 7.706E−10 | 1.229E−11 |

| Surface number | $A_7$ | $A_8$ | $A_9$ | $A_{10}$ | $A_{11}$ |
|---|---|---|---|---|---|
| 20 | 0.000E+00 | 1.937E−11 | 0.000E+00 | −8.725E−15 | 0.000E+00 |
| 27 | 1.452E−11 | 5.821E−11 | −3.026E−13 | −5.621E−14 | 9.059E−16 |
| 28 | −6.488E−10 | 9.389E−11 | 8.333E−13 | −9.532E−14 | −3.688E−16 |
| 29 | −3.661E−14 | −1.172E−15 | 1.657E−18 | 7.769E−20 | 1.856E−24 |

| Surface number | $A_{12}$ | $A_{13}$ | $A_{14}$ |
|---|---|---|---|
| 20 | 0.000E+00 | 0.000E+00 | 0.000E+00 |
| 27 | 2.384E−17 | −5.513E−19 | −4.844E−22 |
| 28 | 5.530E−17 | −6.850E−20 | −1.118E−20 |
| 29 | −3.181E−24 | −7.850E−27 | 9.702E−29 |

Table 19 shows values corresponding to Conditional expressions 1 to 4 in the projection optical system 10 according to Example 3. The projection optical system 10 satisfies all of Conditional expressions 1 to 4 and also satisfies Conditional expressions 1A, 2A, 2C, 3A, and 4A.

Figure 12A:
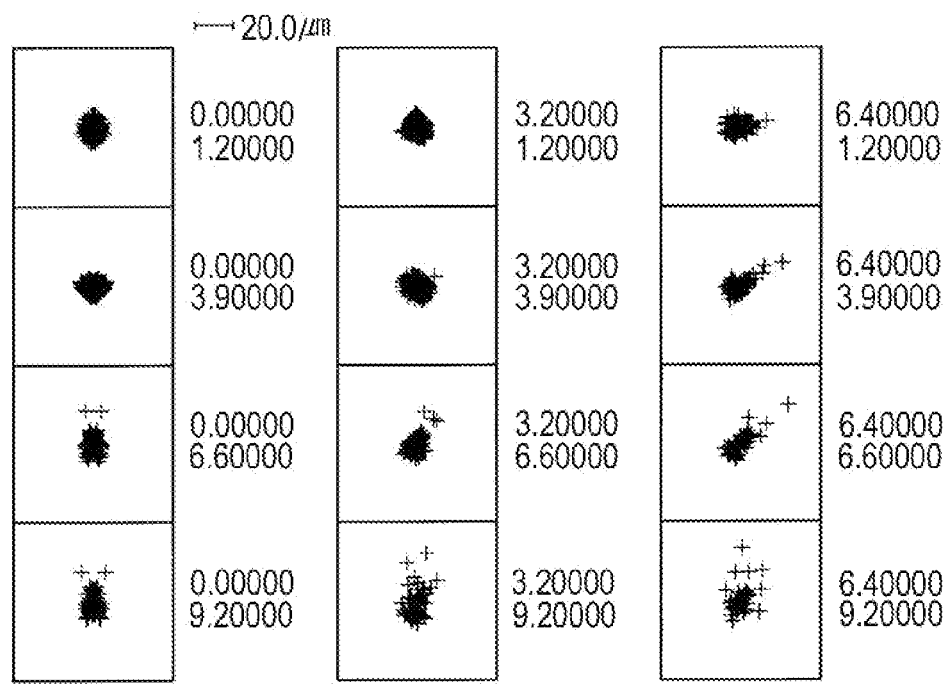
FIG. 12A is a diagram illustrating spots with respect to the d-line, the F-line, and the C-line on a screen of the projection optical system according to Example 3.
Figure 12B:
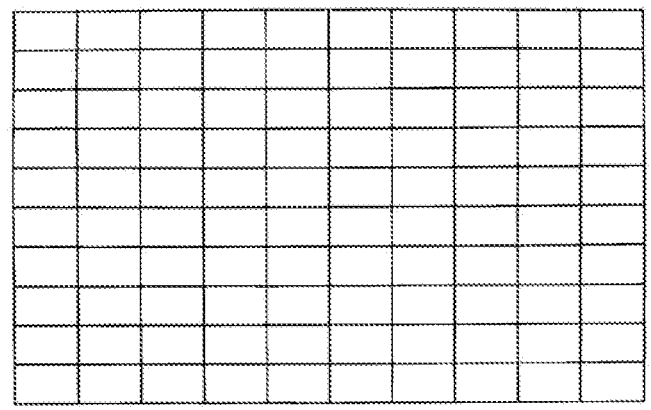
FIG. 12B is a diagram illustrating a distortion grid.

As can be seen from diagrams (FIG. 12A) illustrating spots on the screen and a distortion grid (FIG. 12B) in FIGS. 12A and 12B, the projection optical system 10 is a high-performance projection optical system capable of effectively correcting chromatic aberration and distortion.

Example 4

Figure 13:
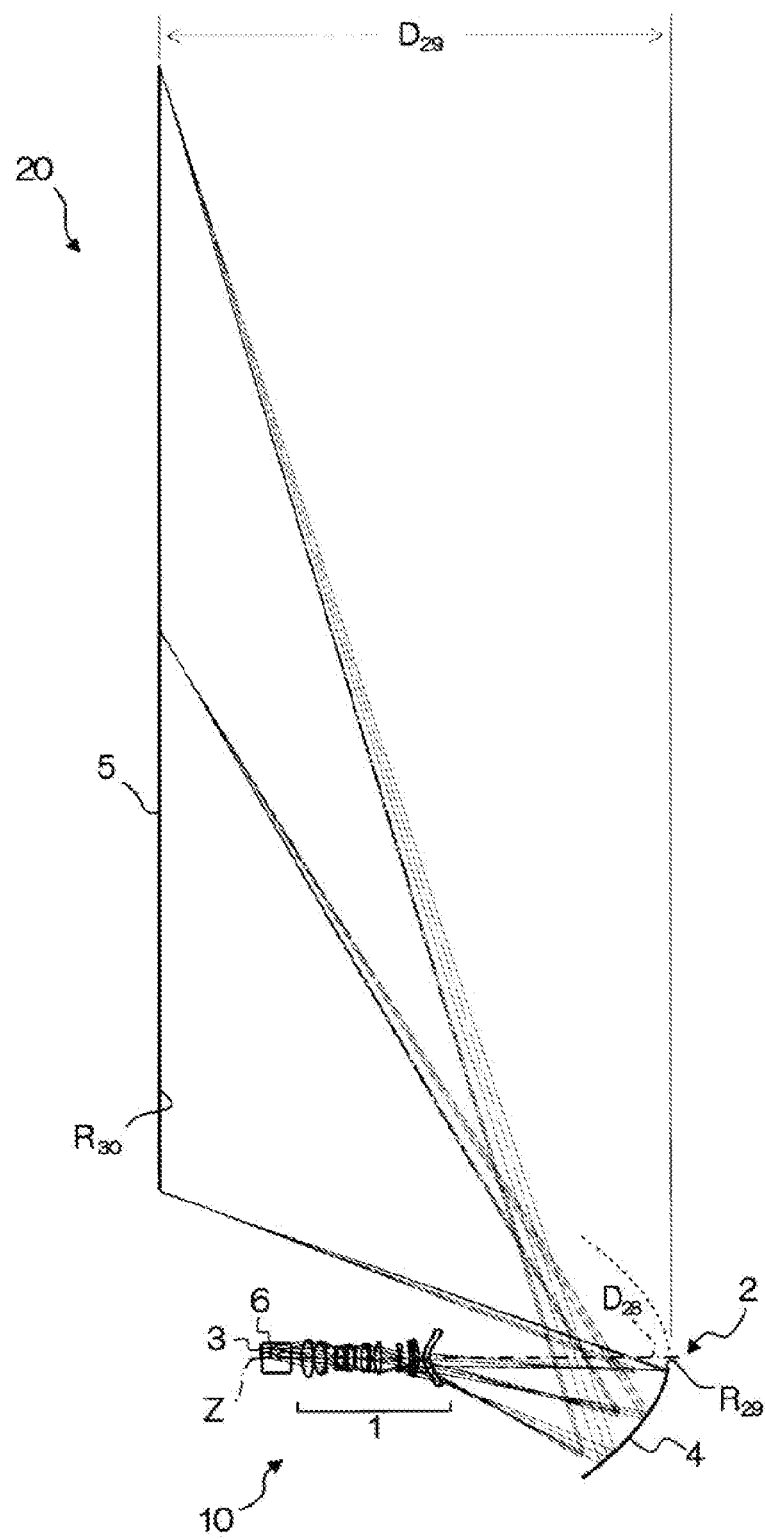
FIG. 13 is a diagram illustrating the structure of a main part of a projection display device according to Example 4.
Figure 14:
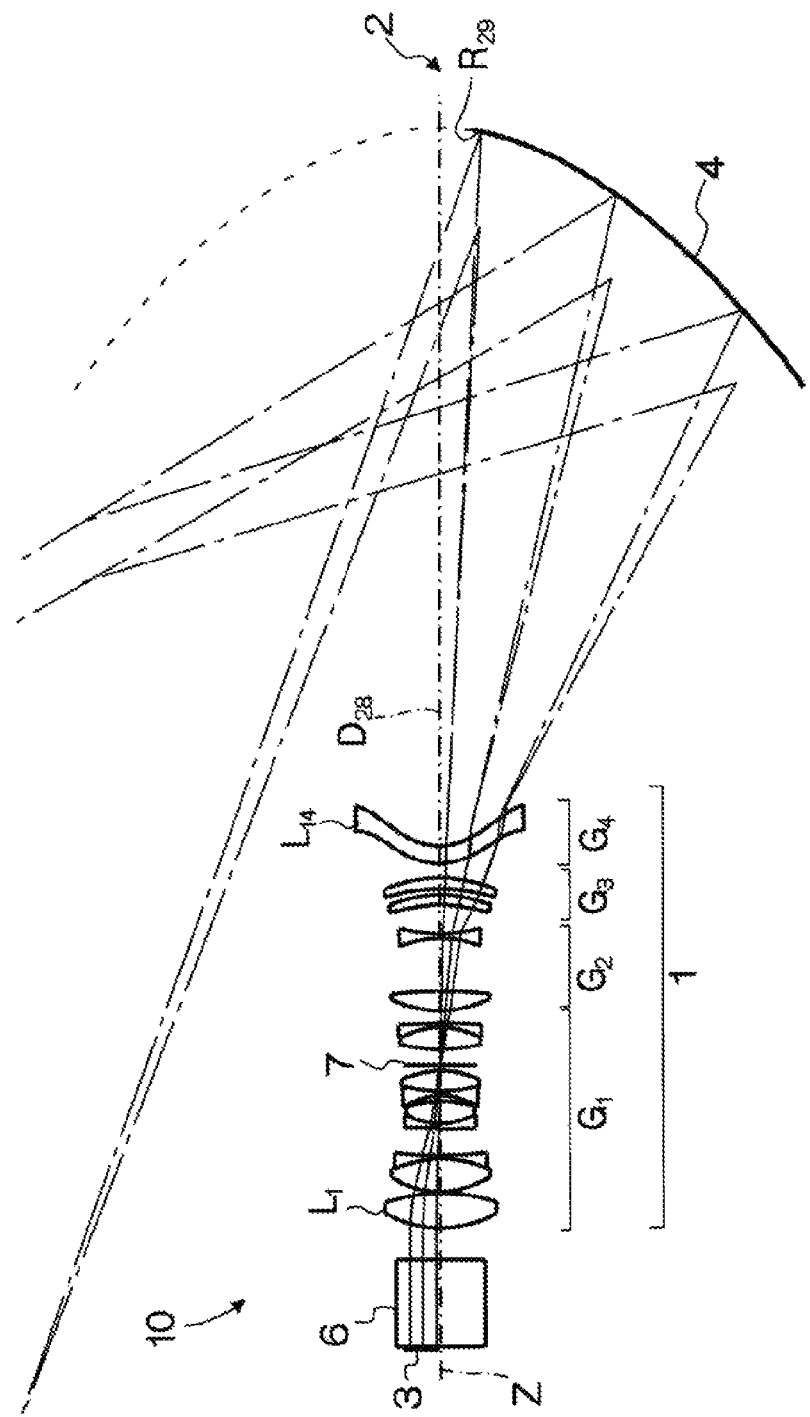
FIG. 14 is a diagram illustrating the structure of a projection optical system according to Example 4.
Figure 15:
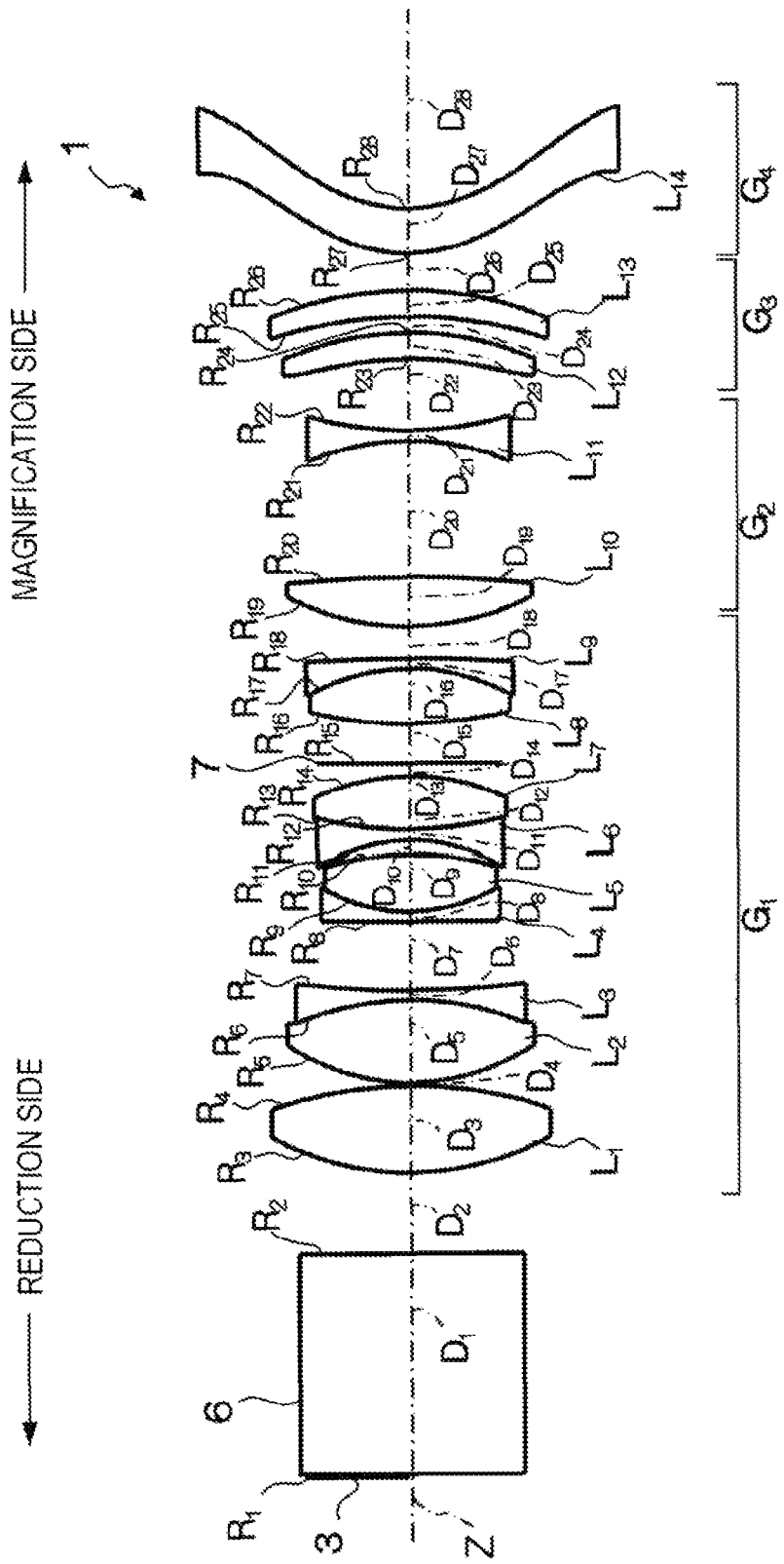
FIG. 15 is a diagram illustrating the detailed structure of a first optical system according to Example 4.

FIG. 14 shows the structure of a projection optical system 10 according to Example 4 and FIG. 15 shows the detailed structure of a first optical system 1 of the projection optical system 10. FIG. 13 shows the structure of a main part of a projection display device 20 including the projection optical system 10 according to Example 4.

The projection optical system 10 according to Example 4 has substantially the same structure as that according to Example 2 except that each of the sixth lens $L_6$ and the seventh lens $L_7$ is a single lens and the ninth lens $L_9$ is a negative meniscus lens having a concave surface facing the reduction side in the first lens group $G_1$ of the first optical system 1; the second lens group $G_2$ includes two single lenses (a tenth lens $L_{10}$, which is a biconvex lens, and an eleventh lens $L_{11}$, which is a biconcave lens); and the third lens group $G_3$ includes two single lenses (a twelfth lens $L_{12}$, which is an aspheric lens having aspheric surfaces on both sides, and a thirteenth lens $L_{13}$, which is a positive meniscus lens having a convex surface facing the magnification side).

In Table 7, the upper part shows the curvature radius R of each member surface of the projection optical system 10 according to Example 4, the gap D between the members on the optical axis Z, and the refractive index $N_d$ and the Abbe number $v_d$ of each member with respect to the d-line.

In Table 7, the lower part shows the gaps $D_{18}$, $D_{22}$, $D_{26}$, and $D_{29}$ (variables 1 to 4) that vary depending on the projection distance for focusing.

TABLE 7

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.50 | | |

TABLE 7-continued

| | | | | |
|---|---|---|---|---|
| 3 | 33.66 | 10.16 | 1.4970 | 81.5 |
| 4 | −51.10 | 0.40 | | |
| 5 | 25.90 | 9.70 | 1.4970 | 81.5 |
| 6 | −34.35 | 1.20 | 1.8340 | 37.2 |
| 7 | 116.75 | 8.00 | | |
| 8 | 781.29 | 1.20 | 1.8052 | 25.4 |
| 9 | 20.01 | 6.70 | 1.4875 | 70.2 |
| 10 | −35.76 | 1.68 | | |
| 11 | −19.79 | 1.20 | 1.7453 | 37.6 |
| 12 | 42.53 | 0.03 | | |
| 13 | 42.66 | 6.16 | 1.8467 | 23.8 |
| 14 | −26.43 | 1.49 | | |
| 15 (Aperture diaphragm) | ∞ | 4.68 | | |
| 16 | 50.14 | 6.48 | 1.5174 | 52.4 |
| 17 | −24.22 | 1.20 | 1.8061 | 33.3 |
| 18 | −185.06 | (Variable 1) | | |
| 19 | 31.22 | 5.87 | 1.6257 | 60.2 |
| 20 | −129.26 | 15.90 | | |
| 21 | −30.43 | 1.20 | 1.8100 | 45.2 |
| 22 | 43.49 | (Variable 2) | | |

TABLE 7-continued

| | | | | |
|---|---|---|---|---|
| 23* | −40.14 | 3.00 | 1.5101 | 56.2 |
| 24* | −41.19 | 1.94 | | |
| 25 | −51.67 | 3.07 | 1.7001 | 30.0 |
| 26 | −42.07 | (Variable 3) | | |
| 27* | 19.87 | 5.20 | 1.4910 | 57.6 |
| 28* | 19.33 | 212.00 | | |
| 29* | −61.62 | (Variable 4) | (Reflecting surface) | |
| 30 | ∞ | | | |
| Variable 1 | | 1.89 | 3.71 | 8.30 |
| Variable 2 | | 9.49 | 8.43 | 5.73 |
| Variable 3 | | 5.14 | 4.38 | 2.48 |
| Variable 4 (projection distance) | | −407.85 | −450.00 | −580.10 |

*Aspheric surface

Table 8 shows aspheric coefficients of Aspheric expression A representing the aspheric shapes of the twelfth lens $L_{12}$, the fourteenth lens $L_{14}$, and the reflecting mirror 4 in Example 4.

TABLE 8

Aspheric coefficient

| Surface number | K | $A_3$ | $A_4$ | $A_5$ | $A_6$ |
|---|---|---|---|---|---|
| 23 | −1.388 | −3.219E−05 | −3.391E−05 | 3.896E−06 | 7.819E−08 |
| 24 | −4.279 | −1.094E−04 | −2.694E−05 | 4.413E−07 | 9.351E−08 |
| 27 | −0.005 | 2.717E−05 | 2.120E−05 | −1.265E−06 | −3.654E−08 |
| 28 | 0.000 | 8.334E−05 | 2.760E−05 | −4.760E−07 | −1.086E−07 |
| 29 | −1.375 | −4.533E−06 | −2.085E−07 | 5.350E−10 | 1.213E−11 |

| Surface number | $A_7$ | $A_8$ | $A_9$ | $A_{10}$ | $A_{11}$ |
|---|---|---|---|---|---|
| 23 | −5.737E−09 | −4.604E−10 | −1.274E−11 | 4.541E−13 | 7.841E−14 |
| 24 | 2.032E−09 | −1.708E−10 | −1.627E−11 | −5.649E−13 | 1.156E−14 |
| 27 | 4.209E−10 | 5.694E−11 | −8.980E−13 | −7.733E−14 | 9.043E−16 |
| 28 | −6.347E−10 | 1.327E−10 | 2.211E−12 | −7.643E−14 | −1.001E−15 |
| 29 | −2.870E−14 | −1.146E−15 | 1.474E−18 | 7.487E−20 | −1.149E−23 |

| Surface number | $A_{12}$ | $A_{13}$ | $A_{14}$ | $A_{15}$ | $A_{16}$ |
|---|---|---|---|---|---|
| 23 | 5.237E−15 | 1.442E−16 | −2.008E−17 | 0.000E+00 | 0.000E+00 |
| 24 | 2.740E−15 | 1.555E−16 | −1.279E−18 | 0.000E+00 | 0.000E+00 |
| 27 | 5.958E−17 | 1.146E−18 | −6.576E−21 | 1.231E−21 | 7.767E−24 |
| 28 | 7.139E−18 | −1.213E−18 | 3.398E−20 | −1.226E−22 | −5.061E−25 |
| 29 | −3.144E−24 | −6.890E−27 | 9.716E−29 | 0.000E+00 | 0.000E+00 |

| Surface number | $A_{17}$ | $A_{18}$ | $A_{19}$ | $A_{20}$ |
|---|---|---|---|---|
| 23 | 0.000E+00 | 0.000E+00 | 0.000E+00 | 0.000E+00 |
| 24 | 0.000E+00 | 0.000E+00 | 0.000E+00 | 0.000E+00 |
| 27 | −1.888E−24 | −1.746E−25 | −4.588E−27 | 2.999E−28 |
| 28 | 9.698E−26 | 5.568E−27 | 7.903E−29 | −1.555E−30 |
| 29 | 0.000E+00 | 0.000E+00 | 0.000E+00 | 0.000E+00 |

Table 19 shows values corresponding to Conditional expressions 1 to 4 in the projection optical system 10 according to Example 4. The projection optical system 10 satisfies all of Conditional expressions 1 to 4 and also satisfies Conditional expressions 1A, 2A, 2C, 3A, and 4A.

Figure 16A:
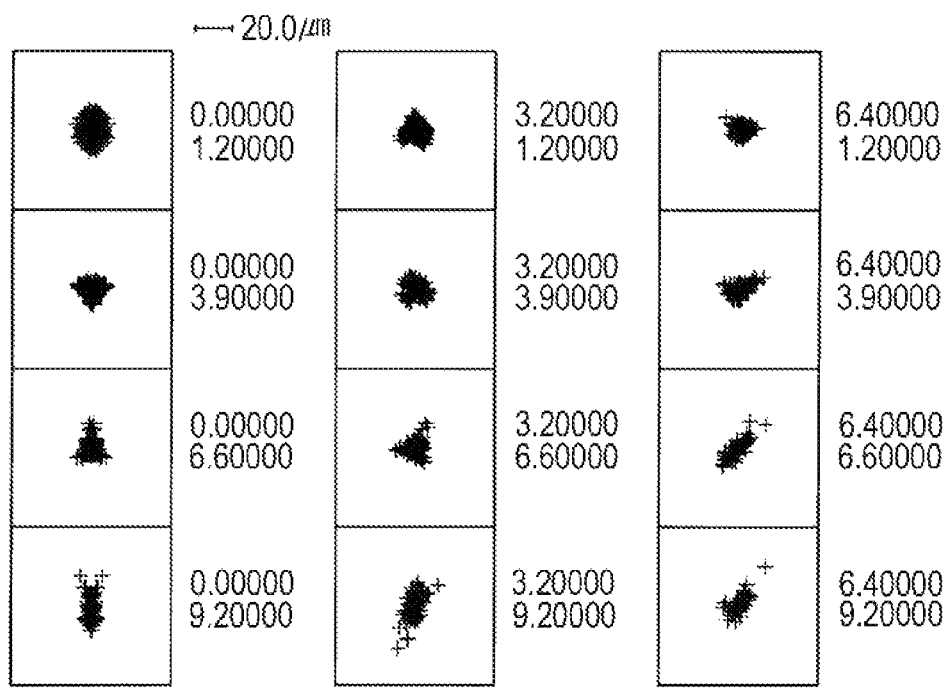
FIG. 16A is a diagram illustrating spots with respect to the d-line, the F-line, and the C-line on a screen of the projection optical system according to Example 4.
Figure 16B:
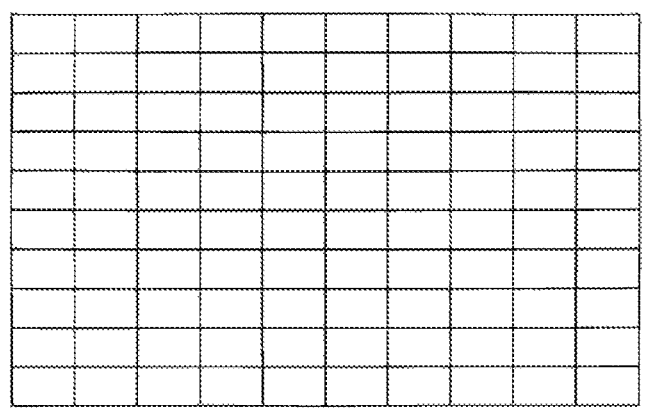
FIG. 16B is a diagram illustrating a distortion grid.

As can be seen from diagrams (FIG. 16A) illustrating spots on the screen and a distortion grid (FIG. 16B) in FIGS. 16A and 16B, the projection optical system 10 is a high-performance projection optical system capable of effectively correcting chromatic aberration and distortion.

Example 5

Figure 17:
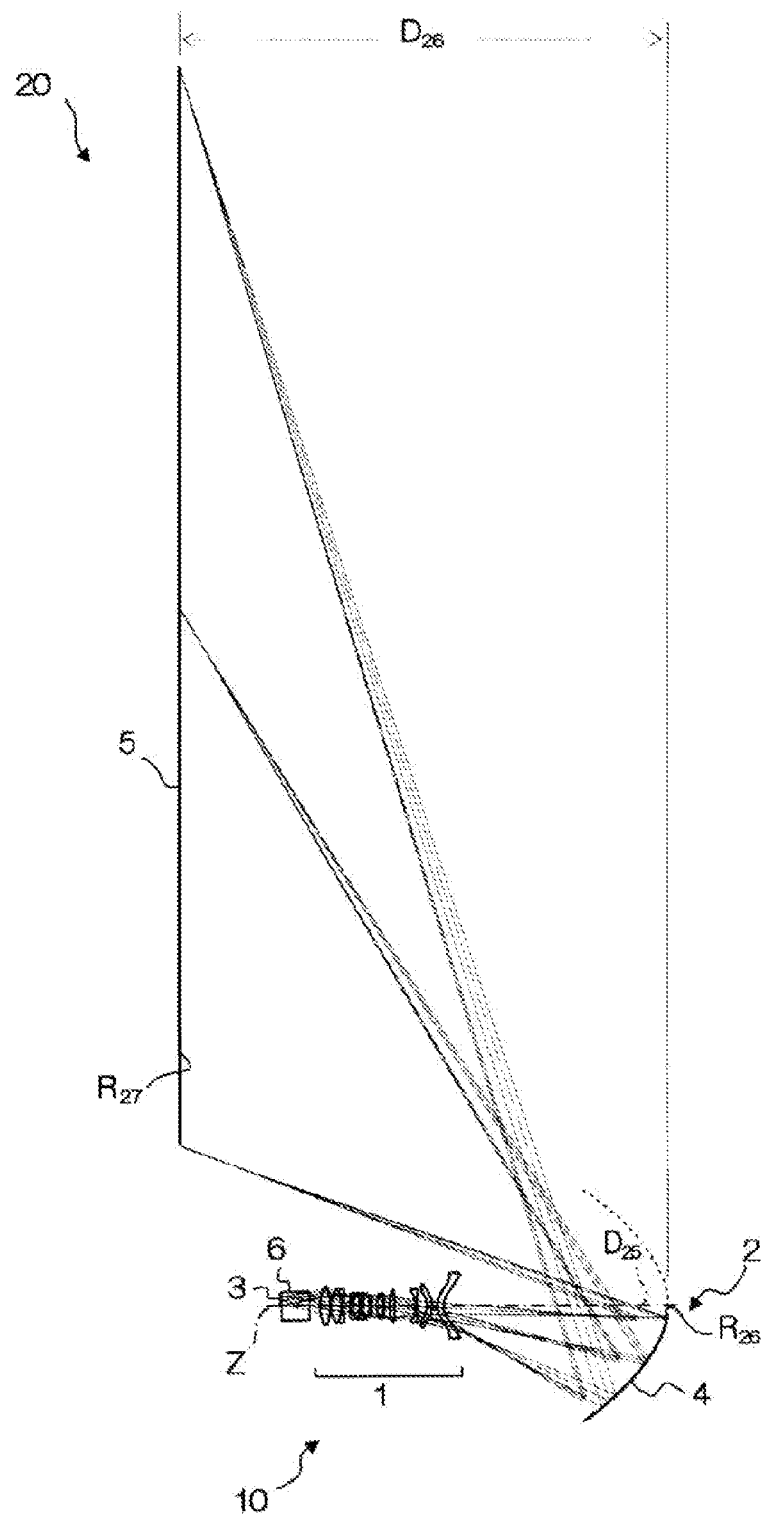
FIG. 17 is a diagram illustrating the structure of a main part of a projection display device according to Example 5.
Figure 18:
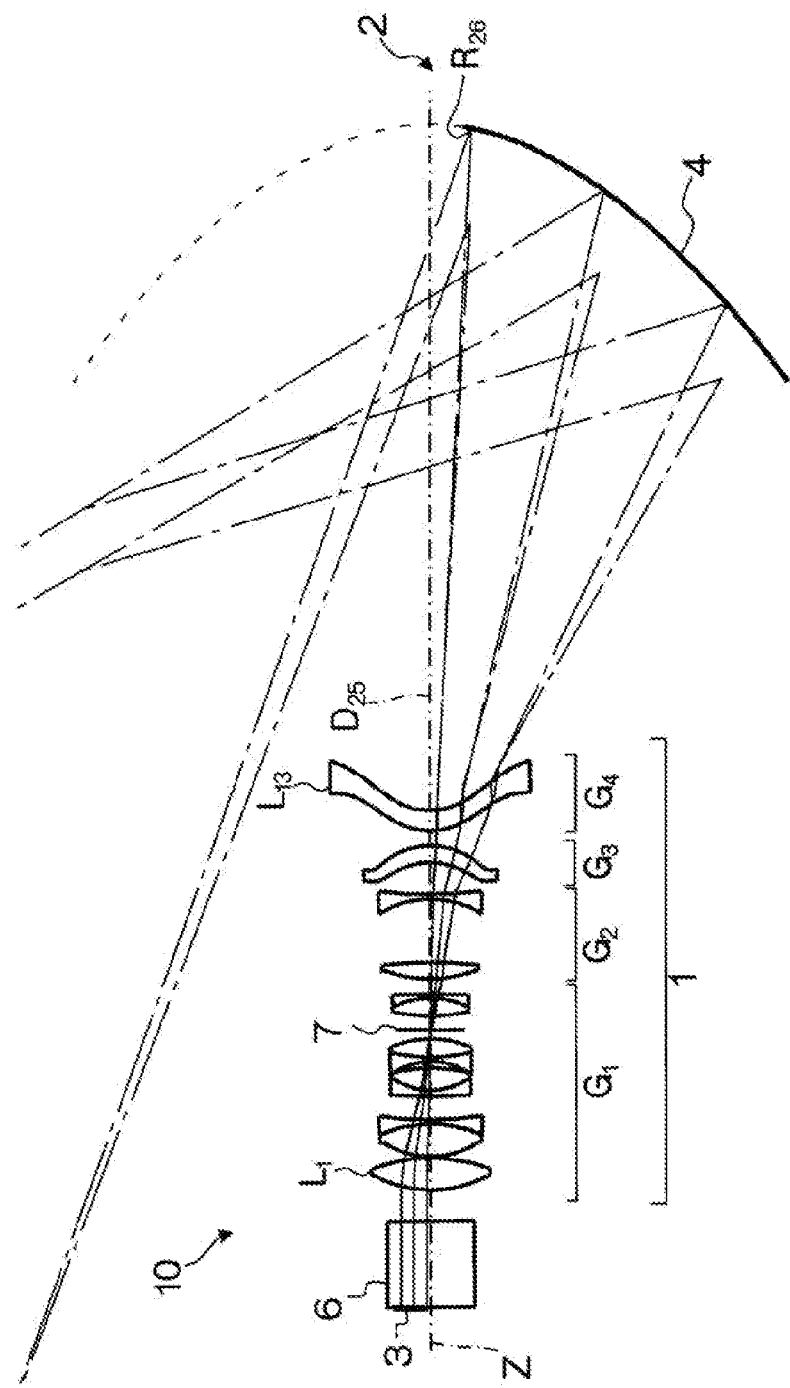
FIG. 18 is a diagram illustrating the structure of a projection optical system according to Example 5.
Figure 19:
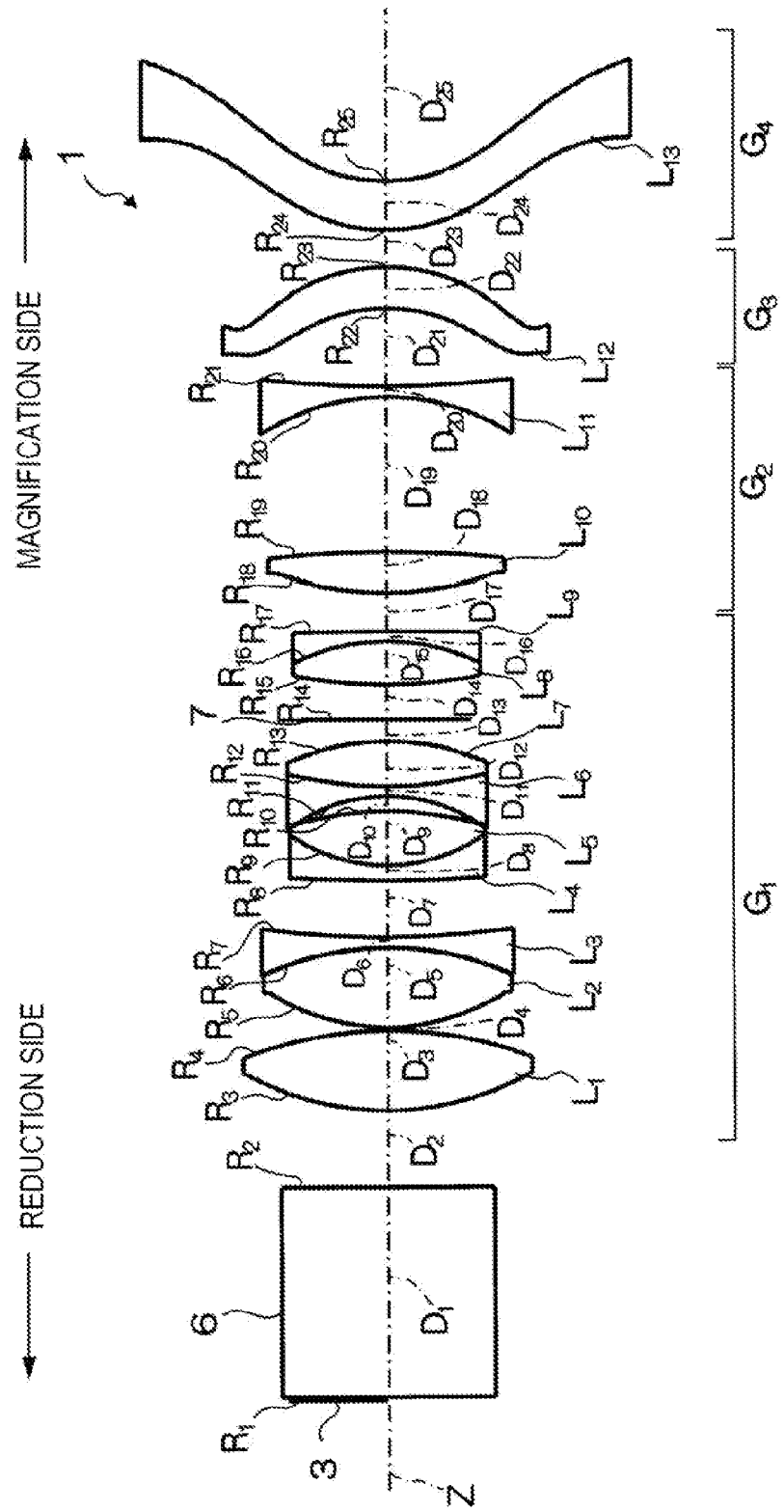
FIG. 19 is a diagram illustrating the detailed structure of a first optical system according to Example 5.

FIG. 18 shows the structure of a projection optical system 10 according to Example 5 and FIG. 19 shows the detailed structure of a first optical system 1 of the projection optical system 10. FIG. 17 shows the structure of a main part of a projection display device 20 including the projection optical system 10 according to Example 5.

The projection optical system 10 according to Example 5 has substantially the same structure as that according to Example 2 except that the ninth lens $L_9$ is a negative meniscus lens having a concave surface facing the reduction side in the first lens group $G_1$ of the first optical system 1, the second lens group $G_2$ includes two single lenses (a tenth lens $L_{10}$, which is a biconvex lens, and an eleventh lens $L_{11}$, which is a biconcave lens), the third lens group $G_3$ includes one single lens (a twelfth lens $L_{12}$ which is an aspheric lens having aspheric surfaces on both sides), and a total number of lenses is 13 (first to thirteenth lenses $L_1$ to $L_{13}$).

In Table 9, the upper part shows the curvature radius R of each member surface of the projection optical system 10 according to Example 5, the gap D between the members on the optical axis Z, and the refractive index $N_d$ and the Abbe number $v_d$ of each member with respect to the d-line.

In Table 9, the lower part shows the gaps $D_{17}$, $D_{21}$, $D_{25}$, and $D_{26}$ (variables 1 to 4) that vary depending on the projection distance for focusing.

TABLE 9

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.50 | | |
| 3 | 36.08 | 9.86 | 1.4970 | 81.5 |
| 4 | −49.20 | 0.40 | | |
| 5 | 26.83 | 9.87 | 1.4970 | 81.5 |
| 6 | −36.81 | 1.30 | 1.8340 | 37.2 |
| 7 | 111.77 | 6.95 | | |
| 8 | 176.23 | 1.82 | 1.8052 | 25.4 |
| 9 | 20.27 | 6.79 | 1.4875 | 70.2 |
| 10 | −42.48 | 1.91 | | |

TABLE 9-continued

| | | | | |
|---|---|---|---|---|
| 11 | −19.91 | 1.20 | 1.6200 | 36.3 |
| 12 | 50.65 | 5.54 | 1.8467 | 23.8 |
| 13 | −29.81 | 2.64 | | |
| 14 (Aperture diaphragm) | ∞ | 4.35 | | |
| 15 | 58.22 | 5.42 | 1.5174 | 52.4 |
| 16 | −25.40 | 1.20 | 1.8340 | 37.2 |
| 17 | −639.21 | (Variable 1) | | |
| 18 | 39.15 | 4.99 | 1.6968 | 55.5 |
| 19 | −132.19 | 19.03 | | |
| 20 | −28.49 | 1.30 | 1.7725 | 49.6 |
| 21 | 141.45 | (Variable 2) | | |
| 22* | −19.74 | 5.05 | 1.4910 | 57.6 |
| 23* | −21.48 | 4.54 | | |
| 24* | 24.61 | 6.10 | 1.4910 | 57.6 |
| 25* | 24.44 | (Variable 3) | | |
| 26* | −61.53 | (Variable 4) | (Reflecting surface) | |
| 27 | ∞ | | | |
| Variable 1 | | 2.95 | 4.64 | 7.97 |
| Variable 2 | | 10.31 | 9.64 | 8.31 |
| Variable 3 | | 207.86 | 206.85 | 204.85 |
| Variable 4 (projection distance) | | −405.55 | −450.00 | −584.85 |

*Aspheric surface

Table 10 shows aspheric coefficients of Aspheric expression A representing the aspheric shapes of the twelfth lens $L_{12}$, the thirteenth lens $L_{13}$, and the reflecting mirror 4 in Example 5.

TABLE 10

Aspheric coefficient

| Surface number | K | $A_3$ | $A_4$ | $A_5$ | $A_6$ |
|---|---|---|---|---|---|
| 22 | 0.687 | 3.721E−04 | −7.226E−05 | 3.428E−06 | 1.457E−07 |
| 23 | 0.944 | 8.364E−04 | −1.049E−04 | 1.675E−06 | 1.277E−07 |
| 24 | −5.066 | 9.221E−04 | −2.772E−06 | −7.445E−07 | −1.975E−08 |
| 25 | −0.091 | 4.004E−04 | 3.206E−05 | −6.774E−07 | −1.208E−07 |
| 26 | −1.635 | −7.820E−06 | −2.393E−07 | 8.568E−10 | 1.457E−11 |

| Surface number | $A_7$ | $A_8$ | $A_9$ | $A_{10}$ | $A_{11}$ |
|---|---|---|---|---|---|
| 22 | −3.253E−09 | −4.310E−10 | −1.289E−11 | 5.151E−13 | 8.758E−14 |
| 23 | 3.809E−09 | −8.750E−11 | −1.545E−11 | −7.225E−13 | −7.186E−16 |
| 24 | −4.771E−11 | 3.415E−11 | −1.101E−12 | −6.241E−14 | 1.689E−15 |
| 25 | −4.681E−10 | 1.458E−10 | 2.415E−12 | −8.042E−14 | −1.283E−15 |
| 26 | −3.177E−14 | −1.314E−15 | 5.387E−19 | 7.330E−20 | 2.989E−23 |

| Surface number | $A_{12}$ | $A_{13}$ | $A_{14}$ | $A_{15}$ | $A_{16}$ |
|---|---|---|---|---|---|
| 22 | 5.896E−15 | 1.727E−16 | −1.984E−17 | −9.386E−20 | −1.127E−20 |
| 23 | 2.267E−15 | 1.498E−16 | −7.021E−19 | 4.622E−20 | 1.435E−21 |
| 24 | 8.026E−17 | 1.288E−18 | −2.427E−20 | 6.156E−22 | −1.465E−23 |
| 25 | 1.651E−19 | −1.258E−18 | 3.653E−20 | 9.271E−23 | 6.637E−24 |
| 26 | −2.449E−24 | −4.611E−27 | 5.347E−29 | 0.000E+00 | 0.000E+00 |

| Surface number | $A_{17}$ | $A_{18}$ | $A_{19}$ | $A_{20}$ |
|---|---|---|---|---|
| 22 | −8.204E−22 | −3.864E−23 | −2.336E−25 | 2.011E−25 |
| 23 | −4.248E−23 | −8.304E−24 | −5.572E−25 | −1.734E−26 |
| 24 | −2.379E−24 | −1.734E−25 | −3.945E−27 | 3.210E−28 |
| 25 | 1.403E−25 | −1.530E−27 | −2.382E−28 | 5.865E−30 |
| 26 | 0.000E+00 | 0.000E+00 | 0.000E+00 | 0.000E+00 |

Table 19 shows values corresponding to Conditional expressions 1 to 4 in the projection optical system 10 according to Example 5. The projection optical system 10 satisfies all of Conditional expressions 1 to 4 and also satisfies Conditional expressions 1A, 2A, 2C, 3A, and 4A.

Figure 20A:
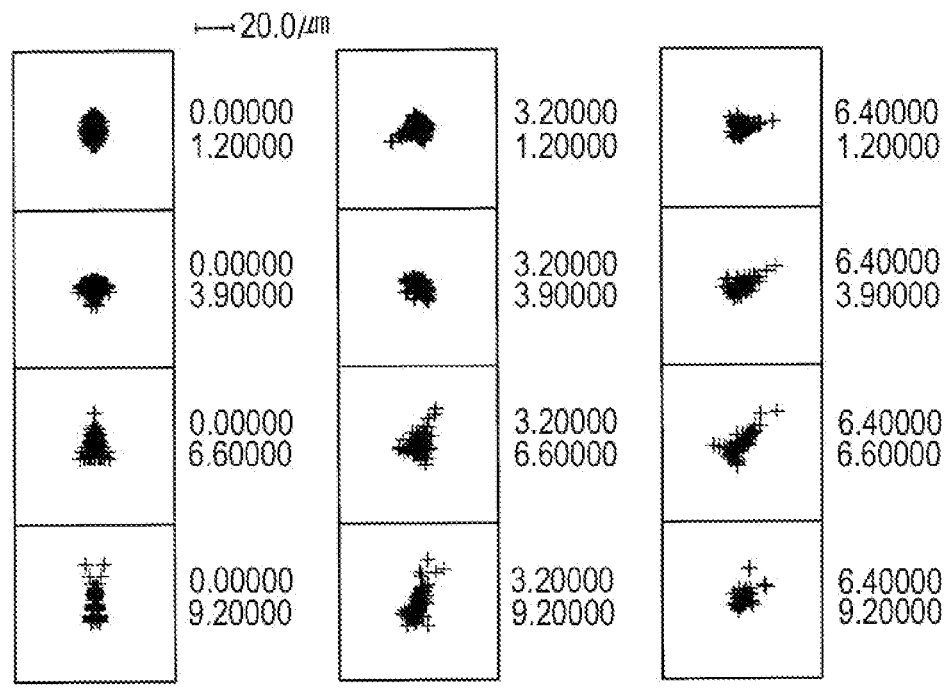
FIG. 20A is a diagram illustrating spots with respect to the d-line, the F-line, and the C-line on a screen of the projection optical system according to Example 5.
Figure 20B:
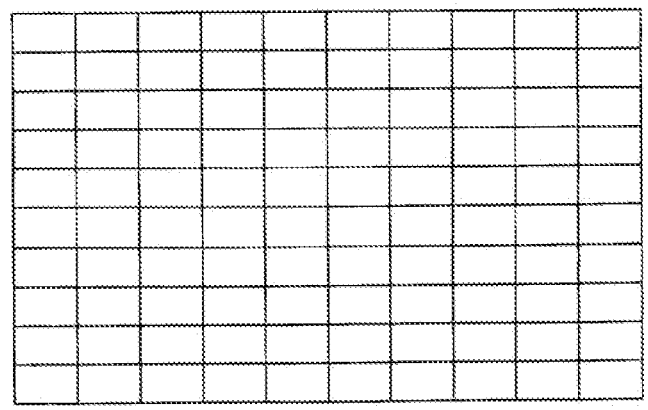
FIG. 20B is a diagram illustrating a distortion grid.

As can be seen from diagrams (FIG. 20A) illustrating spots on the screen and a distortion grid (FIG. 20B) in FIGS. 20A and 20B, the projection optical system 10 is a high-performance projection optical system capable of effectively correcting chromatic aberration and distortion.

Example 6

Figure 21:
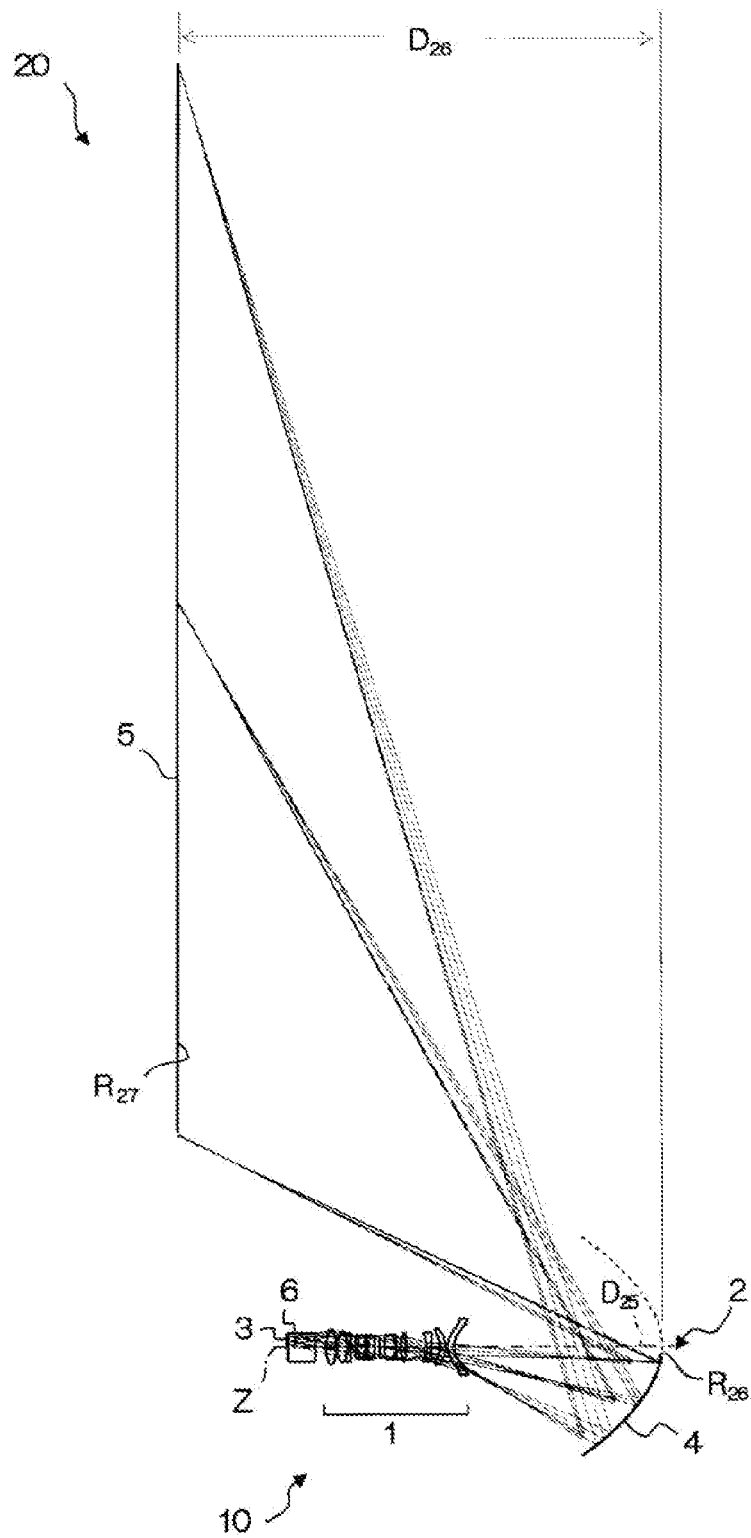
FIG. 21 is a diagram illustrating the structure of a main part of a projection display device according to Example 6.
Figure 22:
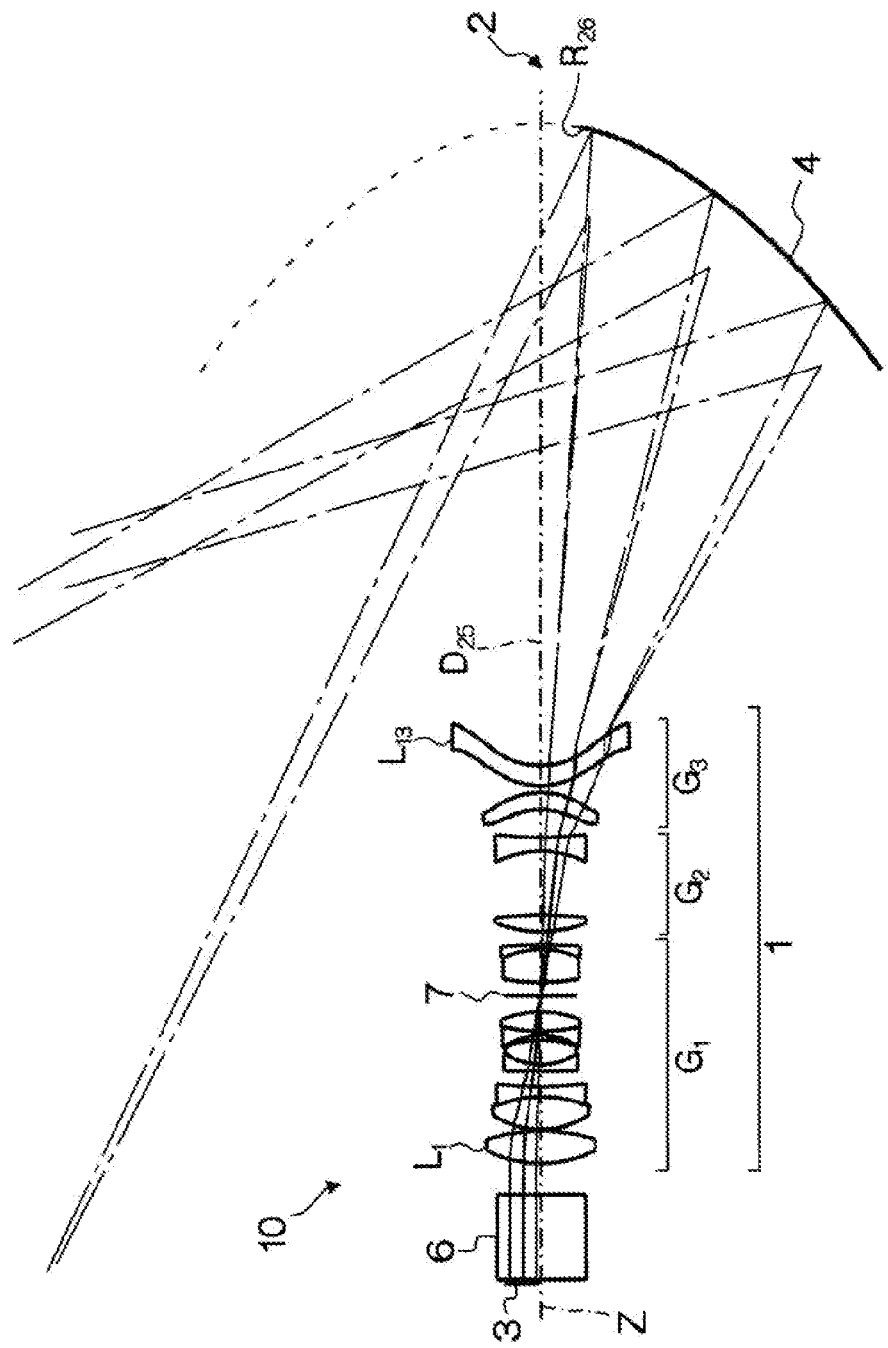
FIG. 22 is a diagram illustrating the structure of a projection optical system according to Example 6.
Figure 23:
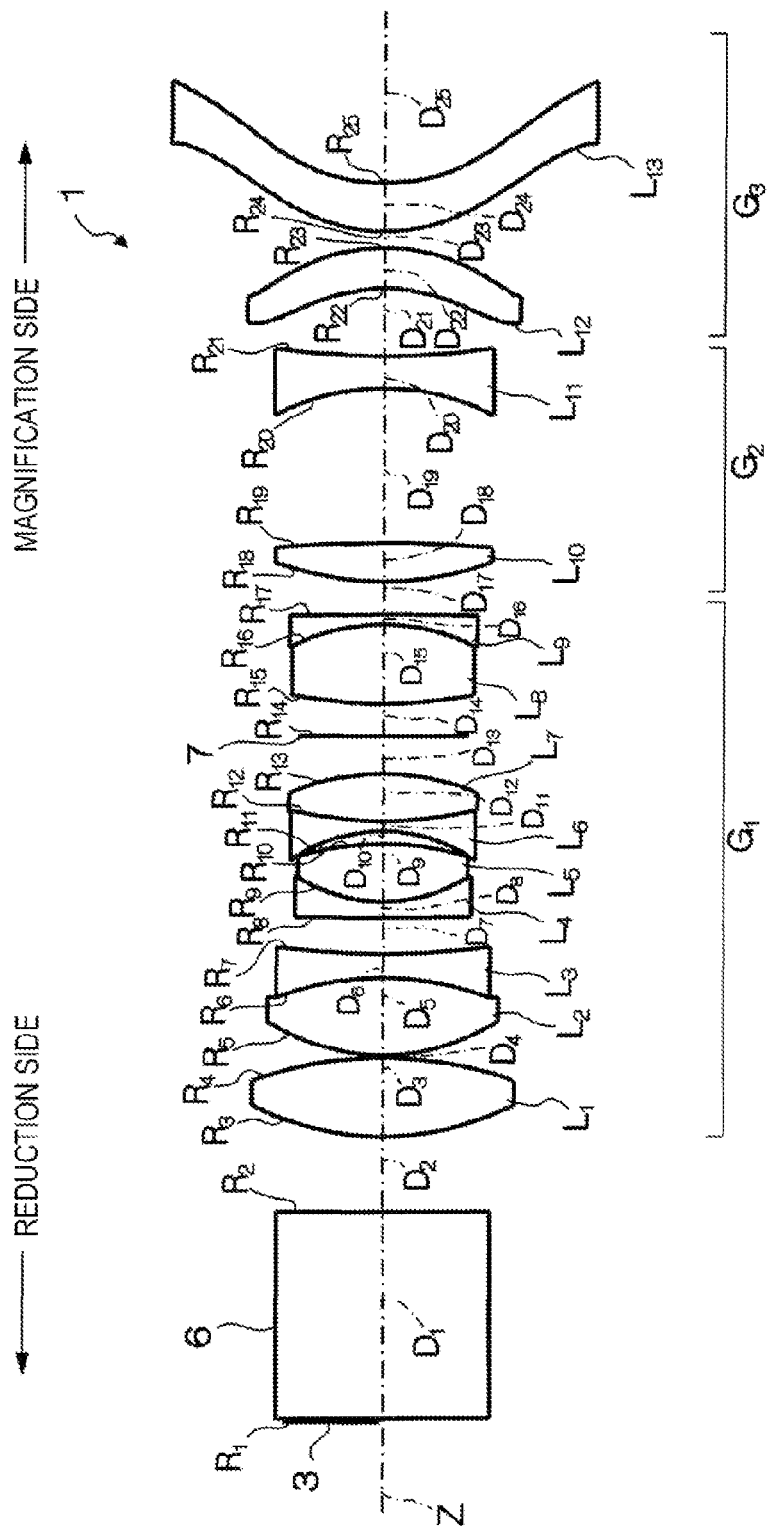
FIG. 23 is a diagram illustrating the detailed structure of a first optical system according to Example 6.

FIG. 22 shows the structure of a projection optical system 10 according to Example 6 and FIG. 23 shows the detailed structure of a first optical system 1 of the projection optical system 10. FIG. 21 shows the structure of a main part of a projection display device 20 including the projection optical system 10 according to Example 6.

The projection optical system 10 according to Example 6 has substantially the same structure as that according to Example 5 except that the first optical system 1 includes three lens groups (first to third lens groups $G_1$ to $G_3$), as shown in FIG. 23. That is, in Example 6, the gap $D_{23}$ between the twelfth lens $L_{12}$ and the thirteenth lens $L_{13}$ is constant without varying depending on the projection distance, and the two lenses form the third lens group $G_3$.

In Table 11, the upper part shows the curvature radius R of each member surface of the projection optical system 10 according to Example 6, the gap D between the members on the optical axis Z, and the refractive index $N_d$ and the Abbe number $v_d$ of each member with respect to the d-line.

In Table 11, the lower part shows the gaps $D_{17}$, $D_{21}$, $D_{25}$, and $D_{26}$ (variables 1 to 4) that vary depending on the projection distance for focusing.

TABLE 11

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.50 | | |

TABLE 11-continued

| | | | | |
|---|---|---|---|---|
| 3 | 35.69 | 9.81 | 1.4970 | 81.5 |
| 4 | −49.05 | 0.40 | | |
| 5 | 26.74 | 9.73 | 1.4970 | 81.5 |
| 6 | −36.45 | 3.00 | 1.8340 | 37.2 |
| 7 | 108.26 | 4.68 | | |
| 8 | 1350.56 | 2.00 | 1.8052 | 25.4 |
| 9 | 20.34 | 7.27 | 1.4875 | 70.2 |
| 10 | −34.23 | 1.63 | | |
| 11 | −19.47 | 1.20 | 1.6200 | 36.3 |
| 12 | 49.26 | 5.91 | 1.8467 | 23.8 |
| 13 | −29.56 | 4.63 | | |
| 14 (Aperture diaphragm) | ∞ | 4.10 | | |
| 15 | 58.91 | 10.00 | 1.5174 | 52.4 |
| 16 | −24.80 | 1.20 | 1.8340 | 37.2 |
| 17 | −411.76 | (Variable 1) | | |
| 18 | 38.61 | 4.92 | 1.6968 | 55.5 |
| 19 | −133.05 | 19.34 | | |
| 20 | −28.44 | 4.00 | 1.7725 | 49.6 |
| 21 | 95.70 | (Variable 2) | | |
| 22* | −19.87 | 5.05 | 1.4910 | 57.6 |
| 23* | −20.26 | 2.13 | | |
| 24* | 29.45 | 6.10 | 1.4910 | 57.6 |
| 25* | 30.16 | (Variable 3) | | |
| 26* | −57.51 | (Variable 4) | (Reflecting surface) | |
| 27 | ∞ | | | |
| Variable 1 | | 2.68 | 4.07 | 6.77 |
| Variable 2 | | 9.03 | 8.47 | 7.37 |
| Variable 3 | | 194.01 | 193.18 | 191.58 |
| Variable 4 (projection distance) | | −406.37 | −450.00 | −582.77 |

*Aspheric surface

Table 12 shows aspheric coefficients of Aspheric expression A representing the aspheric shapes of the twelfth lens $L_{12}$, the thirteenth lens $L_{13}$, and the reflecting mirror 4 in Example 6.

TABLE 12

Aspheric coefficient

| Surface number | K | $A_3$ | $A_4$ | $A_5$ | $A_6$ |
|---|---|---|---|---|---|
| 22 | 0.661 | 4.889E−04 | −6.351E−05 | 3.647E−06 | 1.516E−07 |
| 23 | 0.617 | 1.138E−03 | −1.102E−04 | 1.611E−06 | 1.165E−07 |
| 24 | −7.117 | 1.008E−03 | −7.669E−06 | −4.592E−07 | −1.672E−08 |
| 25 | 0.000 | 1.221E−04 | 6.167E−05 | −8.248E−07 | −1.445E−07 |
| 26 | −1.309 | −4.775E−06 | −2.074E−07 | 1.815E−10 | 1.201E−11 |

| Surface number | $A_7$ | $A_8$ | $A_9$ | $A_{10}$ | $A_{11}$ |
|---|---|---|---|---|---|
| 22 | −3.122E−09 | −4.232E−10 | −1.220E−11 | 5.517E−13 | 8.742E−14 |
| 23 | 3.827E−09 | −5.044E−11 | −1.285E−11 | −6.182E−13 | 1.007E−15 |
| 24 | −3.181E−10 | 2.679E−11 | −1.073E−12 | −5.610E−14 | 1.873E−15 |
| 25 | −6.669E−10 | 1.543E−10 | 2.740E−12 | −7.427E−14 | −1.297E−15 |
| 26 | −1.267E−15 | −1.021E−15 | 4.046E−19 | 5.419E−20 | −9.847E−23 |

| Surface number | $A_{12}$ | $A_{13}$ | $A_{14}$ | $A_{15}$ | $A_{16}$ |
|---|---|---|---|---|---|
| 22 | 5.637E−15 | 1.384E−16 | −2.236E−17 | −2.730E−19 | −1.726E−20 |
| 23 | 2.141E−15 | 1.330E−16 | −1.705E−18 | −2.157E−20 | 5.914E−21 |
| 24 | 8.325E−17 | 1.227E−18 | −3.113E−20 | 5.303E−22 | −1.521E−23 |
| 25 | −4.695E−18 | −1.377E−18 | 3.823E−20 | 8.270E−23 | 4.062E−24 |
| 26 | −2.097E−24 | 8.481E−27 | −3.054E−30 | 0.000E+00 | 0.000E+00 |

| Surface number | $A_{17}$ | $A_{18}$ | $A_{19}$ | $A_{20}$ |
|---|---|---|---|---|
| 22 | 3.262E−22 | −3.525E−23 | 2.790E−25 | 1.947E−25 |
| 23 | −1.931E−23 | −9.903E−24 | −4.615E−25 | −2.541E−26 |
| 24 | −2.291E−24 | −1.689E−25 | −3.948E−27 | 3.226E−28 |
| 25 | 3.935E−26 | −3.943E−27 | −1.973E−28 | 1.347E−29 |
| 26 | 0.000E+00 | 0.000E+00 | 0.000E+00 | 0.000E+00 |

Table 19 shows values corresponding to Conditional expressions 1 to 4 in the projection optical system 10 according to Example 6. The projection optical system 10 satisfies all of Conditional expressions 1 to 4 and also satisfies Conditional expressions 1A, 2A, 2C, 3A, and 4A.

Figure 24A:
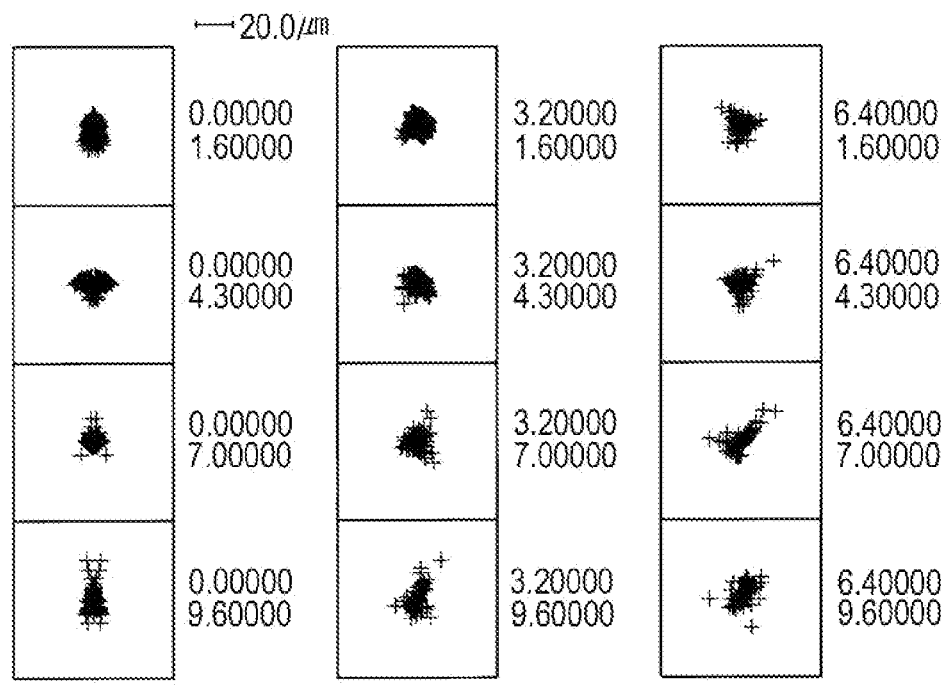
FIG. 24A is a diagram illustrating spots with respect to the d-line, the F-line, and the C-line on a screen of the projection optical system according to Example 6.
Figure 24B:
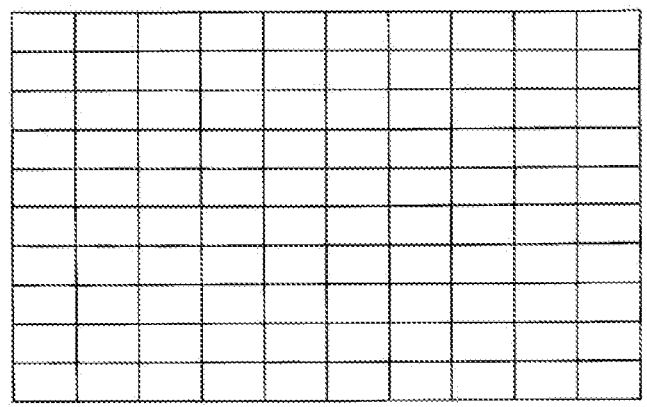
FIG. 24B is a diagram illustrating a distortion grid.

As can be seen from diagrams (FIG. 24A) illustrating spots on the screen and a distortion grid (FIG. 24B) in FIGS. 24A and 24B, the projection optical system 10 is a high-performance projection optical system capable of effectively correcting chromatic aberration and distortion.

Example 7

Figure 25:
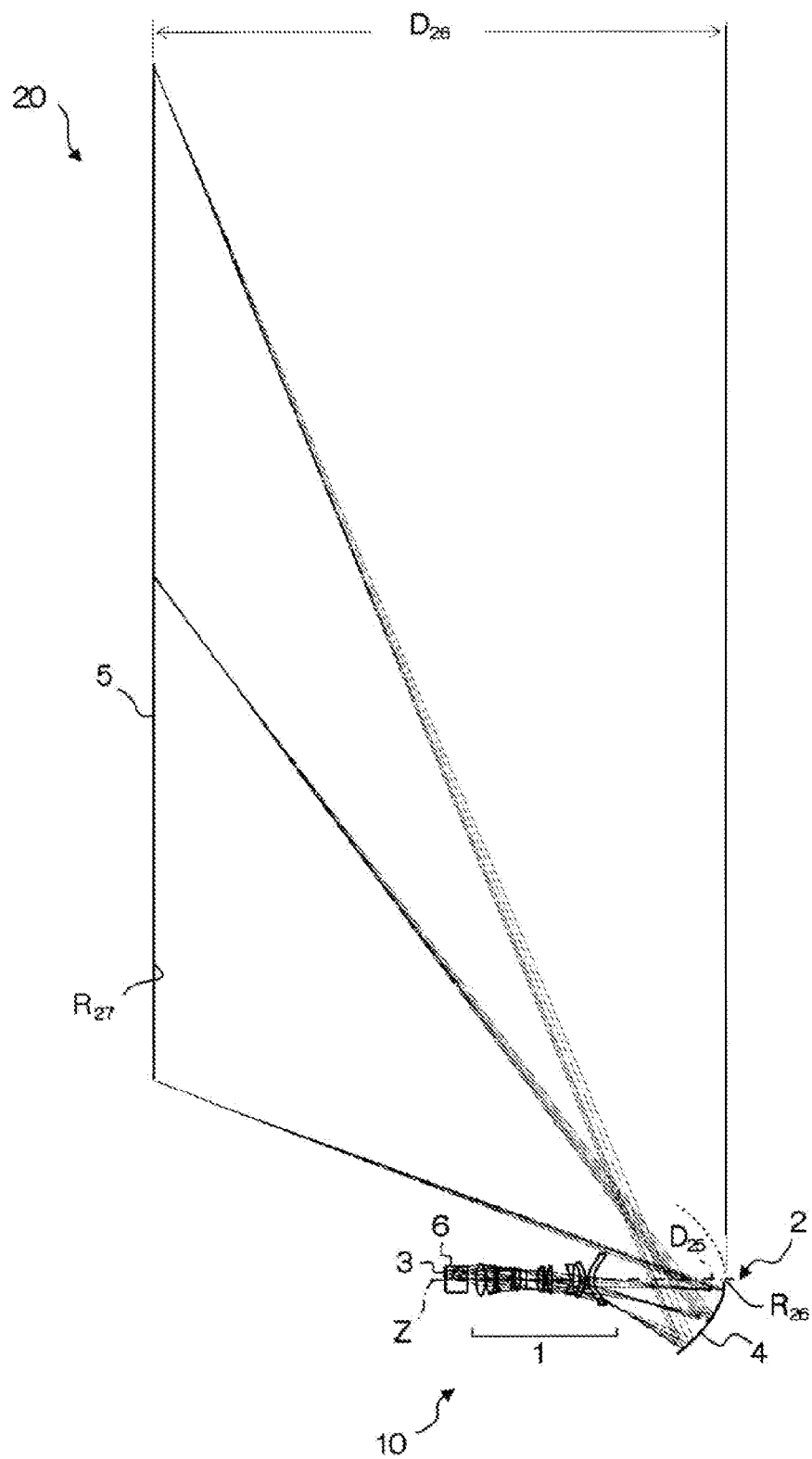
FIG. 25 is a diagram illustrating the structure of a main part of a projection display device according to Example 7.
Figure 26:
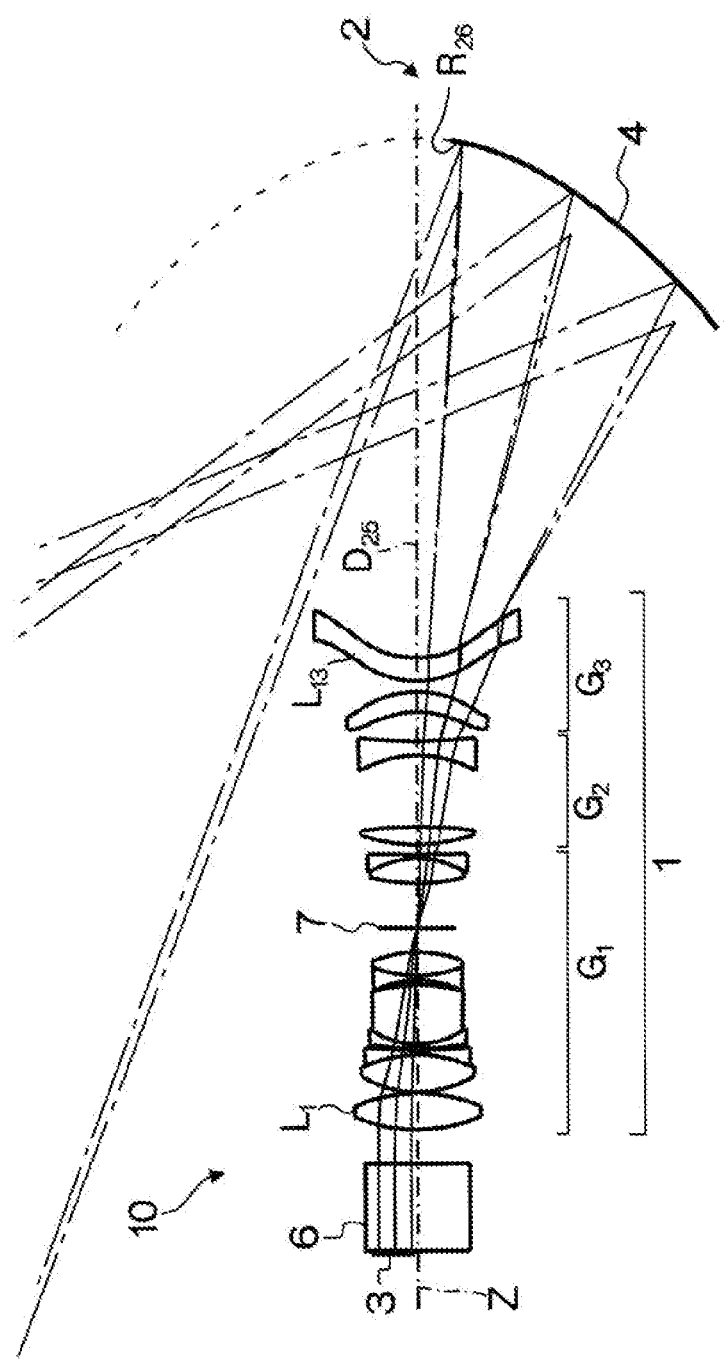
FIG. 26 is a diagram illustrating the structure of a projection optical system according to Example 7.
Figure 27:
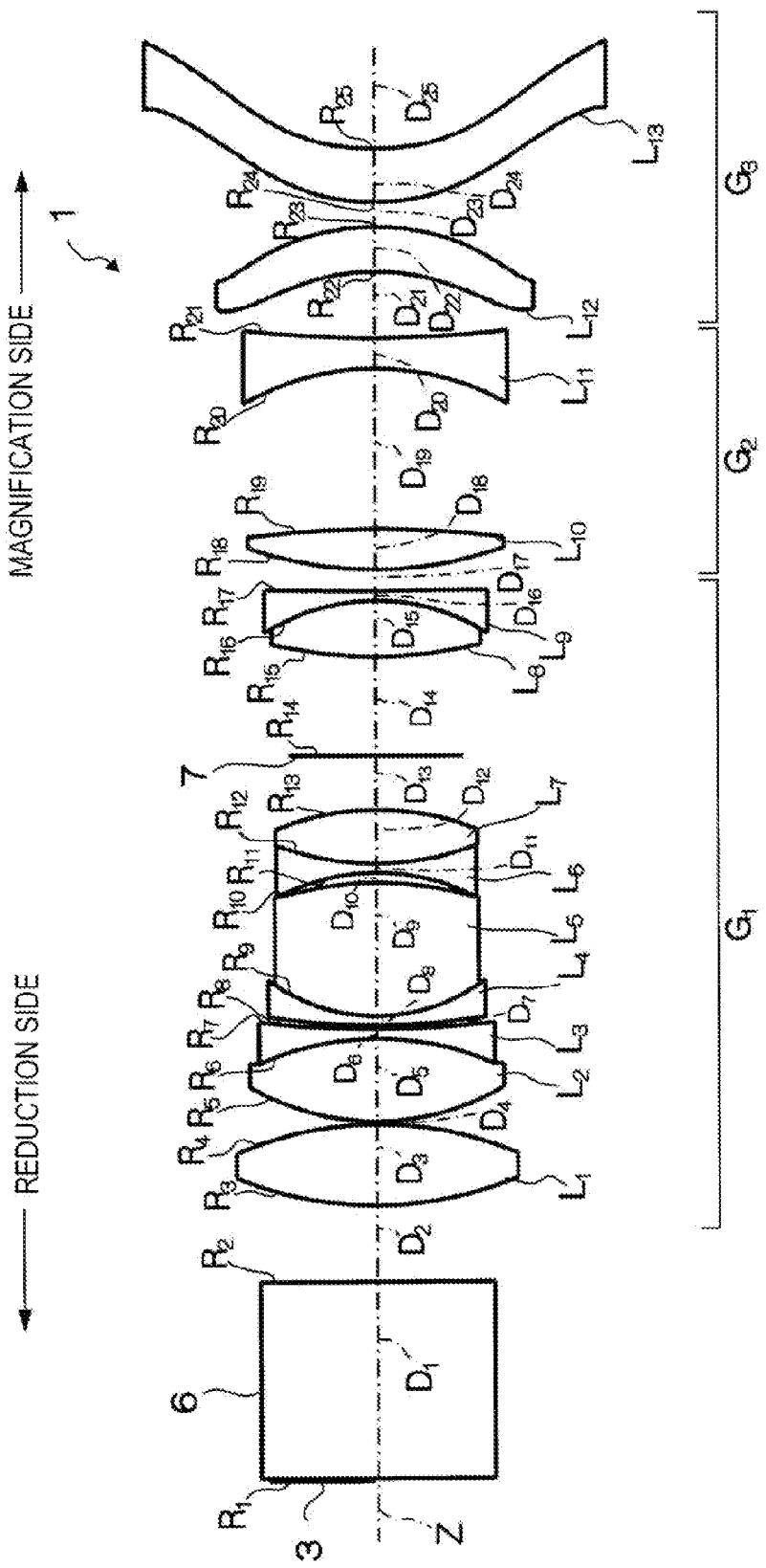
FIG. 27 is a diagram illustrating the detailed structure of a first optical system according to Example 7.

FIG. 26 shows the structure of a projection optical system 10 according to Example 7 and FIG. 27 shows the detailed structure of a first optical system 1 of the projection optical system 10. FIG. 25 shows the structure of a main part of a projection display device 20 including the projection optical system 10 according to Example 7.

The projection optical system 10 according to Example 7 has substantially the same structure as that according to Example 6 except that a lens (ninth lens $L_9$) closest to the magnification side in the first lens group $G_1$ of the first optical system 1 is a biconcave lens.

In Table 13, the upper part shows the curvature radius R of each member surface of the projection optical system 10 according to Example 7, the gap D between the members on the optical axis Z, and the refractive index $N_d$ and the Abbe number $v_d$ of each member with respect to the d-line.

In Table 13, the lower part shows the gaps $D_{17}$, $D_{21}$, $D_{25}$, and $D_{26}$ (variables 1 to 4) that vary depending on the projection distance for focusing.

TABLE 13

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.99 | | |
| 3 | 47.74 | 10.70 | 1.4970 | 81.5 |
| 4 | −46.57 | 0.40 | | |
| 5 | 32.27 | 10.83 | 1.4970 | 81.5 |
| 6 | −37.55 | 1.30 | 1.8000 | 48.0 |
| 7 | 135.50 | 0.50 | | |
| 8 | 88.21 | 1.20 | 1.8052 | 25.4 |
| 9 | 23.31 | 17.70 | 1.4875 | 70.2 |
| 10 | −42.91 | 1.39 | | |
| 11 | −27.41 | 1.20 | 1.7354 | 28.5 |
| 12 | 36.56 | 6.99 | 1.8467 | 23.8 |
| 13 | −36.45 | 7.06 | | |
| 14 (Aperture diaphragm) | ∞ | 13.05 | | |
| 15 | 59.35 | 7.36 | 1.5152 | 52.2 |
| 16 | −26.86 | 1.20 | 1.8340 | 37.2 |
| 17 | 740.74 | (Variable 1) | | |
| 18 | 49.25 | 5.33 | 1.7487 | 53.1 |
| 19 | −133.46 | 21.08 | | |
| 20 | −34.14 | 4.00 | 1.7151 | 55.7 |
| 21 | 143.41 | (Variable 2) | | |
| 22* | −26.06 | 5.90 | 1.4910 | 57.6 |
| 23* | −26.21 | 3.27 | | |
| 24* | 36.68 | 7.00 | 1.4910 | 57.6 |
| 25* | 38.74 | (Variable 3) | | |
| 26* | −62.01 | (Variable 4) | (Reflecting surface) | |
| 27 | ∞ | | | |

| | | | |
|---|---|---|---|
| Variable 1 | 0.63 | 2.83 | 4.53 |
| Variable 2 | 10.02 | 8.72 | 7.69 |
| Variable 3 | 153.96 | 153.06 | 152.39 |
| Variable 4 (projection distance) | −538.32 | −670.00 | −871.46 |

*Aspheric surface

Table 14 shows aspheric coefficients of Aspheric expression A representing the aspheric shapes of the twelfth lens $L_{12}$, the thirteenth lens $L_{13}$, and the reflecting mirror 4 in Example 7.

TABLE 14

Aspheric coefficient

| Surface number | K | $A_3$ | $A_4$ | $A_5$ | $A_6$ |
|---|---|---|---|---|---|
| 22 | 0.636 | 3.675E−04 | −4.249E−05 | 1.612E−06 | 6.133E−08 |
| 23 | 0.902 | 8.179E−04 | −6.780E−05 | 7.879E−07 | 4.684E−08 |
| 24 | −6.855 | 7.308E−04 | −5.453E−06 | −2.551E−07 | −4.895E−09 |
| 25 | 0.000 | 1.232E−04 | 3.762E−05 | −4.093E−07 | −6.272E−08 |
| 26 | −1.413 | −6.895E−06 | −2.091E−07 | 1.985E−10 | 7.567E−12 |

| Surface number | $A_7$ | $A_8$ | $A_9$ | $A_{10}$ | $A_{11}$ |
|---|---|---|---|---|---|
| 22 | −1.062E−09 | −1.222E−10 | −2.941E−12 | 1.167E−13 | 1.526E−14 |
| 23 | 1.342E−09 | −1.259E−11 | −3.090E−12 | −1.259E−13 | 2.081E−16 |
| 24 | −1.078E−10 | 5.767E−12 | −3.227E−13 | −1.193E−14 | 3.702E−16 |
| 25 | −2.708E−10 | 4.597E−11 | 7.130E−13 | −1.455E−14 | −2.232E−16 |
| 26 | 7.128E−16 | −4.212E−16 | −6.019E−19 | 1.299E−21 | −4.194E−23 |

| Surface number | $A_{12}$ | $A_{13}$ | $A_{14}$ | $A_{15}$ | $A_{16}$ |
|---|---|---|---|---|---|
| 22 | 8.248E−16 | 1.700E−17 | −2.301E−18 | −2.360E−20 | −1.252E−21 |
| 23 | 3.129E−16 | 1.629E−17 | −1.763E−19 | −1.867E−21 | 4.291E−22 |
| 24 | 1.451E−17 | 1.905E−19 | −4.815E−21 | 2.447E−23 | −1.243E−24 |
| 25 | −1.012E−18 | −1.755E−19 | 3.908E−21 | 5.109E−24 | 2.597E−25 |
| 26 | −4.361E−25 | 1.661E−27 | 9.974E−30 | 0.000E+00 | 0.000E+00 |

| Surface number | $A_{17}$ | $A_{18}$ | $A_{19}$ | $A_{20}$ |
|---|---|---|---|---|
| 22 | 1.987E−23 | −1.803E−24 | 1.198E−26 | 7.021E−27 |
| 23 | −1.176E−24 | −5.065E−25 | −1.981E−26 | −9.160E−28 |
| 24 | −1.403E−25 | −8.640E−27 | −1.695E−28 | 1.163E−29 |
| 25 | 2.070E−27 | −2.040E−28 | −8.485E−30 | 4.855E−31 |
| 26 | 0.000E+00 | 0.000E+00 | 0.000E+00 | 0.000E+00 |

Table 19 shows values corresponding to Conditional expressions 1 to 4 in the projection optical system 10 according to Example 7. The projection optical system 10 satisfies all of Conditional expressions 1 to 4 and also satisfies Conditional expressions 1A, 2A, 2B, 3A, and 4A.

Figure 28A:
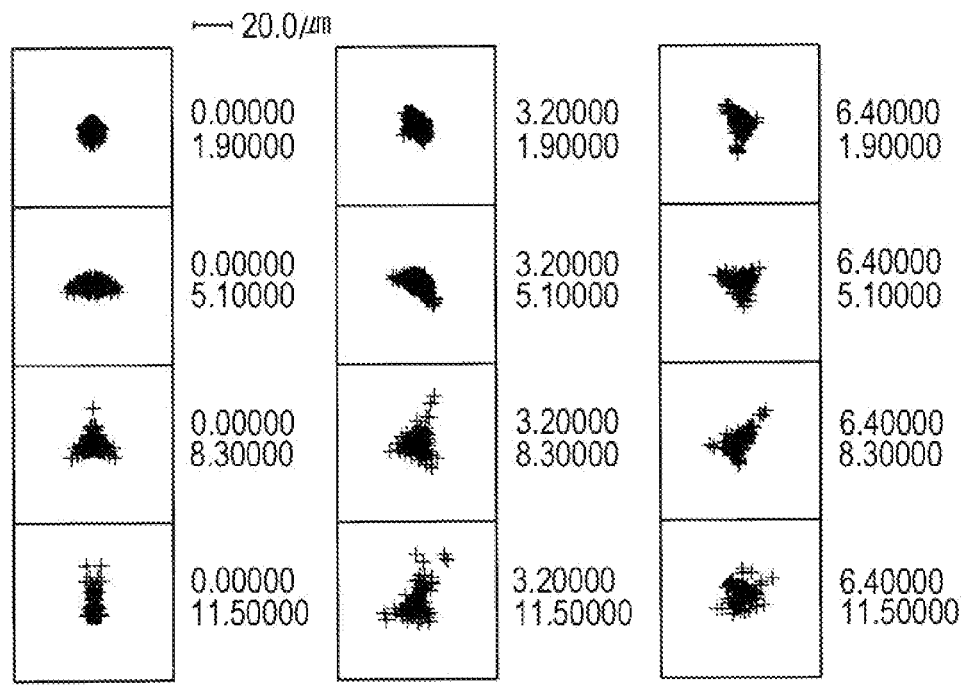
FIG. 28A is a diagram illustrating spots with respect to the d-line, the F-line, and the C-line on a screen of the projection optical system according to Example 7.
Figure 28B:
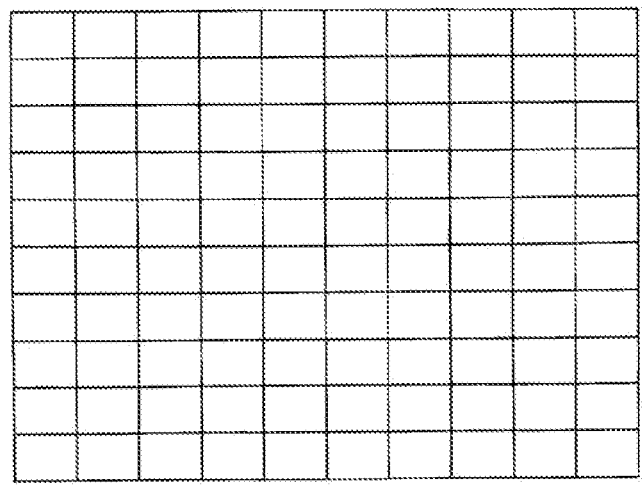
FIG. 28B is a diagram illustrating a distortion grid.

As can be seen from diagrams (FIG. 28A) illustrating spots on the screen and a distortion grid (FIG. 28B) in FIGS. 28A and 28B, the projection optical system 10 is a high-performance projection optical system capable of effectively correcting chromatic aberration and distortion. In addition, the aspect ratio of the image display surface 3 is 4:3 (which is the same as that in FIGS. 32B and 36B in Examples 8 and 9).

Example 8

Figure 29:
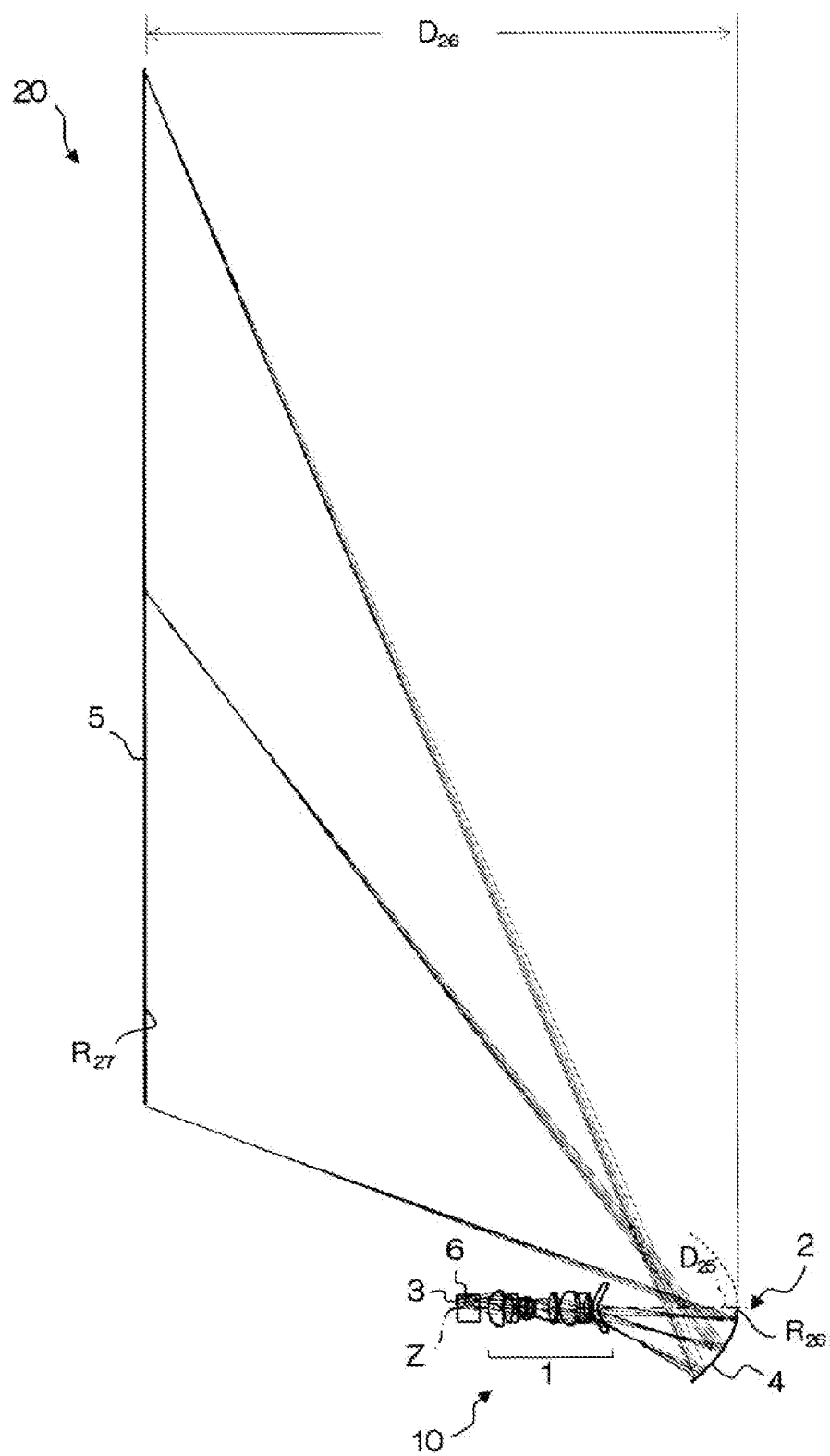
FIG. 29 is a diagram illustrating the structure of a main part of a projection display device according to Example 8.
Figure 30:
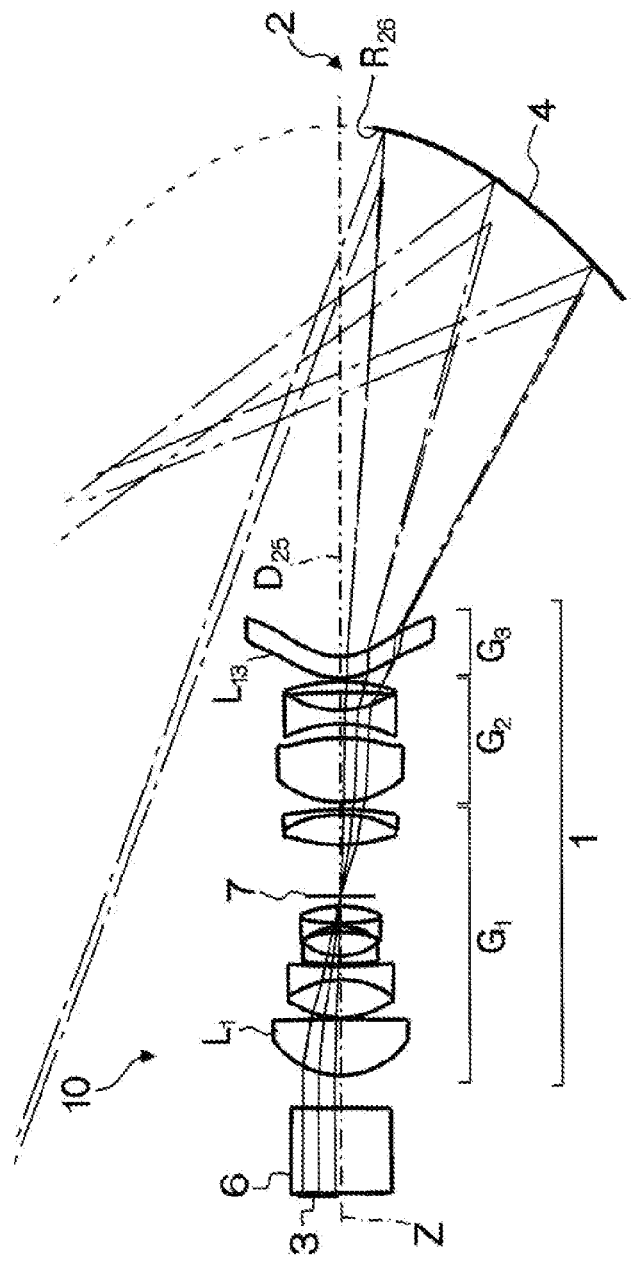
FIG. 30 is a diagram illustrating the structure of a projection optical system according to Example 8.
Figure 31:
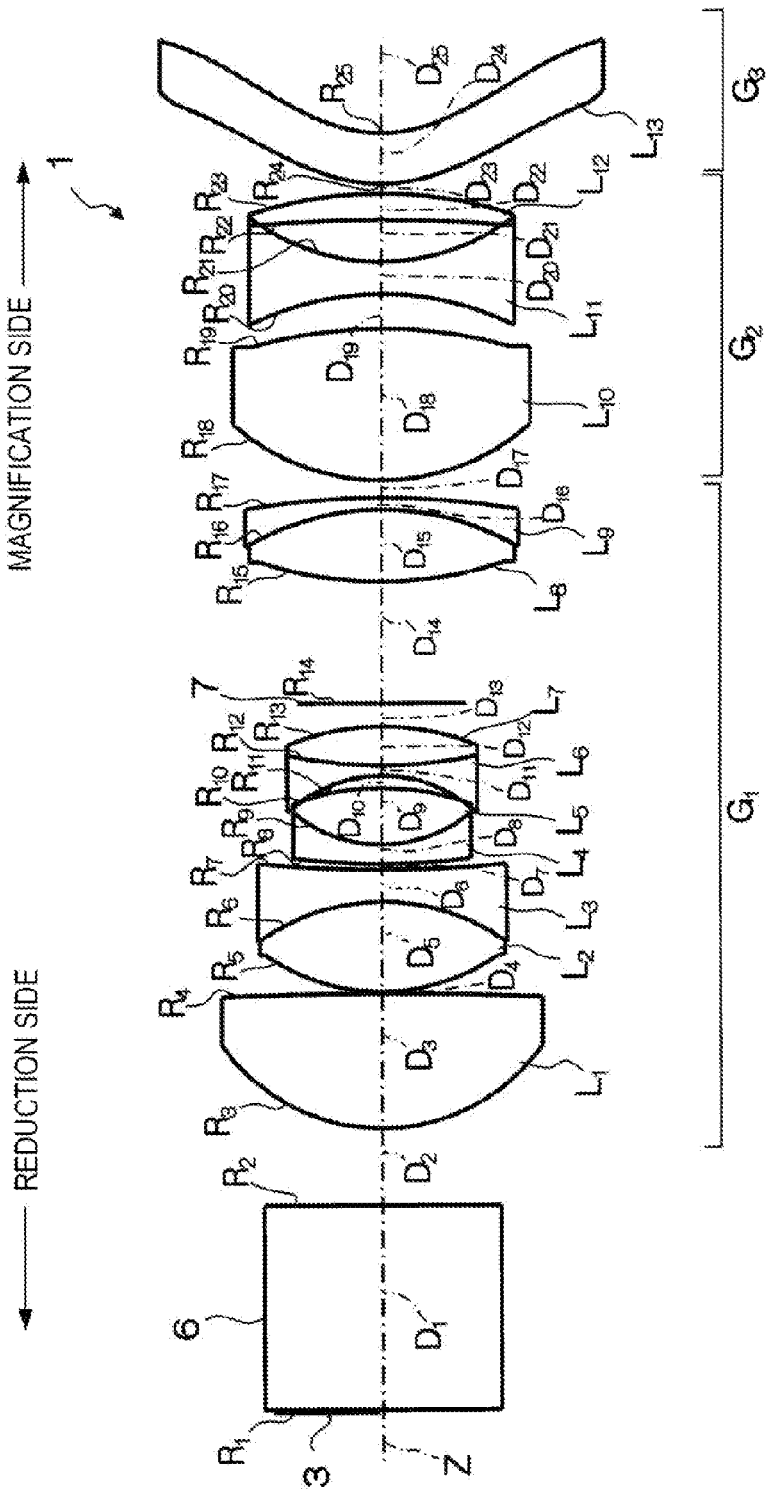
FIG. 31 is a diagram illustrating the detailed structure of a first optical system according to Example 8.

FIG. 30 shows the structure of a projection optical system 10 according to Example 8 and FIG. 31 shows the detailed structure of a first optical system 1 of the projection optical system 10. FIG. 29 shows the structure of a main part of a projection display device 20 including the projection optical system 10 according to Example 8.

The projection optical system 10 according to Example 8 has substantially the same structure as that according to Example 6 except that the second lens group $G_2$ of the first optical system 1 includes three single lenses (tenth lens $L_{10}$, which is a biconvex lens, an eleventh lens $L_{11}$, which is a biconcave lens, and a twelfth lens $L_{12}$, which is a positive meniscus lens having a convex surface facing the magnification side) without including any aspheric lens and the third lens group $G_3$ includes one single lens (thirteenth lens $L_{13}$ which is an aspheric lens having aspheric surfaces on both sides).

In Table 15, the upper part shows the curvature radius R of each member surface of the projection optical system 10 according to Example 8, the gap D between the members on the optical axis Z, and the refractive index $N_d$ and the Abbe number $v_d$ of each member with respect to the d-line.

In Table 15, the lower part shows the gaps $D_{17}$, $D_{23}$, $D_{25}$, and $D_{26}$ (variables 1 to 4) that vary depending on the projection distance for focusing.

TABLE 15

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.75 | | |
| 3 | 24.73 | 17.00 | 1.4970 | 81.5 |
| 4 | −565.19 | 0.30 | | |
| 5 | 25.49 | 11.46 | 1.4970 | 81.5 |
| 6 | −26.86 | 4.00 | 1.8340 | 37.2 |
| 7 | 165.27 | 0.73 | | |
| 8 | 81.13 | 2.45 | 1.8052 | 25.4 |
| 9 | 17.37 | 7.24 | 1.5638 | 60.7 |
| 10 | −33.04 | 1.56 | | |
| 11 | −17.61 | 1.20 | 1.7725 | 49.6 |
| 12 | 57.87 | 4.93 | 1.8467 | 23.8 |
| 13 | −31.34 | 2.92 | | |
| 14 (Aperture diaphragm) | ∞ | 15.52 | | |
| 15 | 49.23 | 9.13 | 1.5163 | 64.1 |
| 16 | −33.78 | 1.50 | 1.8061 | 33.3 |
| 17 | −100.03 | (Variable 1) | | |
| 18 | 28.34 | 19.17 | 1.5163 | 64.1 |
| 19 | −59.47 | 4.44 | | |
| 20 | −37.13 | 4.00 | 1.7725 | 49.6 |
| 21 | 27.55 | 5.33 | | |
| 22 | −193.54 | 3.29 | 1.6727 | 32.1 |
| 23 | −54.37 | (Variable 2) | | |
| 24* | 19.97 | 6.41 | 1.4910 | 57.6 |
| 25* | 16.88 | (Variable 3) | | |
| 26* | −63.36 | (Variable 4) | (Reflecting surface) | |
| 27 | ∞ | | | |

TABLE 15-continued

| | | | |
|---|---|---|---|
| Variable 1 | 0.93 | 2.20 | 3.48 |
| Variable 2 | 0.83 | 1.24 | 1.86 |
| Variable 3 | 161.68 | 160.00 | 158.10 |
| Variable 4 (projection distance) | −555.49 | −680.00 | −873.04 |

*Aspheric surface

Table 16 shows aspheric coefficients of Aspheric expression A representing the aspheric shapes of the thirteenth lens $L_{13}$ and the reflecting mirror 4 in Example 8.

TABLE 16

Aspheric coefficient

| Surface number | K | $A_3$ | $A_4$ | $A_5$ | $A_6$ |
|---|---|---|---|---|---|
| 24 | −2.683 | 1.092E−04 | 1.411E−05 | −7.403E−07 | −1.480E−08 |
| 25 | −1.507 | 1.812E−04 | −1.245E−05 | 6.403E−07 | −2.979E−08 |
| 26 | −1.083 | −2.376E−06 | −1.972E−07 | −8.634E−11 | 6.388E−12 |

| Surface number | $A_7$ | $A_8$ | $A_9$ | $A_{10}$ | $A_{11}$ |
|---|---|---|---|---|---|
| 24 | 2.713E−10 | 3.003E−11 | 1.373E−14 | −2.477E−14 | −2.033E−16 |
| 25 | −3.324E−10 | 3.028E−11 | 3.295E−13 | −1.737E−14 | 3.223E−17 |
| 26 | −1.532E−15 | −3.717E−16 | 6.298E−19 | 1.742E−20 | −3.213E−23 |

| Surface number | $A_{12}$ | $A_{13}$ | $A_{14}$ |
|---|---|---|---|
| 24 | 4.069E−18 | −2.018E−18 | 8.489E−20 |
| 25 | −1.098E−18 | −1.596E−18 | 5.353E−20 |
| 26 | −1.600E−24 | −1.559E−26 | 1.447E−28 |

Table 19 shows values corresponding to Conditional expressions 1 to 4 in the projection optical system 10 according to Example 8. The projection optical system 10 satisfies all of Conditional expressions 1 to 4 and also satisfies Conditional expressions 1A, 2A, 2B, 3A, and 4A.

Figure 32A:
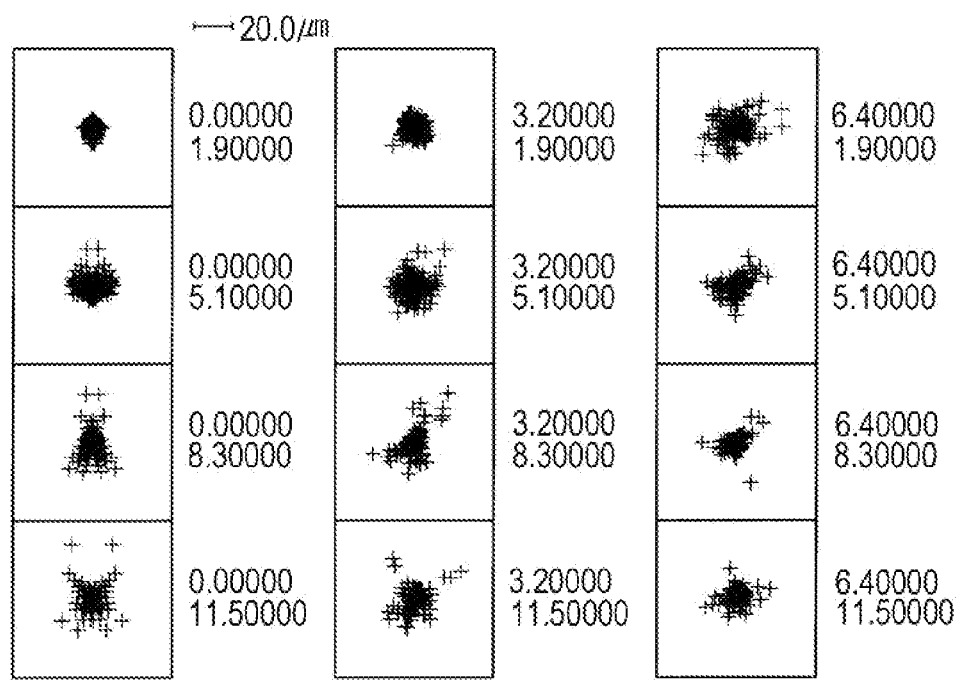
FIG. 32A is a diagram illustrating spots with respect to the d-line, the F-line, and the C-line on a screen of the projection optical system according to Example 8.
Figure 32B:
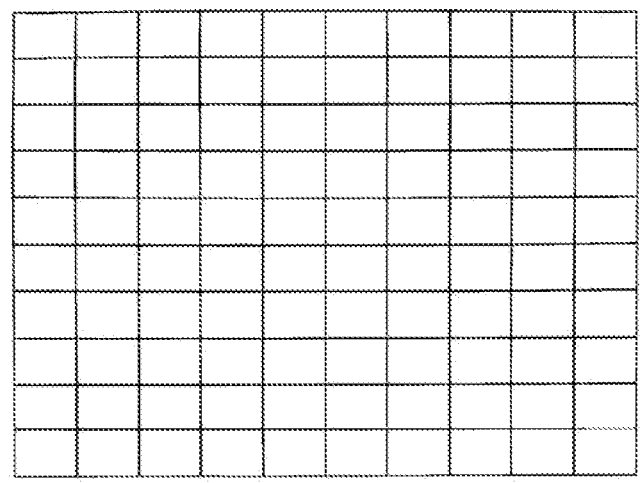
FIG. 32B is a diagram illustrating a distortion grid.

As can be seen from diagrams (FIG. 32A) illustrating spots on the screen and a distortion grid (FIG. 32B) in FIGS. 32A and 32B, the projection optical system 10 is a high-performance projection optical system capable of effectively correcting chromatic aberration and distortion.

Example 9

Figure 33:
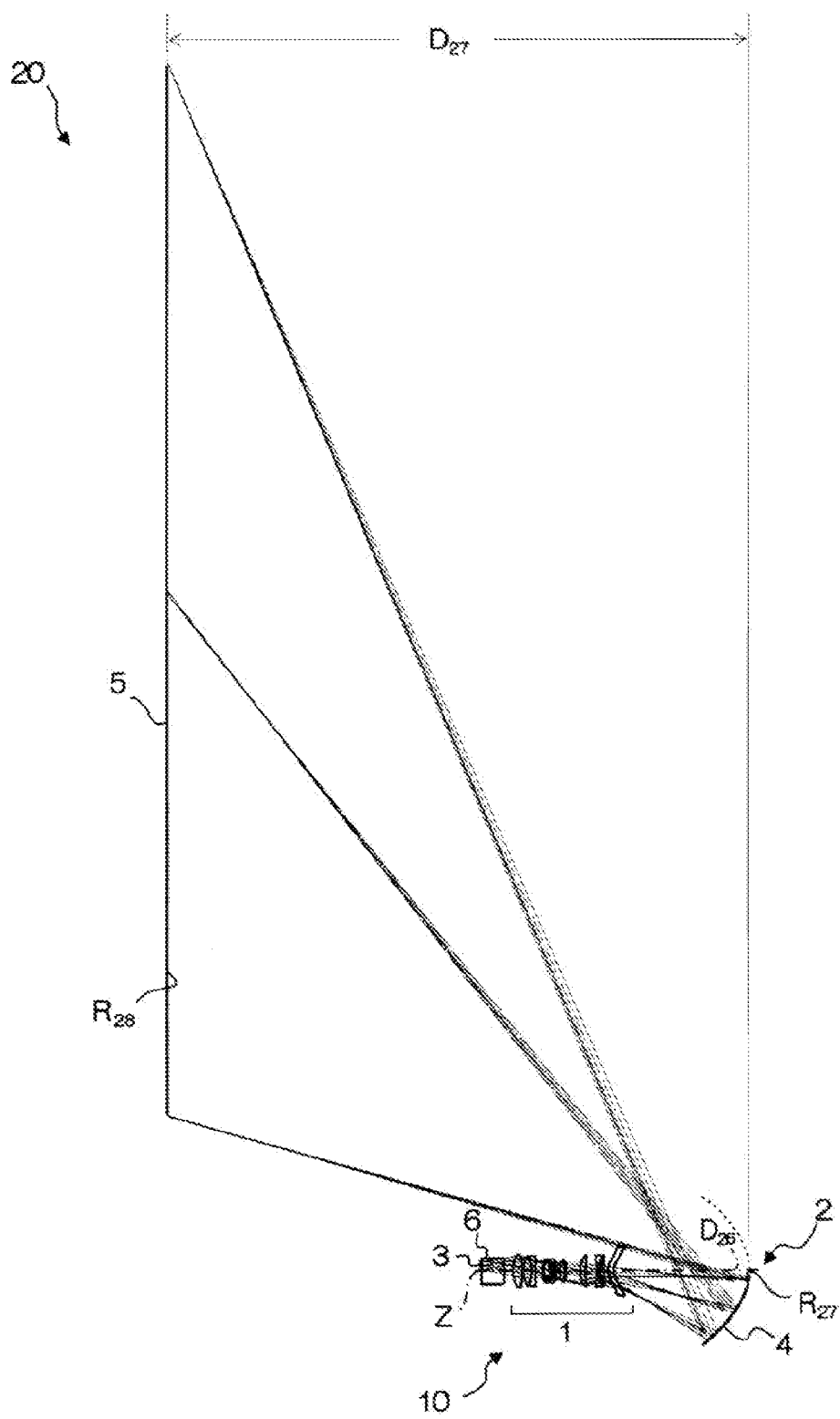
FIG. 33 is a diagram illustrating the structure of a main part of a projection display device according to Example 9.
Figure 34:
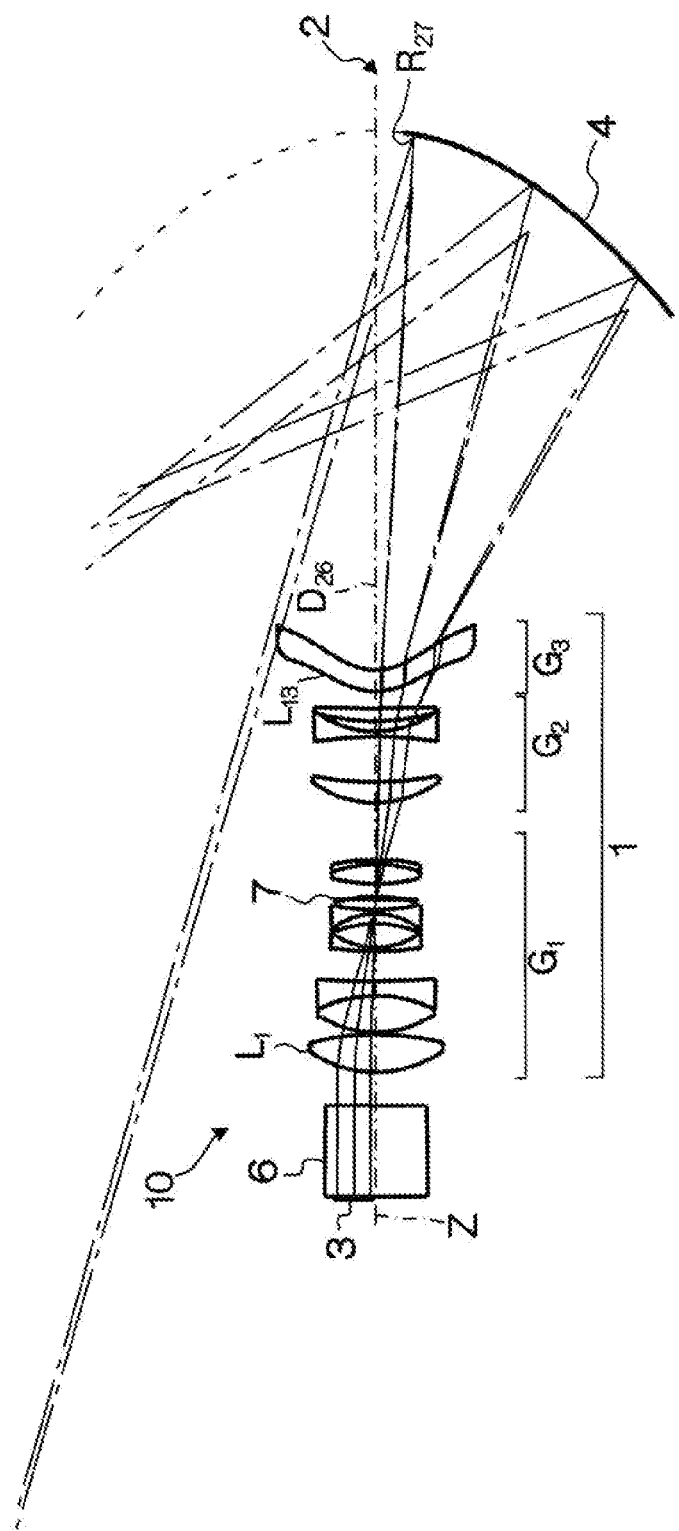
FIG. 34 is a diagram illustrating the structure of a projection optical system according to Example 9.
Figure 35:
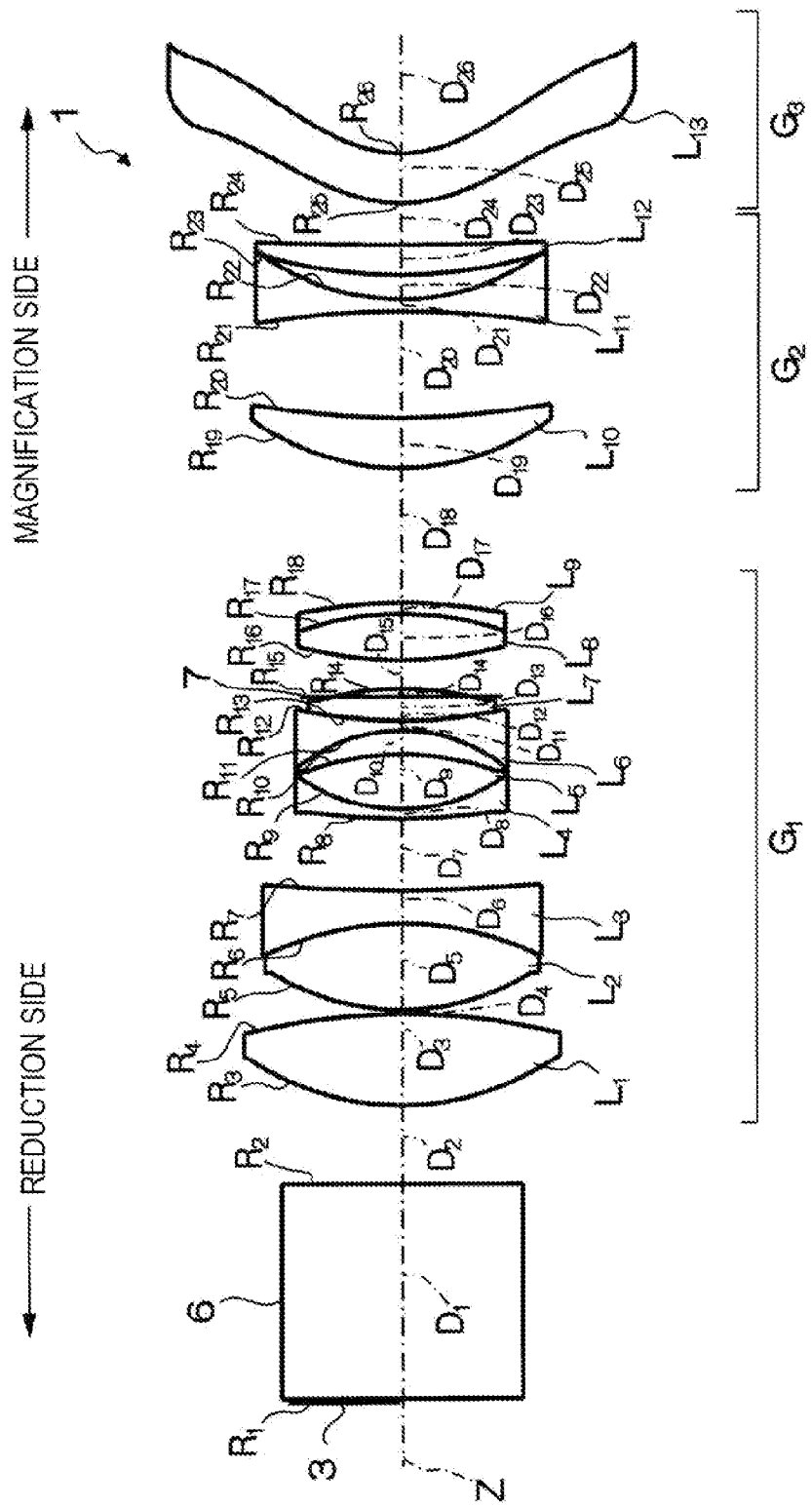
FIG. 35 is a diagram illustrating the detailed structure of a first optical system according to Example 9.

FIG. 34 shows the structure of a projection optical system 10 according to Example 9 and FIG. 35 shows the detailed structure of a first optical system 1 of the projection optical system 10. FIG. 33 shows the structure of a main part of a projection display device 20 including the projection optical system 10 according to Example 9. In FIGS. 33 and 34, some of light beams reflected from the reflecting mirror 4 to the screen 5 pass through the upper part of the lens (thirteenth lens $L_{13}$) closest to the magnification side in the first optical system 1. However, during an actual manufacturing process, the upper part of the thirteenth lens $L_{13}$ is cut so as not to hinder the traveling of the light beams.

The projection optical system 10 according to Example 9 has substantially the same structure as that according to Example 8 except that the sixth lens $L_6$ and the seventh lens $L_7$ in the first lens group $G_1$ of the first optical system 1 are single lenses and the tenth lens $L_{10}$ and the twelfth lens $L_{12}$ in the second lens group $G_2$ are positive meniscus lenses each having a convex surface facing the reduction side.

In Table 17, the upper part shows the curvature radius R of each member surface of the projection optical system 10 according to Example 9, the gap D between the members on the optical axis Z, and the refractive index $N_d$ and the Abbe number $v_d$ of each member with respect to the d-line.

In Table 17, the lower part shows the gaps $D_{16}$, $D_{24}$, $D_{26}$, and $D_{27}$ (variables 1 to 4) that vary depending on the projection distance for focusing.

TABLE 17

| Surface number | Curvature radius(R) | Gap(D) | Refractive index(Nd) | Abbe number(vd) |
|---|---|---|---|---|
| 1 | ∞ | 25.75 | 1.5168 | 64.2 |
| 2 | ∞ | 9.50 | | |
| 3 | 33.04 | 10.94 | 1.4875 | 70.2 |
| 4 | −78.33 | 0.50 | | |
| 5 | 29.48 | 10.46 | 1.4970 | 81.5 |
| 6 | −37.68 | 4.00 | 1.7725 | 49.6 |
| 7 | 206.29 | 8.61 | | |
| 8 | 81.95 | 1.15 | 1.8052 | 25.4 |
| 9 | 21.46 | 6.70 | 1.4875 | 70.2 |
| 10 | −32.86 | 2.76 | | |
| 11 | −20.10 | 1.15 | 1.8340 | 37.2 |
| 12 | 58.33 | 0.04 | | |
| 13 | 60.63 | 3.86 | 1.8467 | 23.8 |
| 14 | −37.48 | −1.00 | | |
| 15 (Aperture diaphragm) | ∞ | 4.50 | | |
| 16 | 49.13 | 5.61 | 1.4875 | 70.2 |
| 17 | −38.10 | 1.30 | 1.8061 | 33.3 |
| 18 | −62.83 | (Variable 1) | | |
| 19 | 30.48 | 6.01 | 1.7130 | 53.9 |
| 20 | 100.09 | 12.87 | | |
| 21 | −108.19 | 1.45 | 1.7995 | 42.2 |
| 22 | 28.68 | 2.87 | | |
| 23 | 58.18 | 3.65 | 1.7618 | 26.5 |
| 24 | 433.44 | (Variable 2) | | |
| 25* | 17.67 | 6.00 | 1.4910 | 57.6 |
| 26* | 14.87 | (Variable 3) | | |
| 27* | −62.81 | (Variable 4) | (Reflecting surface) | |
| 28 | ∞ | | | |
| Variable 1 | | 15.14 | 16.26 | 17.27 |
| Variable 2 | | 4.66 | 5.00 | 5.30 |
| Variable 3 | | 155.46 | 154.00 | 152.68 |
| Variable 4 (projection distance) | | −537.35 | −662.00 | −850.91 |

*Aspheric surface

Table 18 shows aspheric coefficients of Aspheric expression A representing the aspheric shapes of the thirteenth lens $L_{13}$ and the reflecting mirror 4 in Example 9.

TABLE 18

| Aspheric coefficient | | | | | |
|---|---|---|---|---|---|
| Surface number | K | $A_3$ | $A_4$ | $A_5$ | $A_6$ |
| 25 | −3.067 | −1.252E−04 | 8.454E−05 | −5.821E−06 | 8.496E−08 |
| 26 | −0.087 | 6.602E−06 | −3.152E−05 | 9.996E−07 | −6.329E−08 |
| 27 | −1.688 | −7.023E−06 | −4.388E−07 | 4.270E−09 | −3.356E−11 |
| Surface number | $A_7$ | $A_8$ | $A_9$ | $A_{10}$ | $A_{11}$ |
| 25 | 1.484E−09 | 2.626E−12 | −9.770E−13 | −2.774E−14 | 4.245E−16 |
| 26 | 6.787E−10 | 6.533E−11 | 3.183E−13 | −3.415E−14 | −3.171E−16 |
| 27 | 2.054E−13 | 4.721E−16 | −4.708E−18 | −8.186E−21 | −2.925E−23 |
| Surface number | $A_{12}$ | $A_{13}$ | $A_{14}$ | $A_{15}$ | $A_{16}$ |
| 25 | −5.781E−18 | −5.294E−18 | 4.202E−19 | −1.830E−21 | −2.098E−22 |
| 26 | −5.463E−17 | −5.787E−18 | 1.893E−19 | 5.333E−21 | 1.441E−22 |
| 27 | −1.255E−23 | −5.918E−25 | 4.352E−27 | 6.079E−29 | 1.303E−31 |
| Surface number | $A_{17}$ | $A_{18}$ | $A_{19}$ | $A_{20}$ | |
| 25 | −4.570E−24 | −7.180E−25 | 5.946E−26 | −9.444E−28 | |
| 26 | −7.199E−25 | −2.539E−25 | −1.941E−26 | 6.482E−28 | |
| 27 | 1.026E−33 | −7.651E−35 | −5.863E−37 | 7.347E−39 | |

Table 19 shows values corresponding to Conditional expressions 1 to 4 in the projection optical system 10 according to Example 9. The projection optical system 10 satisfies all of Conditional expressions 1 to 4 and also satisfies Conditional expressions 1A, 2A, 2B, 3A, and 4A.

Figure 36A:
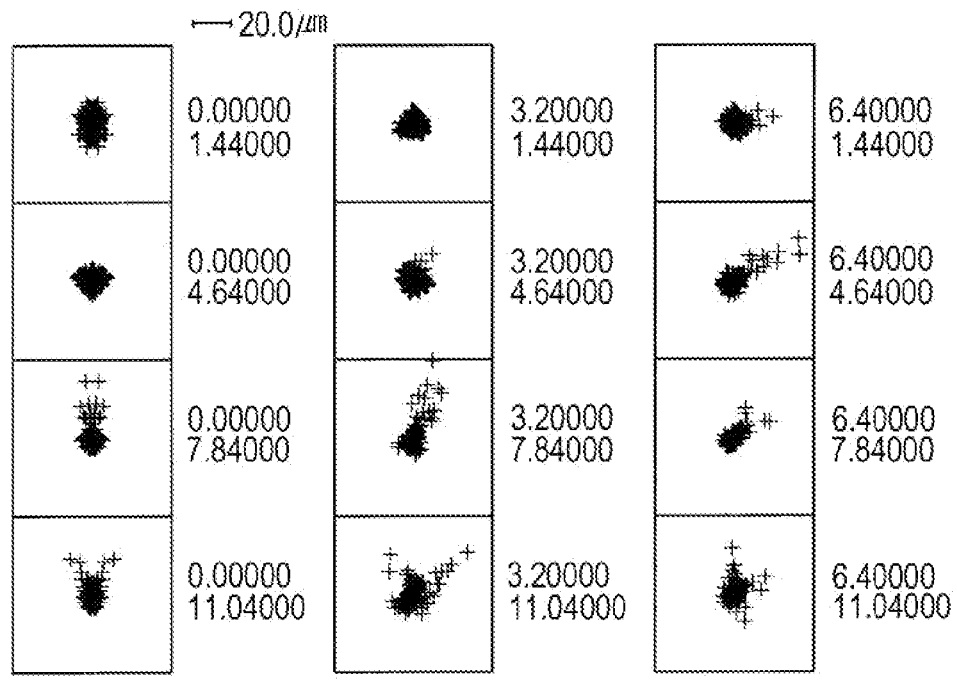
FIG. 36A is a diagram illustrating spots with respect to the d-line, the F-line, and the C-line on a screen of the projection optical system according to Example 9.
Figure 36B:
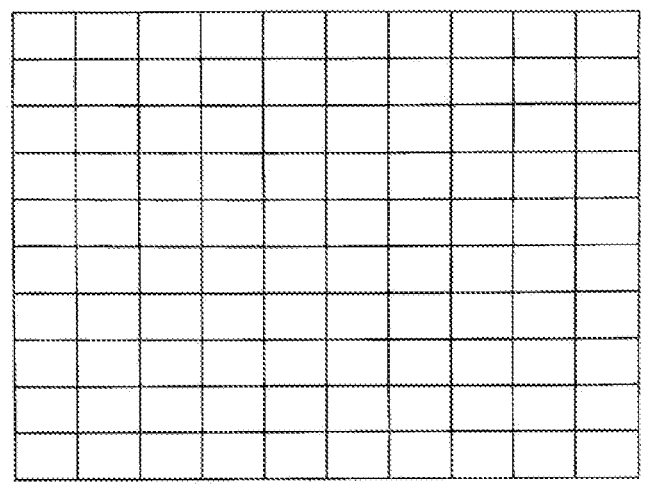
FIG. 36B is a diagram illustrating a distortion grid.

As can be seen from diagrams (FIG. 36A) illustrating spots on the screen and a distortion grid (FIG. 36B) in FIGS. 36A and 36B, the projection optical system 10 is a high-performance projection optical system capable of effectively correcting chromatic aberration and distortion.

TABLE 19

| | Conditional expression (1) $Z_h/h (0.5 < h/h_{max} < 1)$ | | Conditional expression (2) $\tan\theta_{max} - \tan\theta_{min}$ | Conditional expression (3) $|L \times \tan\theta_{max}/l|$ | Conditional expression (4) F |
|---|---|---|---|---|---|
| | Front surface | Rear surface | | | |
| Example 1 | 0.283~0.407 | 0.332~0.465 | 3.76 | 9.85 | 1.8 |
| Example 2 | 0.295~0.432 | 0.346~0.490 | 3.82 | 9.89 | 1.8 |
| Example 3 | 0.363~0.536 | 0.415~0.601 | 3.66 | 9.49 | 1.8 |
| Example 4 | 0.312~0.426 | 0.363~0.492 | 3.67 | 9.52 | 1.8 |
| Example 5 | 0.324~0.449 | 0.363~0.512 | 3.68 | 9.54 | 1.8 |
| Example 6 | 0.323~0.442 | 0.342~0.482 | 3.62 | 9.41 | 1.8 |

TABLE 19-continued

| | Conditional expression (1) $Z_h/h(0.5 < h/h_{max} < 1)$ | | Conditional expression (2) | Conditional expression (3) | Conditional |
|---|---|---|---|---|---|
| | Front surface | Rear surface | $\tan\theta_{max} - \tan\theta_{min}$ | $|L \times \tan\theta_{max}/I|$ | expression (4) F |
| Example 7 | 0.290~0.432 | 0.298~0.474 | 2.43 | 5.75 | 1.8 |
| Example 8 | 0.268~0.388 | 0.324~0.435 | 2.37 | 5.56 | 1.8 |
| Example 9 | 0.289~0.383 | 0.360~0.465 | 2.47 | 5.72 | 1.8 |

The projection optical systems according to Examples 1 to 9 are optical systems which are rotationally symmetric with respect to a common axis and in which all of the optical surfaces of the first optical system 1 and the second optical system 2 are rotationally symmetric surfaces each having a rotationally symmetric axis (the optical axis Z) common to all of the optical surfaces as the center. However, some of the optical surfaces may be eccentric or tilted, or they may be rotationally asymmetric surfaces (surfaces that cannot be formed by rotational planes). In this case, the optical axis means a rotationally symmetric axis common to the largest number of optical surfaces among all of the optical surfaces of the entire system.

What is claimed is:

1. A projection optical system that enlarges and projects an original image on a reduction-side conjugate plane onto a magnification-side conjugate plane, comprising:
    a first optical system that forms an intermediate image conjugate to the original image; and
    a second optical system that forms a final image conjugate to the intermediate image on the magnification-side conjugate plane,
    wherein the first and second optical systems are arranged in order from a reduction side,
    the first optical system includes a plurality of lenses,
    the second optical system includes a reflecting mirror having a concave surface with an aspheric shape, and
    a first lens surface, which is a reduction-side surface, and a second lens surface, which is a magnification-side surface, of a lens closest to a magnification side in the first optical system satisfy the following conditional expressions:

$0.1 < Z_h/h$; and $0.5 < h/h_{max} < 1$ where h indicates a height from an optical axis to an arbitrary point on the first lens surface or the second lens surface, $h_{max}$ indicates the maximum effective height of the first lens surface or the second lens surface, $Z_h$ indicates a displacement from a point on the first lens surface or the second lens surface on the optical axis to a point on the first lens surface or the second lens that is disposed at a height h from the optical axis in the optical axis direction where displacement to the magnification side is defined as positive.

2. The projection optical system according to claim 1, wherein the first optical system includes at least one aspheric surface.

3. The projection optical system according to claim 1, wherein the lens closest to the magnification side in the first optical system is an aspheric lens.

4. The projection optical system according to claim 1, wherein the projection optical system satisfies the following conditional expression:

$2.0 < \tan\theta_{max} - \tan\theta_{min}$ where $\theta_{max}$ indicates a maximum angle among the angles formed between the directional vectors of principal rays emitted from the second optical system to the magnification-side conjugate plane and the directional vector of the optical axis, and $\theta_{min}$ indicates a minimum angle among the angles formed between the directional vectors of the principal rays omitted from the second optical system to the magnification-side conjugate plane and the directional vector of the optical axis.

5. The projection optical system according to claim 1, wherein the reduction side of the entire system has telecentricity, and
    the projection optical system satisfies the following conditional expression:

$5.0 < |(L \times \tan\theta_{max})/I|$ where L indicates an air-equivalent distance from the reduction-side conjugate plane to it lens surface closest to the reduction side in the first optical system on the optical axis and I indicates a distance from an intersection point between the reduction-side conjugate plane and the optical axis to the furthest image point on the reduction-side conjugate plane.

6. The projection optical system according to claim 1, wherein the projection optical system satisfies the following conditional expression:

$F < 2.0$ where F indicates an F-number of the reduction side.

7. The projection optical system according to claim 1, wherein all of the optical surfaces of the first optical system and the second optical system are rotationally symmetric surfaces each having a rotationally symmetric axis common to all of the optical surfaces as its center.

8. A projection display device comprising:
    a light source;
    a light valve;
    an illumination optical unit that guides a light beam emitted from the light source to the light valve; and
    the projection optical system according to claim 1,
    wherein the light valve modulates the light beam emitted from the light source, and
    the modulated light beam is projected onto it screen by the projection optical system.

9. The projection optical system according to claim 1, wherein the following conditional expression is satisfied:

$0.2 < Z_h/h < 0.6$.

* * * * *